(12) United States Patent  (10) Patent No.: US 9,209,480 B2
Odani et al.  (45) Date of Patent: Dec. 8, 2015

(54) SECONDARY BATTERY CONTAINING A NONAQUEOUS ELECTROLYTE WITH A SULFONIC ANHYDRIDE AND AN AROMATIC COMPOUND

(75) Inventors: Toru Odani, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 542 days.

(21) Appl. No.: 12/690,420
(22) Filed: Jan. 20, 2010
(65) Prior Publication Data

US 2010/0190054 A1    Jul. 29, 2010

(30) Foreign Application Priority Data

Jan. 29, 2009    (JP) ............................... P2009-018095

(51) Int. Cl.
*H01M 4/133* (2010.01)
*H01M 10/0525* (2010.01)
(Continued)

(52) U.S. Cl.
CPC ........ *H01M 10/052* (2013.01); *H01M 10/0567* (2013.01); *H01M 10/0568* (2013.01); *H01M 10/0525* (2013.01); *H01M 2300/0025* (2013.01); *Y02E 60/122* (2013.01)

(58) Field of Classification Search
CPC .................................................. H01M 10/0567
USPC .................. 429/326, 327, 329–331, 340, 341
See application file for complete search history.

(56) References Cited

U.S. PATENT DOCUMENTS 6,632,572 B1    10/2003    Takahashi et al.
6,841,298 B2    1/2005    Yamashita et al.
(Continued)

FOREIGN PATENT DOCUMENTS

JP    2001-15155        1/2001
JP    2001297750 A  *  10/2001
(Continued)

OTHER PUBLICATIONS

Noda et al., Machine translation of JP 2003-297423 A, Oct. 2003.*

(Continued)

Primary Examiner — Sean P Cullen
(74) Attorney, Agent, or Firm — K&L Gates LLP

(57) ABSTRACT

A battery includes: a positive electrode; a negative electrode; a nonaqueous electrolyte; and a separator, wherein the nonaqueous electrolyte contains at least one sulfonic anhydride selected from the group consisting of compounds represented by the following chemical formulae (1) to (4) and an aromatic compound represented by the following chemical formula (5).

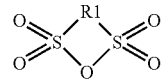

Chemical Formula (1)

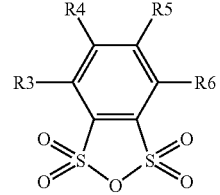

Chemical Formula (2)

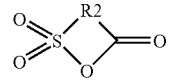

Chemical Formula (3)

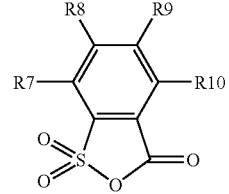

Chemical Formula (4)

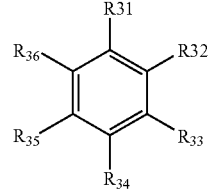

Chemical Formula (5)

12 Claims, 6 Drawing Sheets

(51) Int. Cl.
*H01M 10/0567* (2010.01)
*H01M 10/052* (2010.01)
*H01M 10/0568* (2010.01)

(56) References Cited

U.S. PATENT DOCUMENTS

| | | | |
|---|---|---|---|
| 2003/0118912 A1 | 6/2003 | Watanabe et al. | |
| 2004/0028996 A1* | 2/2004 | Hamamoto et al. | 429/61 |
| 2006/0199077 A1* | 9/2006 | Iwanaga et al. | 429/231.3 |
| 2008/0096112 A1 | 4/2008 | Ihara et al. | |
| 2008/0286648 A1 | 11/2008 | Ihara et al. | |
| 2010/0119956 A1* | 5/2010 | Tokuda et al. | 429/338 |

FOREIGN PATENT DOCUMENTS

| | | |
|---|---|---|
| JP | 2002-8718 | 1/2002 |
| JP | 2002-008718 | 1/2002 |
| JP | 2002-117895 | 4/2002 |
| JP | 2002-198088 | 7/2002 |
| JP | 2002-216741 | 8/2002 |
| JP | 2003-203673 | 7/2003 |
| JP | 2003-297423 | 10/2003 |
| JP | 2003-338317 | 11/2003 |
| JP | 2004-22336 | 1/2004 |
| JP | 2004-022336 | 1/2004 |
| JP | 2004-87282 | 3/2004 |
| JP | 2005-203265 | 7/2005 |
| JP | 2005-294274 | 10/2005 |
| JP | 2006-236725 | 9/2006 |
| JP | 2006-309965 | 11/2006 |
| JP | 2008-021534 | 1/2008 |
| JP | 2008-098053 | 4/2008 |
| JP | 2008-147117 | 6/2008 |
| JP | 2008-147119 | 6/2008 |
| JP | 2008-218298 | 9/2008 |
| WO | 0229922 | 4/2002 |
| WO | WO 2008126800 A1 * | 10/2008 |

OTHER PUBLICATIONS

Negoro et al., Machine translation of JP 2005-294274 A, Oct. 2005.*
Shiozaki et al., Machine translation of JP 2001-297750 A, Oct. 2001.*
Japanese Office Action dated Jun. 21, 2011 for corresponding Application No. 2009-018095.
Japanese Patent Office, Office Action issued in connection with Japanese Patent Application No. 2009-018095, dated Apr. 10, 2012. (4 pages).
Japanese Patent Office, Trial to find issued in connection with Japanese Patent Application No. 2012-13137, dated Oct. 23, 2012, (6 pages).

* cited by examiner

SECONDARY BATTERY CONTAINING A NONAQUEOUS ELECTROLYTE WITH A SULFONIC ANHYDRIDE AND AN AROMATIC COMPOUND

CROSS REFERENCES TO RELATED APPLICATIONS

The present application claims priority to Japanese Priority Patent Application JP 2009-018095 filed in the Japan Patent Office on Jan. 29, 2009, the entire contents of which is hereby incorporated by reference.

BACKGROUND

The present invention relates to a nonaqueous electrolyte secondary battery.

In recent years, portable electronic appliances such as a camera-integrated VTR (video tape recorder), a mobile phone and a laptop personal computer have widely diffused, and it is strongly demanded to reduce their size and weight and to achieve their long life. Following this, batteries, in particular, light-weight secondary batteries capable of providing a high energy density have been developed as a power source.

Above all, a secondary battery utilizing intercalation and deintercalation of lithium (Li) for a charge and discharge reaction (so-called "lithium ion secondary battery") is greatly expected because it is able to provide a higher energy density than a lead battery or a nickel-cadmium battery. Such a lithium ion secondary battery is provided with an electrolytic solution as well as a positive electrode and a negative electrode.

In order to enhance various performances of a nonaqueous electrolyte secondary battery, the development has been advanced extensively and intensively.

For example, it is reported in JP-A-2002-8718 and JP-A-2004-22336 that high-temperature characteristics and a cycle characteristics are improved by adding a sulfonic anhydride.

In JP-A-2002-8718, the battery life is studied in a system in which hydrogen fluoride is formed by the addition of water to an electrolytic solution containing a sulfonic anhydride.

Also, a lithium compound capable of generating a lithium ion is in general added to this electrolytic solution of a lithium ion secondary battery. Typical examples of the lithium compound include lithium hexafluorophosphate ($LiPF_6$). However, many of such lithium compounds inclusive of lithium hexafluorophosphate react with water to form a fluorine ion ($F^-$) (see, for example, JP-A-2002-216741). Then, it is said that the fluorine ion formed upon the reaction with water deteriorates the battery, thereby causing shortening of the battery life (see, for example, JP-A-2002-198088). JP-A-2002-198088 discloses that water is removed by disposing a carrier containing a scavenger substance capable of removing water within a system of the lithium secondary battery and releasing the scavenger substance from the carrier under a previously set up condition.

However, it has been noted that an acid anhydride containing a sulfonic group is instable and easily decomposable so that in existing electrolytic solutions, capabilities thereof are not sufficiently revealed. That is, in batteries of a system using a sulfonic anhydride, a further improvement in high-temperate storage properties is desired.

SUMMARY

It is desirable to provide a battery having improved high-temperature storage properties.

Embodiments according to the present invention are as follows.

(1) A battery including a positive electrode, a negative electrode, a nonaqueous electrolyte and a separator, wherein the nonaqueous electrolyte contains at least one sulfonic anhydride selected from the group consisting of compounds represented by the following chemical formulae (1) to (4) and an aromatic compound represented by the following chemical formula (5).

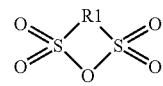

Chemical Formula (1)

In the chemical formula (1), R1 represents $C_mH_{2m-n}X_n$; X represents a halogen; m represents an integer of 2 or more and not more than 4; and n represents an integer of 0 or more and not more than 2m.

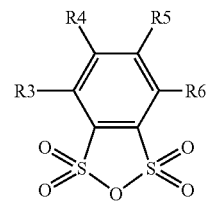

Chemical Formula (2)

In the chemical formula (2), each of R3 to R6 independently represents hydrogen, an alkyl group, a halogenated alkyl group or a halogen group; and R3 to R6 may be taken together to form a ring.

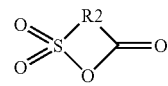

Chemical Formula (3)

In the chemical formula (3), R2 represents $C_jH_{2j-k}X_k$; X represents a halogen; j represents an integer of 2 or more and not more than 4; and k represents an integer of 0 or more and not more than 2j.

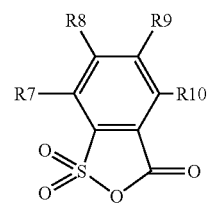

Chemical Formula (4)

In the chemical formula (4), each of R7 to R10 independently represents hydrogen, an alkyl group, a halogenated alkyl group or a halogen group; and R7 to R10 may be taken together to form a ring.

Chemical Formula (5)

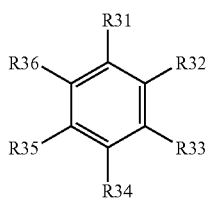

In the chemical formula (5), each of R31 to R36 independently represents hydrogen, a halogen group, an aliphatic alkyl group, an alicyclic alkyl group, a phenyl group or an alkoxyl group; a part or all of hydrogens may be substituted with a halogen; and R31 to R36 may be taken together to form a ring.

(2) A nonaqueous electrolyte containing at least one sulfonic anhydride selected from the group consisting of compounds represented by the chemical formulae (1) to (4) and an aromatic compound represented by the chemical formula (5) as set forth above in (1).

According to the embodiments of the present application, in view of the fact that the nonaqueous electrolyte contains a sulfonic anhydride having a specified structure and an aromatic compound having a specified structure, decomposition of an electrolytic solution at a high temperature can be suppressed, and high-temperature storage characteristics can be improved.

Additional features and advantages are described herein, and will be apparent from the following Detailed Description and the figures.

DETAILED DESCRIPTION

Figure 1:
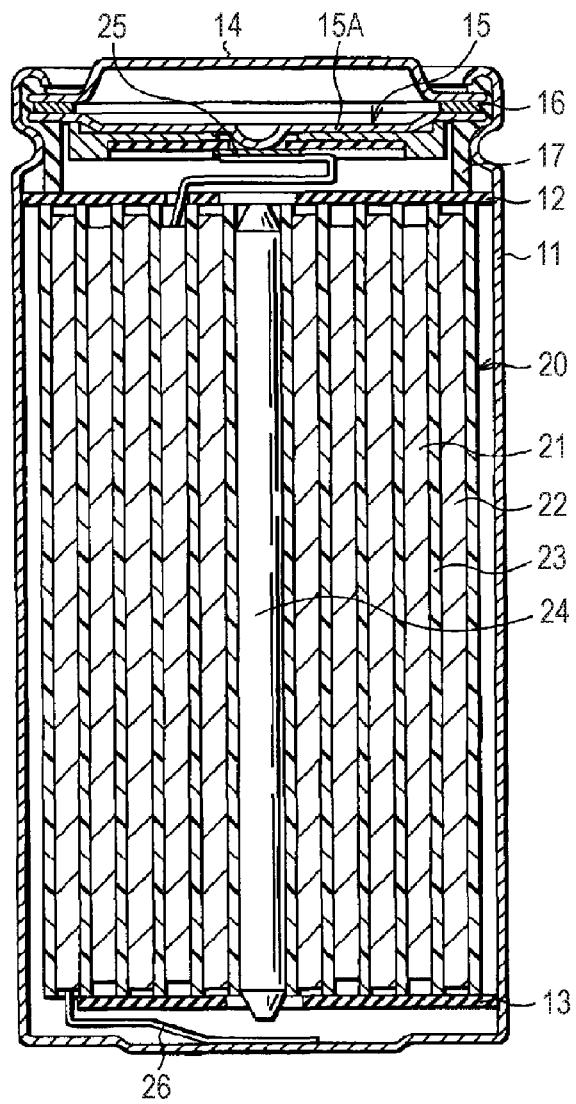
FIG. 1 is a sectional view showing a configuration of a first secondary battery using an electrolytic solution according to an embodiment of the present application.

A nonaqueous electrolyte according to an embodiment of the present application is hereunder described. Of nonaqueous electrolytes, one in a liquid form is called an electrolytic solution, and one in a gel form is called an electrolyte. The "nonaqueous electrolyte" as referred to herein means a medium with ionic conductivity containing various additives inclusive of a solvent, an electrolyte salt, a polymer compound and the sulfonic anhydride and the aromatic compound according to an embodiment of the present application and intervening between an electrode and a separator.

Next, the sulfonic anhydride which is used in embodiments according to the present invention is described below.

The nonaqueous electrolyte contains at least one sulfonic anhydride selected from the group consisting of compounds represented by the foregoing chemical formulae (1) to (4). That is, the nonaqueous electrolyte may be one containing only a compound represented by any one of the chemical formulae (1) to (4), or may be one containing a combination of two or more kinds of the foregoing four types of compounds. Furthermore, in each case, one or more kinds in terms of a general formula of the same type can be used, too. The compound represented by the chemical formula (1) is also referred to as "sulfonic anhydride (1)". The same is also applicable to each of the compounds represented by the chemical formulae (2) to (4). Also, when it is meant that the compounds represented by the chemical formulae (1) to (4) are included, the instant compound is also referred to simply as "sulfonic anhydride". The content of the sulfonic anhydride in the nonaqueous electrolyte is from 0.01 to 5% by mass, and preferably from 0.1 to 1% by mass. This is because when the content of the sulfonic anhydride exceeds 5% by mass, the positive electrode film is so thick that the film resistance becomes excessively large, whereas when it is less than 0.01% by mass, the effects according to the embodiments of the present application cannot be expected.

The sulfonic anhydride (1) is hereunder described.

In the foregoing chemical formula (1), R1 represents $C_mH_{2m-n}X_n$; m represents an integer of from 2 to 4, and preferably an integer of from 2 to 3; and n represents an integer of 0 2m, and preferably an integer of from 4 to 6. m represents the number of carbon atoms used for constituting the ring. X represents a halogen, and preferably fluorine or chlorine.

Specific examples of the sulfonic anhydride (1) are given below, but it should not be construed that the present invention is limited thereto.

Chemical Formula (6)

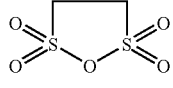   (1)

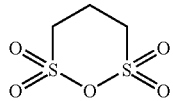   (2)

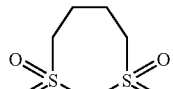   (3)

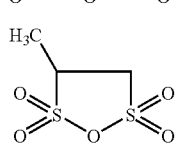   (4)

-continued

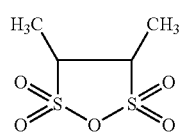
(5)

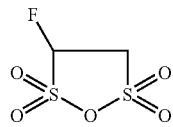
(6)

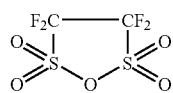
(7)

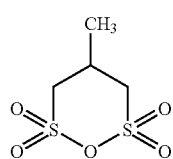
(8)

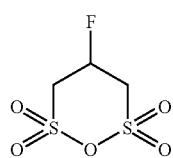
(9)

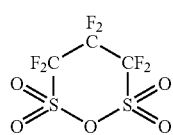
(10)

Of these, Compounds (1) and (2) are preferable, with Compound (2) being more preferable.

The sulfonic anhydride (2) is hereunder described.

In the foregoing chemical formula (2), each of R3 to R6 independently represents hydrogen, an alkyl group, a halogenated alkyl group or a halogen group; and R3 to R6 may be taken together to form a ring.

The alkyl group is preferably an alkyl group having from 1 to 18 carbon atoms, and more preferably an alkyl group having from 1 to 6 carbon atoms.

The halogenated alkyl group is preferably one in which a halogen is substituted on the foregoing alkyl group.

The halogen group represented by R3 to R6 is preferably chlorine or fluorine.

Specific examples of the sulfonic anhydride (2) are given below, but it should not be construed that the present application is limited thereto.

Chemical Formula (7)

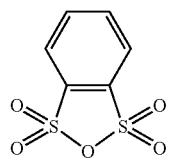
(1)

-continued

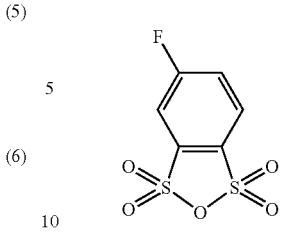
(2)

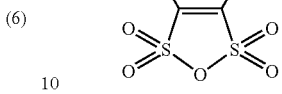
(3)

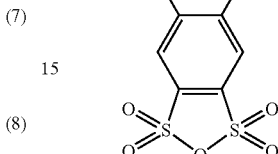

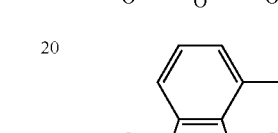
(4)

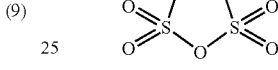

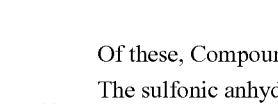

Of these, Compound (1) is preferable.

The sulfonic anhydride (3) is hereunder described.

In the foregoing chemical formula (3), R2 represents $C_jH_{2j-k}Z_k$; j represents an integer of from 2 to 4, and preferably an integer of from 2 to 3; and k represents an integer of from 0 to 2j, and preferably an integer of from 4 to 6. Z represents a halogen, and preferably fluorine or chlorine.

Specific examples of the sulfonic anhydride (3) are given below, but it should not be construed that the present application is limited thereto.

Chemical Formula (8)

(1)

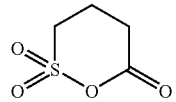
(2)

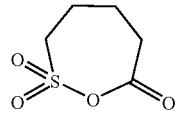
(3)

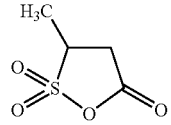

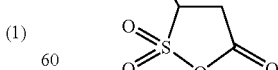
(4)

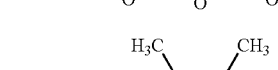

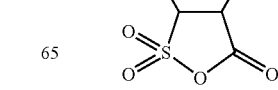
(5)

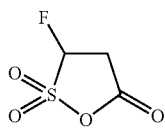
(6)

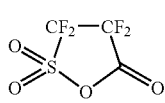
(7)

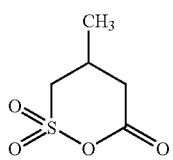
(8)

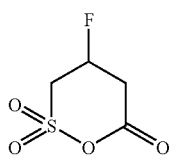
(9)

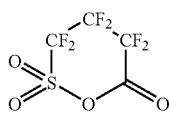
(10)

Of these, Compounds (1) and (2) are preferable.

The sulfonic anhydride (4) is hereunder described.

In the foregoing chemical formula (4), each of R7 to R10 independently represents hydrogen, an alkyl group, a halogenated alkyl group or a halogen group; and R7 to R10 may be taken together to form a ring.

As to the alkyl group, halogenated alkyl group and halogen group, the same groups as those in the sulfonic anhydride (2) are preferable.

Specific examples of the sulfonic anhydride (4) are given below, but it should not be construed that the present application is limited thereto.

Chemical Formula (9)

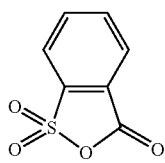
(1)

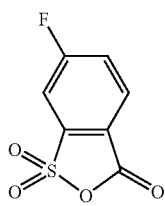
(2)

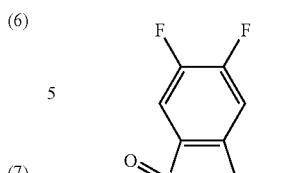
(3)

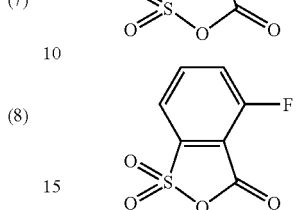
(4)

Of these, Compound (1) is preferable.

As the sulfonic anhydride which is used in embodiments according to the present invention, the sulfonic anhydride (1) or (3) is preferable, with the sulfonic anhydride (1) being more preferable. This is because the effects according to the embodiment of the present application are more effectively revealed.

Next, the aromatic compound represented by the foregoing chemical formula (5) is described below.

In the chemical formula (5), each of R31 to R36 independently represents hydrogen, a halogen group, an aliphatic alkyl group, an alicyclic alkyl group, a phenyl group or an alkoxyl group; a part or all of hydrogens may be substituted with a halogen; and R31 to R36 may be taken together to form a ring.

The halogen group is preferably chlorine or fluorine. The aliphatic alkyl group is preferably a linear or branched aliphatic alkyl group having from 1 to 18 carbon atoms; the alicyclic alkyl group is preferably a saturated or unsaturated alicyclic alkyl group having from 3 to 18 carbon atoms; and the alkoxyl group is preferably an alkoxyl group in which the alkyl moiety thereof is the foregoing alkyl group. In the aliphatic alkyl group, alicyclic alkyl group, phenyl group or alkoxyl group, a part or all of hydrogens may be substituted with a halogen. The halogen which can be substituted is preferably chlorine or fluorine. Also, R31 to R36 may be taken together to form a ring.

The aromatic compound is preferably a compound represented by the following chemical formula (10).

Chemical Formula (10)

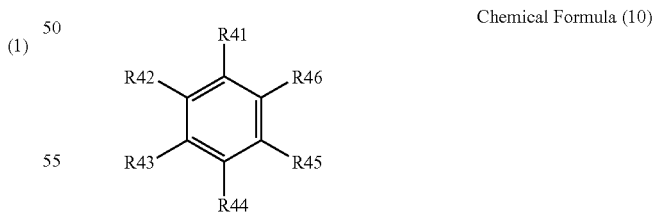

In the chemical formula (10), R41 represents an aliphatic alkyl group, an alicyclic alkyl group or a phenyl group; and a part or all of hydrogens may be substituted with a halogen. The aliphatic alkyl group is preferably a linear or branched aliphatic alkyl group having from 1 to 18 carbon atoms; and the alicyclic alkyl group is preferably a cyclohexyl group, a norbornene group or an adamantyl group. Each of R42 to R46 independently represents hydrogen or a halogen group; and the halogen group is preferably chlorine or fluorine.

The compound represented by the chemical formula (10) is preferably cyclohexylbenzene, tert-butylbenzene or tert-pentylbenzene.

Also, the aromatic compound is preferably a compound represented by the following chemical formula (11).

Chemical Formula (11)

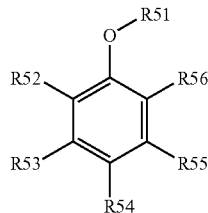

In the chemical formula (11), R51 represents an aliphatic alkyl group, an alicyclic alkyl group or a phenyl group; and a part or all of hydrogens may be substituted with a halogen. The aliphatic alkyl group is preferably a linear or branched aliphatic alkyl group having from 1 to 6 carbon atoms; and a part or all of hydrogens may be substituted with a halogen. The alicyclic alkyl group is preferably a cyclohexyl group, a norbornene group or an adamantyl group. Each of R52 to R56 independently represents hydrogen or a halogen group; and the halogen group is preferably chlorine or fluorine.

The aromatic compound represented by the foregoing chemical formula (11) is preferably an anisole in which one or more hydrogens are fluorinated.

The content of the aromatic compound is preferably from 0.01 to 10% by mass, and more preferably from 0.1 to 5% by mass relative to the nonaqueous electrolyte. This is because when the content of the aromatic compound falls within this range, the effects according to the embodiments of the present application can be revealed.

In embodiments according to the present invention, it is desirable to control the content of water contained in the nonaqueous electrolyte to not more than 100 ppm, preferably not more than 20 ppm, and more preferably not more than 10 ppm. In the embodiments according to the present invention, the content of water is ideally 0. This is because when the content of water falls within this range, the effects according to the embodiments of the present application can be revealed. Though a technique for controlling the content of water is not particularly limited, examples thereof include a treatment of bringing the nonaqueous electrolyte into direct contact with a dehydrating agent. Though the dehydrating agent is not particularly limited so far as it is able to adsorb water thereon, examples thereof include Molecular Sieves (a trade name). The content of water in the nonaqueous electrolyte can be controlled by regulating the kind (including a pore size, a material, etc.) of the dehydrating agent, the treatment time and so on.

In the embodiments according to the present application, the content of water means a value as measured by a Karl-Fischer aquacounter (manufactured by Hiranuma Sangyo Co., Ltd.) during using a nonaqueous electrode in a battery manufacturing process.

The solvent which is contained in the nonaqueous electrolyte is described below.

Examples of the solvent which can be used include ethylene carbonate (EC), propylene carbonate (PC), butylene carbonate, dimethyl carbonate, diethyl carbonate, ethylmethyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutanitrile, adiponitirile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate and dimethyl sulfoxide. This is because in electrochemical devices provided with a nonaqueous electrolyte, such as batteries, excellent capacity, cycle characteristics and storage characteristics are obtainable. These solvents may be used singly or in admixture of plural kinds thereof.

Above all, it is preferable to use at least one member selected from the group consisting of ethylene carbonate, propylene carbonate, dimethyl carbonate, diethyl carbonate and ethylmethyl carbonate as the solvent. This is because sufficient effects are obtainable. In that case, it is especially preferable to use a mixture containing ethylene carbonate or propylene carbonate which is a solvent with a high viscosity (high dielectric constant) (for example, relative dielectric constant ∈≥30) with dimethyl carbonate, diethyl carbonate or ethylmethyl carbonate which is a solvent with a low viscosity (for example, viscosity ≤1 mPa·s). This is because higher effects are obtainable due to enhancements in dissociation properties of the electrolyte salt and mobility of the ion.

The solvent preferably contains at least one member selected from the group consisting of unsaturated bond-containing cyclic carbonates represented by the following chemical formulae (12) to (14). This is because the chemical stability of the nonaqueous electrolyte is more enhanced.

Chemical Formula (12)

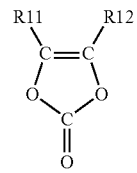

In the chemical formula (12), each of R11 and R12 represents a hydrogen group or an alkyl group.

Chemical Formula (13)

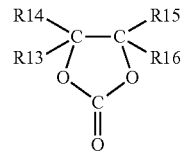

In the chemical formula (13), each of R13 to R16 represents a hydrogen group, an alkyl group, a vinyl group or an allyl group, provided that at least one of R13 to R16 is a vinyl group or an allyl group.

Chemical Formula (14)

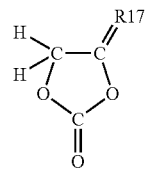

In the chemical formula (14), R17 represents an alkylene group.

The unsaturated bond-containing cyclic carbonate represented by the foregoing chemical formula (12) is a vinylene carbonate based compound. Examples of this vinylene carbonate based compound include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one and 4-trifluoromethyl-1,3-dioxol-2-one. These may be used singly or in admixture of plural kinds thereof. Of these, vinylene carbonate is preferable. This is because not only this compound is easily available, but high effects are obtainable.

The unsaturated bond-containing cyclic carbonate represented by the foregoing chemical formula (13) is a vinylethylene carbonate based compound. Examples of the vinylethylene carbonate based compound include vinylethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one or 4,5-divinyl-1,3-dioxolan-2-one. These may be used singly or in admixture of plural kinds thereof. Of these, vinylethylene carbonate is preferable. This is because not only this compound is easily available, but high effects are obtainable. As a matter of course, all of R13 to R16 may be a vinyl group or an allyl group, or a vinyl group and an allyl group may coexist.

The unsaturated bond-containing cyclic carbonate represented by the foregoing chemical formula (14) is a methylene ethylene carbonate based compound. Examples of the methylene ethylene carbonate based compound include 4-methylene-1,3-dioxolan-2-one, 4,4-dimethyl-5-methylene-1,3-dioxolan-2-one and 4,4-diethyle-5-methylene-1,3-dioxolan-2-one. These may be used singly or in admixture of plural kinds thereof. This methylene ethylene carbonate based compound may be a compound having one methylene group (corresponding to the compound represented by the chemical formula (14)) or may be a compound having two methylene groups.

The unsaturated bond-containing cyclic carbonate may be a benzene ring-containing catechol carbonate or the like, in addition to those represented by the chemical formulae (12) to (14).

Also, the solvent preferably contains at least one member selected from the group consisting of a chain carbonate having a halogen as a constituent element, which is represented by the following chemical formula (15) and a cyclic carbonate having a halogen as a constituent element, which is represented by the following chemical formula (16). This is because the chemical stability of the nonaqueous electrolyte is more enhanced.

Chemical Formula (15)

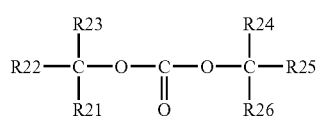

In the chemical formula (15), each of R21 to R26 represents a hydrogen group, a halogen group, an alkyl group or a halogenated alkyl group, provided that at least one of R21 to R26 is a halogen group or a halogenated alkyl group.

Chemical Formula (16)

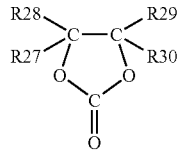

In the chemical formula (16), each of R27 to R30 represents a hydrogen group, a halogen group, an alkyl group or a halogenated alkyl group, provided that at least one of R27 to R30 is a halogen group or a halogenated alkyl group.

In the chemical formula (15), R21 to R26 may be the same as or different from each other. This is also the same as to R27 to R30 in the chemical formula (16). Though the kind of the halogen is not particularly limited, examples thereof include at least one member selected from the group consisting of fluorine, chlorine and bromine, with fluorine being preferable. This is because high effects are obtainable. As a matter of course, the halogen may be other halogen.

The number of halogens is preferably 2 rather than 1, and it may be 3 or more. This is because when used for an electrochemical device such as secondary batteries, capabilities for forming a protective film on the electrode surface become high to form a firmer and more stable protective film, and therefore, a decomposition reaction of the nonaqueous electrolyte is more suppressed.

Examples of the halogen-containing chain carbonate represented by the chemical formula (15) include fluoromethyl methyl carbonate, bis(fluoromethyl) carbonate and difluoromethyl methyl carbonate. These may be used singly or in admixture of plural kinds thereof.

Examples of the halogen-containing cyclic carbonate represented by the chemical formula (16) include 4-fluoro-1,3-dioxolan-2-one, 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one, 4,5-dichloro-1,3-dioxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one and 4-fluoro-4-methyl-1,3-dioxolan-2-one. These may be used singly or in admixture of plural kinds thereof.

Of these, 4-fluoro-1,3-dixolan-2-one and 4,5-difluoro-1,3-dioxolan-2-one are preferable, with 4,5-difluoro-1,3-dioxolan-2-one being more preferable. In particular, as to 4,5-difluoro-1,3-dioxolan-2-one, a trans isomer is more preferable to a cis isomer. This is because not only the trans isomer is easily available, but high effects are obtainable.

Also, the solvent may contain a sultone (a cyclic sulfonate) or a carboxylic acid anhydride. This is because the chemical stability of the nonaqueous electrolyte is more enhanced.

Examples of the sultone include propane sultone and propene sultone. These may be used singly or in admixture of plural kinds thereof. Of these, propene sultone is preferable. Also, the content of the sultone in the solvent is preferably 0.5% by mass or more and not more than 3% by mass. This is because high effects are obtainable in all of the cases.

Examples of the acid anhydride include carboxylic acid anhydrides such as succinic anhydride, glutaric anhydride or maleic anhydride. Of these, succinic anhydride is preferable. These may be used singly or in admixture of plural kinds thereof. Also, the content of the acid anhydride in the solvent is preferably 0.5% by mass or more and not more than 3% by mass. This is because high effects are obtainable in all of the cases.

An intrinsic viscosity of the solvent is, for example, preferably not more than 10.0 mPa·s at 25° C. This is because dissociation properties of the electrolyte salt and mobility of the ion can be ensured. An intrinsic viscosity in a state where the electrolyte salt is dissolved in the solvent (namely, an intrinsic viscosity of the electrolytic solution) is preferably not more than 10.0 mPa·s at 25° C. for the same reasons.

The electrolyte salt contains, for example, one or two or more kinds of a light metal salt such as a lithium salt. Examples of this lithium salt include lithium hexafluorophosphate, lithium tetrafluoroborate, lithium perchlorate, lithium hexafluoroarsenate, lithium tetraphenylborate (LiB($C_6H_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl) and lithium bromide (LiBr). Of these, at least one member selected from the group consisting of lithium hexafluorophosphate, lithium tetrafluoroborate, lithium perchlorate and lithium hexafluoroarsenate is preferable, with lithium hexafluorophosphate being more preferable. This is because the resistance of the nonaqueous electrolyte is lowered. It is especially preferable to use lithium tetrafluoroborate together with lithium hexafluorophosphate. This is because high effects are obtainable.

This electrolyte salt preferably contains at least one member selected from the group consisting of compounds represented by the following chemical formulae (17) to (19). This is because in the case where such a compound is used together with the foregoing lithium hexafluorophosphate or the like, higher effects are obtainable. In the chemical formula (17), each R33 may be the same as or different from every other R33. The same is also applicable to each of R41 to R43 in the chemical formula (18) and each of R51 and R52 in the chemical formula (19).

Chemical Formula (17)

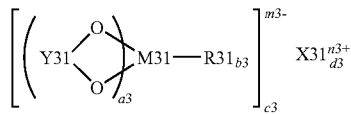

In the chemical formula (17), X31 represents an element belonging to the Group 1 or an element belonging to the Group 2 in the long form of the periodic table or aluminum; M31 represents a transition metal element or an element belonging to the Group 13, an element belonging to the Group 14 or an element belonging to the Group 15 in the long form of the periodic table; R31 represents a halogen group; Y31 represents —OC—R32-CO—, —OC—C(R33)$_2$- or —OC—CO—; R32 represents an alkylene group, a halogenated alkylene group, an arylene group or a halogenated arylene group; R33 represents an alkyl group, a halogenated alkyl group, an aryl group or a halogenated aryl group; a3 represents an integer of from 1 to 4; b3 represents 0, 2 or 4; and each of c3, d3, m3 and n3 represents an integer of from 1 to 3.

Chemical Formula (18)

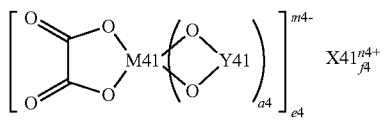

In the chemical formula (18), X41 represents an element belonging to the Group 1 or an element belonging to the Group 2 in the long form of the periodic table; M41 represents a transition metal element or an element belonging to the Group 13, an element belonging to the Group 14 or an element belonging to the Group 15 in the long form of the periodic table; Y41 represents —OC—(C(R41)$_2$)$_{b4}$-CO—, —(R43)$_2$C—(C(R42)$_2$)$_{c4}$-CO—, —(R43)$_2$C—(C(R42)$_2$)$_{c4}$-C(R43)$_2$-, —(R43)$_2$C—(C(R42)$_2$)$_{c4}$-SO$_2$—, —O$_2$S—(C(R42)$_2$)$_{d4}$-SO$_2$— or —OC—(C(R42)$_2$)$_{d4}$-SO$_2$—; each of R41 and R43 represents a hydrogen group, an alkyl group, a halogen group or a halogenated alkyl group, provided that at least one of every R41 and every R43 is a halogen group or a halogenated alkyl group; R42 represents a hydrogen group, an alkyl group, a halogen group or a halogenated alkyl group; each of a4, e4 and n4 represents 1 or 2; each of b4 and d4 represents an integer of from 1 to 4; c4 represents an integer of from 0 to 4; and each of f4 and m4 represents an integer of from 1 to 3.

Chemical Formula (19)

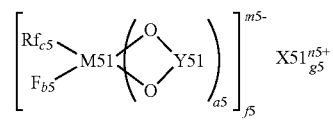

In the chemical formula (19), X51 represents an element belonging to the Group 1 or an element belonging to the Group 2 in the long form of the periodic table; M51 represents a transition metal element or an element belonging to the Group 13, an element belonging to the Group 14 or an element belonging to the Group 15 in the long form of the periodic table; Rf represents a fluorinated alkyl group or a fluorinated aryl group each having from 1 to 10 carbon atoms; Y51 represents —OC—(C(R51)$_2$)$_{d5}$-CO—, —(R52)$_2$C—(C(R51)$_2$)$_{d5}$-CO—, —(R52)$_2$C—(C(R51)$_2$)$_{d5}$-C(R52)$_2$-, —(R52)$_2$C—(C(R51)$_2$)$_{d5}$-SO$_2$—, —O$_2$S—(C(R51)$_2$)$_{e5}$-SO$_2$— or —OC—(C(R51)$_2$)$_{e5}$-SO$_2$—; R51 represents a hydrogen group, an alkyl group, a halogen group or a halogenated alkyl group; R52 represents a hydrogen group, an alkyl group, a halogen group or a halogenated alkyl group, provided that at least one of every R52 is halogen group or a halogenated alkyl group; each of a5, f5 and n5 represents 1 or 2; each of b5, c5 and e5 represents an integer of from 1 to 4; d5 represents an integer of from 0 to 4; and each of g5 and m5 represents an integer of from 1 to 3.

The element belonging to the Group 1 in the long form of the periodic table as referred to herein is hydrogen, lithium, sodium, potassium, rubidium, cesium or francium. The element belonging to the Group 2 in the long form of the periodic table as referred to herein is beryllium, magnesium, calcium, strontium, barium or radium. The element belonging to the Group 13 in the long form of the periodic table as referred to herein is boron, aluminum, gallium, indium or thallium. The element belonging to the Group 14 in the long form of the periodic table as referred to herein is carbon, silicon, germanium, tin or lead. The element belonging to the Group 15 in the long form of the periodic table as referred to herein is nitrogen, phosphorus, arsenic, antimony or bismuth.

Examples of the compound represented by the chemical formula (17) include compounds represented by (1) to (6) of the following chemical formula (20). Examples of the compound represented by the chemical formula (18) include compounds represented by (1) to (8) of the following chemical formula (21). Examples of the compound represented by the chemical formula (19) include a compound represented by the following chemical formula (22). Of these, the compound represented by (6) of the chemical formula (20) is preferable. This is because high effects are obtainable. Needless to say, the compound is not limited to the compounds represented by the chemical formulae (20) to (22) so far as it is a compound having any one of the structures represented by the chemical formulae (17) to (19).

Chemical Formula (20)

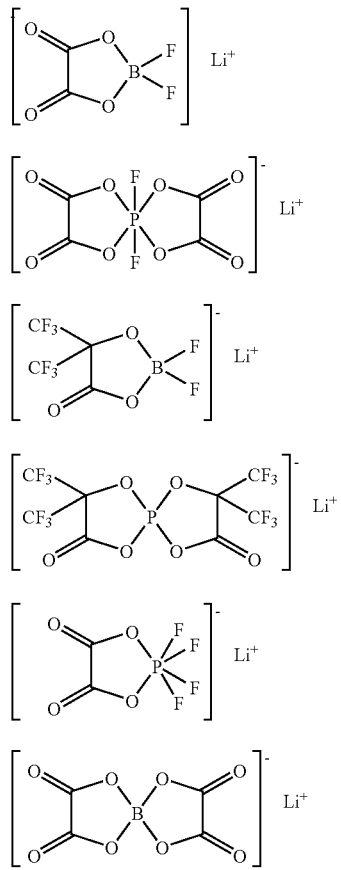

Chemical Formula (21)

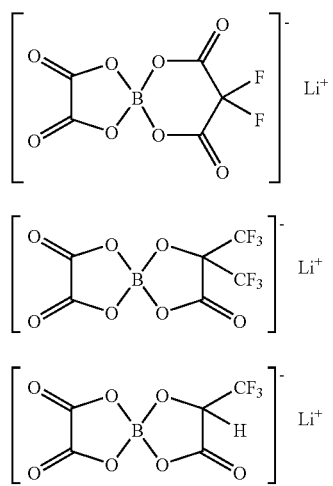

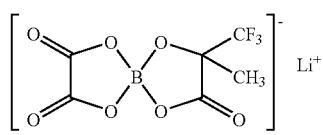

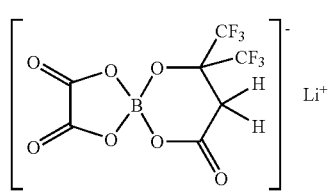

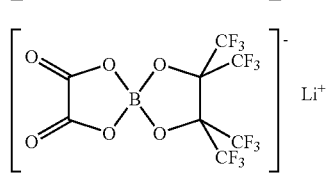

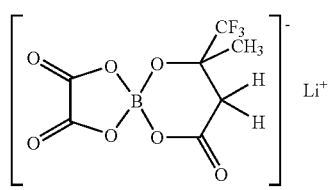

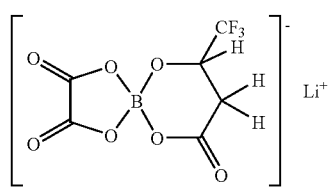

Chemical Formula (22)

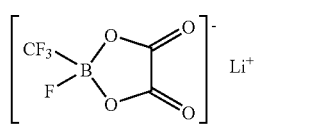

Also, the electrolyte salt preferably contains at least one member selected from the group consisting of compounds represented by the following chemical formulae (23) to (25). This is because in the case where such a compound is used together with the foregoing lithium hexafluorophosphate or the like, higher effects are obtainable. In the chemical formula (23), m and n may be the same as or different from each other. The same is also applicable to p, q and r in the chemical formula (25).

$$\text{LiN}(C_mF_{2m+1}SO_2)(C_nF_{2n+1}SO_2) \quad \text{Chemical Formula (23)}$$

In the chemical formula (23), each of m and n represents an integer of 1 or more.

Chemical Formula (24)

$$\left[\begin{array}{c} \text{R61} \underset{\underset{O}{\overset{O}{\|}}}{\overset{O}{\overset{\|}{S}}} \text{N}^- \overset{O}{\overset{\|}{\underset{\|}{S}}} \\ \end{array}\right] \text{Li}^+$$

In the chemical formula (24), R61 represents a linear or branched perfluoroalkylene group having 2 or more and not more than 4 carbon atoms.

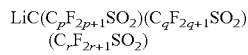

Chemical Formula (25)

In the chemical formula (25), each of p, q and r represents an integer of 1 or more.

Examples of the chain compound represented by the foregoing chemical formula (23) include lithium bis(trifluoromethanesulfonyl)imide ($LiN(CF_3SO_2)_2$), lithium bis(pentafluoroethanesulfonyl)imide ($LiN(C_2F_5SO_2)_2$), lithium (trifluoromethanesulfonyl)(pentafluoroethanesulfonyl)imide ($LiN(CF_3SO_2)(C_2F_5SO_2)$), lithium (trifluoromethanesulfonyl)(heptafluoropropanesulfonyl)imide ($LiN(CF_3SO_2)(C_3F_7SO_2)$) and lithium (trifluoromethanesulfonyl)(nonafluorobutanesulfonyl)imide ($LiN(CF_3SO_2)(C_4F_9SO_2)$). These may be used singly or in admixture of plural kinds thereof. Of these, lithium bis(trifluoromethanesulfonyl)imide is preferable. This is because high effects are obtainable.

Examples of the cyclic compound represented by the foregoing chemical formula (24) include a series of compounds represented by the following formula (26). That is, examples include lithium 1,2-perfluoroethanedisulfonylimide represented by (1) in the following chemical formula (26), lithium 1,3-perfluoropropanedisulfonylimide represented by (2) in the following chemical formula (26), lithium 1,3-perfluorobutanedisulfonylimide represented by (3) in the following chemical formula (26) and lithium 1,4-perfluorobutanedisulfonylimide represented by (4) in the following chemical formula (26). These may be used singly or in admixture of plural kinds thereof. Of these, lithium 1,3-perfluoropropanedisulfonylimide is preferable. This is because high effects are obtainable.

Chemical Formula (26)

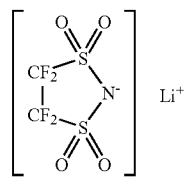 (1)

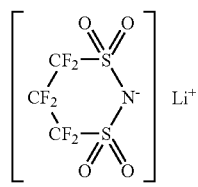 (2)

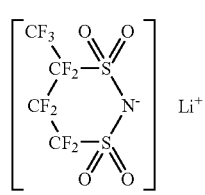 (3)

-continued

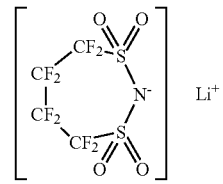 (4)

Examples of the chain compound represented by the foregoing chemical formula (25) include lithium tris(trifluoromethanesulfonyl)methide ($LiC(CF_3SO_2)_3$). The content of the electrolyte salt is preferably 0.3 moles/kg or more and not more than 3.0 moles/kg relative to the solvent. This is because when the content of the electrolyte salt falls outside this range, there is a possibility that the ionic conductivity is extremely lowered.

Next, the use examples of the foregoing nonaqueous electrolyte are described below. Here, when as a secondary battery, an example of the electrochemical device is made hereof by reference, the nonaqueous electrolyte is used in the following manner.

(First Secondary Battery)

Figure 2:
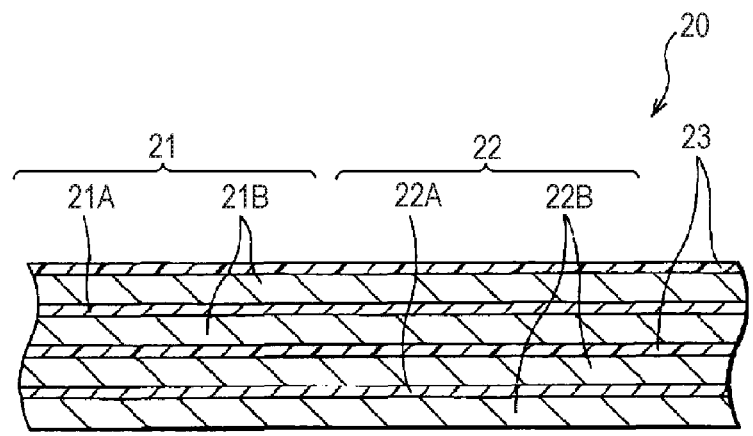
FIG. 2 is a sectional view showing enlargedly a part of a wound electrode body in the first secondary battery shown in FIG. 1.

Each of FIGS. 1 and 2 shows a sectional configuration of a first secondary battery, in which FIG. 2 shows enlargedly a part of a wound electrode body 20 in the secondary battery shown in FIG. 1. This battery is, for example, a lithium ion secondary battery in which the capacity of a negative electrode is expressed on the basis of intercalation and deintercalation of lithium as an electrode reactant.

This secondary battery is one in which a wound electrode body 20 having a positive electrode 21 and a negative electrode 22 wound therein via a separator 23 and a pair of insulating plates 12 and 13 are mainly housed in the inside of a battery can 11 in a substantially hollow column shape. The battery structure using this columnar battery can 11 is called a cylindrical type.

For example, the battery can 11 has a hollow structure in which one end thereof is closed, with the other end being opened and is constituted of a metal material such as iron or aluminum or an alloy thereof. In the case where the battery can 11 is constituted of iron, it may be plated with, for example, nickel, etc. The pair of insulating plates 12 and 13 is respectively disposed such that they interpose the wound electrode body 20 vertically therebetween and extend perpendicular to the winding peripheral face thereof.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed. The battery lid 14 is constituted of, for example, a metal material the same as that in the battery can 11. The safety valve mechanism 15 is electrically connected to the battery lid 14 via the positive temperature coefficient device 16. In the case where the pressure in the inside of the battery reaches a fixed value or more due to an internal short circuit or heating from the outside or the like, a disc plate 15A is reversed, whereby electrical connection between the battery lid 14 and the wound electrode body 20 is disconnected. The positive temperature coefficient device 16 controls the current due to an increase of the resistance in response to an increase of the temperature, thereby preventing abnormal heat generation to be caused due to a large current. The gasket 17 is constituted of, for example, an insulating material, and asphalt is coated on the surface thereof.

A center pin 24 may be inserted on the center of the wound electrode body 20. In the wound electrode body 20, a positive electrode lead 25 made of a metal material, for example, aluminum, etc. is connected to the positive electrode 21; and a negative electrode lead 26 made of a metal material, for example, nickel, etc. is connected to the negative electrode 22. The positive electrode lead 25 is electrically connected to the battery lid 14 by means of welding with the safety valve mechanism 15; and the negative electrode lead 26 is electrically connected to the battery can 11 by means of welding.

For example, the positive electrode 21 is one in which a positive electrode active material layer 21B is provided on the both surfaces of a positive electrode collector 21A having a pair of surfaces opposing to each other. However, the positive electrode active material layer 21B may be provided on only one surface of the positive electrode collector 21A.

The positive electrode collector 21A is constituted of a metal material, for example, aluminum, nickel, stainless steel, etc.

The positive electrode active material layer 21B contains, as a positive electrode active material, one or two or more positive electrode materials capable of intercalating and deintercalating lithium and may further contain other materials such as a binder and a conductive agent, if desired.

As the positive electrode material capable of intercalating and deintercalating lithium, for example, a lithium-containing compound is preferable. This is because a high energy density is obtainable. Examples of this lithium-containing compound include a complex oxide containing lithium and a transition metal element and a phosphate compound containing lithium and a transition metal element. Of these, a compound containing at least one of cobalt, nickel, manganese and iron is preferable as a transition metal element. This is because a higher voltage is obtainable. A chemical formula thereof is represented by, for example, $Li_xM1O_2$ or $Li_yM2PO_4$. In the formulae, each of M1 and M2 represents one or more kinds of a transition metal element; and values of x and y vary depending upon the charge and discharge state and are usually satisfied with the relationships of ($0.05 \leq x \leq 10$) and ($0.05 \leq y \leq 1.10$).

Examples of the complex oxide containing lithium and a transition metal element include a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_xNi_{(1-v-w)}Co_vMn_wO_2$ ((v+w)<1)), a lithium manganese complex oxide having a spinel type structure ($LiMn_2O_4$) and a lithium manganese nickel complex oxide ($LiMn_{2-t}Ni_tO_4$ (t<2)). Of these, cobalt-containing complex oxides are preferable. This is because not only a high capacity is obtainable, but excellent cycle characteristics are obtainable. Also, examples of the phosphate compound containing lithium and a transition metal element include a lithium iron phosphate compound ($LiFePO_4$) and a lithium iron manganese phosphate compound ($LiFe_{1-u}Mn_uPO_4$ (u<1)).

Moreover, in view of the fact that higher electrode filling properties and cycle characteristic are obtainable, a complex particle obtained by coating the surface of a core particle composed of any one of lithium-containing compounds represented by the following general formulae (1) to (5) by a fine particle composed of any one of other lithium-containing compounds is also useful.

$$Li_fCo_{(1-g)}M1_gO_{(2-h)}F_j \quad (1)$$

In the general formula (1), M1 represents at least one member selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and values of f, g, h and j are satisfied with the relationships of ($0.8 \leq f \leq 1.2$), ($0 \leq g < 0.5$), ($-0.1 \leq h \leq 0.2$) and ($0 \leq j \leq 0.1$). The composition of lithium varies depending upon the charge and discharge state, and the value of f represents a value in the complete discharge state.

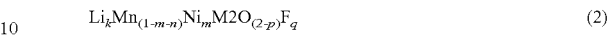

$$Li_kMn_{(1-m-n)}Ni_mM2O_{(2-p)}F_q \quad (2)$$

In the general formula (2), M2 represents at least one member selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W); and values of k, m, n, p and q are satisfied with the relationships of ($0.8 \leq k \leq 1.2$), ($0 < m < 0.5$), ($0 \leq n \leq 0.5$), (($m+n$)<1), ($-0.1 \leq p \leq 0.2$) and ($0 \leq q \leq 0.1$). The composition of lithium varies depending upon the charge and discharge state, and the value of k represents a value in the complete discharge state.

$$Li_rNi_{(1-s)}M3_sO_{(2-t)}F_u \quad (3)$$

In the general formula (3), M3 represents at least one member selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and values of r, s, t and u are satisfied with the relationships of ($0.8 \leq r \leq 1.2$), ($0.005 \leq s \leq 0.5$), ($-0.1 \leq t \leq 0.2$) and ($0 \leq u \leq 0.1$). The composition of lithium varies depending upon the charge and discharge state, and the value of r represents a value in the complete discharge state.

$$Li_vMn_{2-w}M4_wO_xF_y \quad (4)$$

In the general formula (4), M4 represents at least one member selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and v, w, x and y are satisfied with the relationships of ($0.9 \leq v \leq 1.1$), ($0 \leq w \leq 0.6$), ($3.7 \leq x \leq 4.1$) and ($0 \leq y \leq 0.1$). The composition of lithium varies depending upon the charge and discharge state, and the value of v represents a value in the complete discharge state.

$$Li_zM5PO_4 \quad (5)$$

In the general formula (5), M5 represents at least one member selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr); and z represents a value satisfied with the relationship of ($0.9 \leq z \leq 1.1$). The composition of lithium varies depending upon the charge and discharge state, and the value of z represents a value in the complete discharge state.

Besides, examples of the positive electrode material capable of intercalating and deintercalating lithium include oxides such as titanium oxide, vanadium oxide and manganese dioxide; disulfides such as titanium disulfide and molybdenum sulfide; chalcogenides such as niobium selenide; sulfur; and conductive polymers such as polyaniline and polythiophene.

As a matter of course, the positive electrode material capable of intercalating and deintercalating lithium may be other material than those described above. Also, the foregoing series of positive electrode materials may be a mixture of two or more kinds thereof in an arbitrary combination.

Examples of the conductive agent include carbon materials such as graphite, carbon black, acetylene black and ketjen black. These materials are used singly or in admixture of plural kinds thereof. The conductive agent may be a metal material or a conductive polymer material or the like so far as it is a material having conductivity.

Examples of the binder include synthetic rubbers such as a styrene butadiene based rubber, a fluorocarbon based rubber and an ethylene propylene diene based rubber; and polymer materials such as polyvinylidene fluoride. These materials may be used singly or in admixture of plural kinds thereof.

For example, the negative electrode 22 is one in which a negative electrode active material layer 22B is provided on the both surfaces of a negative electrode collector 22A having a pair of surfaces opposing to each other. However, the negative electrode active material layer 22B may be provided on only one surface of the negative electrode collector 22A.

The negative electrode collector 22A is constituted of a metal material, for example, copper, nickel, stainless steel, etc. It is preferable that the surface of this negative electrode collector 22A is roughed. This is because adhesion between the negative electrode collector 22A and the negative electrode active material layer 22B is enhanced due to a so-called anchor effect. In that case, the surface of the negative electrode collector 22A may be roughed in at least a region opposing to the negative electrode active material layer 22B. Examples of a method for achieving roughing include a method for forming fine particles by an electrolysis treatment. The electrolysis treatment as referred to herein is a method in which fine particles are formed on the surface of the negative electrode collector 22A in an electrolysis vessel by means of electrolysis, thereby providing recesses and projections. A copper foil which is prepared by the electrolysis, including the copper foil having been roughed by this electrolysis treatment, is generally named as "electrolytic copper foil".

The negative electrode active material layer 22B contains, as a negative electrode active material, one or two or more kinds of a negative electrode material capable of intercalating and deintercalating lithium and may contain other materials such as a binder and a conductive agent, if desired. Details regarding the binder and the conductive agent are, for example, the same as those in the case of explaining the positive electrode 21. Also, it is preferable that the charge capacity of the negative electrode material capable of intercalating and deintercalating lithium is larger than that by the positive electrode active material. This is because a possibility that lithium is deposited as a dendrite on the negative electrode 22 even at the time of full charge is low.

Examples of the negative electrode material capable of intercalating and deintercalating lithium include carbon materials. Examples of such a carbon material include easily graphitized carbon, hardly graphitized carbon with a (002) plane interval of 0.37 nm or more and graphite with a (002) plane interval of not more than 0.34 nm. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtainable, excellent cycle characteristics are obtainable, and the carbon material also functions as a conductive agent. The shape of the carbon material may be any of a fibrous shape, a spherical shape, a granular shape or a flaky shape.

In addition to the above, as the negative electrode material capable of intercalating and deintercalating lithium, a material which is capable of intercalating and deintercalating lithium and which contains, as a constituent element, at least one member selected from the group consisting of metal elements and semi-metal elements is also exemplified. This is because a high energy density is obtainable. Such a negative electrode material may be a simple substance, an alloy or a compound of a metal element or a semi-metal element. Also, one having one kind or two or more kinds of a phase in at least a part thereof may be used. The "alloy" as referred to herein includes, in addition to alloys composed of two or more kinds of a metal element, alloys containing one or more kinds of a metal element and one or more kinds of a semi-metal element. Also, the "alloy" may contain a non-metal element. Examples of its texture include a solid solution, a eutectic (eutectic mixture), an intermetallic compound and one in which two or more kinds thereof coexist.

Examples of the metal element or semi-metal element include a metal element or a semi-metal element capable of forming an alloy together with lithium. Specific examples thereof include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). Examples of the material containing, as a constituent element, at least one member of such metal element and semi-metal element include an alloy or a compound of such a metal element or semi-metal element. Specific examples thereof include compounds represented by chemical formulae: $Ma_sMb_tLi_u$ (wherein values of s, t and u are satisfied with the relationships of $s>0$, $t≥0$ and $u≥0$, respectively) and $Ma_pMc_qMd_r$ (wherein values of p, q and r are satisfied with the relationships of $p>0$, $q>0$ and $r≥0$, respectively). In the foregoing chemical formulae, Ma represents at least one member selected from the group consisting of metal elements and semi-metal elements each capable of forming an alloy together with lithium; Mb represents at least one member selected from the group consisting of metal elements and semi-metal elements other than lithium and Ma; Mc represents at least one non-metal element; and Md represents at least one member selected from the group consisting of metal elements and semi-metal elements other than Ma. These materials may be crystalline or amorphous.

As the negative electrode material which is constituted of a metal element or a semi-metal element capable of forming an alloy together with lithium, materials containing, as a constituent element, at least one member selected from metal elements and semi-metal elements belonging to the Group 14 in the long form of the periodic table are preferable; and materials containing, as a constituent element, at least one member of silicon and tin are especially preferable. This is because in such a material, a capability for intercalating and deintercalating lithium is large, and therefore, a high energy density is obtainable.

Examples of the negative electrode material containing at least one member of silicon and tin include a simple substance, an alloy or a compound of silicon; a simple substance, an alloy or a compound of tin; and a material having one or two or more kinds of a phase in at least a part thereof.

Examples of the alloyed silicon include alloys containing, as a second constituent element other than silicon, at least one member selected from the group consisting of tin, nickel, copper, iron, cobalt, manganese, zinc, indium, silver, titanium, germanium, bismuth, antimony (Sb) and chromium. Examples of the silicon compound include compounds containing oxygen or carbon (C), and these compounds may contain, in addition to silicon, the foregoing second constituent element. Examples of the alloyed silicon or silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$) and LiSiO.

Examples of the alloyed tin include alloys containing, as a second constituent element other than tin, at least one member selected from the group consisting of silicon, nickel, copper, iron, cobalt, manganese, zinc, indium, silver, titanium, germanium, bismuth, antimony and chromium. Examples of the tin compound include compounds containing oxygen or carbon, and these compounds may contain, in addition to tin, the foregoing second constituent element. Examples of the alloyed tin or tin compound include $SnO_w$ ($0<w\leq2$), $SnSiO_3$, LiSnO and $Mg_2Sn$.

As the negative electrode material containing at least one member of silicon and tin, for example, a material containing tin as a first constituent element and in addition to this, second and third constituent elements is especially preferable. The second constituent element is at least one member selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth and silicon. The third constituent element is at least one member selected from the group consisting of boron, carbon, aluminum and phosphorus (P). This is because in view of the fact that the second and third constituent elements are contained, cycle characteristics are enhanced.

Above of all, the negative electrode material is preferably an SnCoC-containing material containing tin, cobalt and carbon as constituent elements and having a content of carbon of 9.9% by mass or more and not more than 29.7% by mass and a proportion of cobalt to the total sum of tin and cobalt (Co/(Sn+Co)) of 30% by mass or more and not more than 70% by mass. This is because a high energy density is obtainable in the foregoing composition range.

This SnCoC-containing material may further contain other constituent elements, if desired. As other constituent elements, for example, silicon, iron, nickel, chromium, indium, niobium, germanium, titanium, molybdenum, aluminum, phosphorus, gallium and bismuth are preferable. The SnCoC-containing material may contain two or more kinds of these elements. This is because higher effects are obtainable.

The SnCoC-containing material has a phase containing tin, cobalt and carbon, and this phase is preferably a lowly crystalline or amorphous phase. This phase is a reaction phase which is reactive with lithium, and excellent cycle characteristics are obtainable by this phase. In the case of using CuKα-rays as specified X-rays and defining a sweep rate at 1°/min, a half width value of a diffraction peak obtained by X-ray diffraction of this phase is preferably 1.0° or more in terms of a diffraction angle 2θ. This is because not only lithium is more smoothly intercalated and deintercalated, but the reactivity with an electrolyte is reduced.

Whether or not the diffraction peak obtained by the X-ray diffraction is corresponding to the reaction phase which is reactive with lithium can be easily determined by comparing an X-ray diffraction chart before and after an electrochemical reaction with lithium. For example, when a position of the diffraction peak changes before and after the electrochemical reaction with lithium, it is determined that the diffraction peak is corresponding to the reaction phase which is reactive with lithium. In that case, for example, a diffraction peak of a lowly crystalline or amorphous reaction phase is observed in the range of from 20° and 50° in terms of 2θ. This lowly crystalline or amorphous reaction phase contains, for example, the foregoing respective constituent elements, and it may be considered that this phase is lowly crystallized or amorphized chiefly by carbon.

There may be the case where the SnCoC-containing material has, in addition to the lowly crystalline or amorphous phase, a phase containing a simple substance or a part of each of the constituent elements.

In particular, in the SnCoC-containing material, it is preferable that at least a part of carbon as the constituent element is bonded to the metal element or semi-metal element as other constituent element. This is because cohesion or crystallization of tin or the like is suppressed.

Examples of a measurement method for examining the bonding state of elements include X-ray photoelectron spectroscopy (XPS). This XPS is a method in which soft X-rays (using Al-Kα rays or Mg-Kα rays in commercially available units) are irradiated on the surface of a sample, and kinetic energy of photoelectrons which fly out from the sample surface are measured, thereby examining an element composition and a bonding state of elements in a region of several nm from the sample surface.

The bound energy of an inner orbital electron of an element changes in correlation with a charge density on the element from the standpoint of primary approximation. For example, in the case where the charge density of a carbon element is reduced due to an interaction with an element existing in the vicinity of the carbon element, an outer electron such as a 2p electron is reduced, and therefore, a 1s electron of the carbon element receives a strong constraining force from the shell. That is, when the charge density of an element is reduced, the bound energy becomes high. In XPS, when the bound energy increases, a peak is shifted into a high energy region.

In XPS, so far as graphite is concerned, a peak of a 1s orbit of carbon (C1s) appears at 284.5 eV in a unit in which the energy is calibrated such that a peak of a 4f orbit of a gold atom (Au4f) is obtained at 84.0 eV. Also, so far as the surface contamination carbon is concerned, the peak of C1s appears at 284.8 eV. On the contrary, in the case where the charge density of the carbon element becomes high, for example, when bonded to a more positive element than carbon, the peak of C1s appears in a lower region than 284.5 eV. That is, in the case where at least a part of carbons contained in the SnCoC-containing material is bonded to a metal element or a semi-metal element as other constituent element or the like, a peak of a composite wave of C1s obtained regarding the SnCoC-containing material appears in a lower region than 284.5 eV.

In the case of carrying out the XPS measurement, it is preferable that in covering the surface by the surface contamination carbon, the surface is lightly sputtered by an argon ion gun attached to the XPS unit. Also, in the case where the SnCoC-containing material to be measured exists in the negative electrode 22, it would be better that after taking apart the secondary battery, the negative electrode 22 is taken out and then rinsed with a volatile solvent such as dimethyl carbonate. This is made for the purpose of removing a solvent with low volatility and an electrolyte salt existing on the surface of the negative electrode 22. It is desirable that their sampling is carried out in an inert atmosphere.

Also, in the XPS measurement, for example, the peak of C1s is used for correcting the energy axis of a spectrum. In general, since the surface contamination carbon exists on the material surface, the peak of C1s of the surface contamination carbon is fixed at 284.8 eV and employed as an energy reference. In the) XPS measurement, the waveform of the peak of C1s is obtained as a form including the peak of the surface contamination carbon and the peak of carbon in the SnCoC-containing material, and therefore, the peak of the surface contamination carbon and the peak of carbon in the SnCoC-containing material are separated by, for example, analysis using a commercially available software program. In the analysis of the waveform, a position of a main peak existing on the lowest bound energy side is employed as an energy reference (284.8 eV).

This SnCoC-containing material can be formed by, for example, melting a mixture obtained by mixing raw materials of the respective constituent elements in an electric furnace, a high frequency induction furnace, an arc furnace, etc. and then solidifying the melt. Also, various atomizing methods such as gas atomization and water atomization, various rolling methods or methods utilizing a mechanochemical reaction such as a mechanical alloying method and a mechanical milling method may be adopted. Of these, a method utilizing a mechanochemical reaction is preferable. This is because the SnCoC-containing material is converted so as to have a lowly crystalline or amorphous structure. In the method utilizing a mechanochemical reaction, for example, a planetary ball mill unit or a manufacturing unit such as an attritor can be used.

For the raw material, though a simple substance of the respective constituent elements may be mixed, it is preferable to use an alloy with respect to a part of the constituent elements other than carbon. This is because by adding carbon to such an alloy and synthesizing the raw material by a method utilizing a mechanical alloying method, a lowly crystalline or amorphous structure is obtained, and the reaction time is shortened, too. The form of the raw material may be a powder or a block.

In addition to this SnCoC-containing material, an SnCoFeC-containing material having tin, cobalt, iron and carbon as constituent elements is also preferable. A composition of this SnCoFeC-containing material can be arbitrarily set up. For example, in the case where a content of iron is set up low, a composition in which a content of carbon is 9.9% by mass or more and not more than 29.7% by mass, a content of iron is 0.3% by mass or more and not more than 5.9% by mass, and a proportion of cobalt to the total sum of tin and cobalt (Co/(Sn+Co)) is 30% by mass or more and not more than 70% by mass is preferable. Also, for example, in the case where a content of iron is set up high, a composition in which a content of carbon is 11.9% by mass or more and not more than 29.7% by mass, a proportion of the total sum of cobalt and iron to the total sum of tin, cobalt and iron ((Co+Fe)/(Sn+Co+Fe)) is 26.4% by mass or more and not more than 48.5% by mass, and a proportion of cobalt to the total sum of cobalt and iron (Co/(Co+Fe)) is 9.9% by mass or more and not more than 79.5% by mass is preferable. This is because a high energy density is obtainable in the foregoing composition range. The crystallinity, measurement method of the bonding state of elements and formation method of this SnCoFeC-containing material and the like are the same as in the foregoing SnCoC-containing material.

The negative electrode active material layer 22B using, as a negative electrode material capable of intercalating and deintercalating lithium, a simple substance, an alloy or a compound of silicon, a simple substance, an alloy or a compound of tin or a material containing one or two or more kinds of phases thereof in at least a part thereof is formed by, for example, a vapor phase method, a liquid phase method, a spraying method, a coating method, a baking method or a combined method of two or more kinds of these methods. In that case, it is preferable that the negative electrode collector 22A and the negative electrode active material layer 22B are alloyed on at least a part of the interface therebetween. In detail, on the interface between the both, the constituent elements of the negative electrode collector 22A may be diffused into the negative electrode active material layer 22B, the constituent elements of the negative electrode active material layer 22B may be diffused into the negative electrode collector 22A, or these constituent elements may be mutually diffused. This is because not only breakage to be caused due to expansion and shrinkage of the negative electrode active material layer 22B at the time of charge and discharge can be suppressed, and electron conductivity between the negative electrode collector 22A and the negative electrode active material layer 22B is enhanced.

Examples of the vapor phase method include a physical deposition method and a chemical deposition method, specifically a vacuum vapor deposition method, a sputtering method, an ion plating method, a laser abrasion method, a thermal chemical vapor deposition (CVD) method and a plasma chemical vapor deposition method. As the liquid phase method, known techniques such as electrolytic plating and non-electrolytic plating can be adopted. The coating method as referred to herein is, for example, a method in which after mixing a granular negative electrode active material with a binder and the like, the mixture is dispersed in a solvent and coated. The baking method as referred to herein is, for example, a method in which after coating by a coating method, the coated material is heat treated at a higher temperature than a melting point of the binder, etc. As to the baking method, known techniques can be utilized, too, and examples thereof include an atmospheric baking method, a reaction baking method and a hot press baking method.

Also, examples of the negative electrode material capable of intercalating and deintercalating lithium include metal oxides and polymer compounds capable of intercalating and deintercalating lithium. Examples of the metal oxide include iron oxide, ruthenium oxide and molybdenum oxide; and examples of the polymer compound include polyacetylene, polyaniline and polypyrrole.

As a matter of course, the negative electrode material capable of intercalating and deintercalating lithium may be a material other than those described above. Also, the foregoing series of negative electrode materials may be a mixture of two or more kinds thereof in an arbitrary combination.

The negative electrode active material made of the foregoing negative electrode material is composed of plural granules. That is, the negative electrode active material layer 22B has plural negative electrode active material particles, and the negative electrode active material particle is formed by, for example, the foregoing vapor phase method, etc. However, the negative electrode active material particle may be formed by a method other than the vapor phase method.

In the case where the negative electrode active material particle is formed by a deposition method such as a vapor phase method, the negative electrode active material particle may have a single-layered structure formed through a single deposition step, or may have a multilayered structure formed through plural deposition steps. However, in the case where the negative electrode active material particle is formed by a vapor deposition method accompanied with high heat at the time of deposition, it is preferable that the negative electrode active material particle has a multilayered structure. This is because when the deposition step of the negative electrode material is carried out in a divided manner of plural times (the negative electrode material is successively formed thin and deposited), the time when the negative electrode collector 22A is exposed at high temperatures becomes short, and a thermal damage is hardly given as compared with the case of carrying out the deposition step once.

For example, this negative electrode active material particle grows in a thickness direction of the negative electrode active material layer 22B from the surface of the negative electrode collector 22A and is connected to the negative electrode collector 22A in a root thereof. In that case, it is preferable that the negative electrode active material particle is formed by a vapor phase method and alloyed on at least a part of the interface with the negative electrode collector 22A as described previously. In detail, on the interface between the both, the constituent elements of the negative electrode collector 22A may be diffused into the negative electrode active material particle, the constituent elements of the negative electrode active material particle may be diffused into the negative electrode collector 22A, or the constituent elements of the both may be mutually diffused.

In particular, it is preferable that the negative electrode active material layer 22B has an oxide-containing film for coating the surface of the negative electrode active material particle (region coming into contact with the electrolytic solution), if desired. This is because the oxide-containing film functions as a protective film against the electrolytic solution, and even when charge and discharge are repeated, a decomposition reaction of the electrolytic solution is suppressed, and therefore, the cycle characteristics are enhanced. This oxide-containing film may coat a part or the whole of the surface of the negative electrode active material particle.

This oxide-containing film contains an oxide of a metal element or a semi-metal element. Examples of the oxide of a metal element or a semi-metal element include oxides of aluminum, silicon, zinc, germanium, tin or the like. Of these, it is preferable that the oxide-containing film contains an oxide of at least one member selected from the group consisting of silicon, germanium and tin; and it is especially preferable that the oxide-containing film contains an oxide of silicon. This is because not only it is easily coated over the entire surface of the negative electrode active material particle, but an excellent protective function is obtainable. As a matter of course, the oxide-containing film may contain an oxide other than those described above.

This oxide-containing film is, for example, formed using one or two or more kinds of a method including a vapor phase method and a liquid phase method. In that case, examples of the vapor phase method include a vapor deposition method, a sputtering method and a CVD method; and examples of the liquid phase method include a liquid phase deposition method, a sol-gel method, a polysilazane method, an electrodeposition method, a coating method and a dip coating method. Of these, a liquid phase method is preferable, and a liquid phase deposition method is more preferable. This is because the surface of the negative electrode active material particle can be easily coated over a wide range thereof. In the liquid phase deposition method, first of all, in a solution containing not only a fluoride complex of a metal element or a semi-metal element and, as an anion scavenger, a solution species which is easy to coordinate to a fluoride ion, the fluoride ion generated from the fluoride complex is scavenged by the anion scavenger, thereby depositing an oxide of the metal element or semi-metal element so as to coat the surface of the negative electrode active material particle. Thereafter, an oxide-containing film is formed by washing with water and Chemical Formula (19)

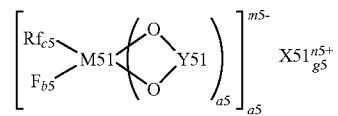

In the chemical formula (19), X51 represents an element belonging to the Group 1 or an element belonging to the Group 2 in the long form of the periodic table; M51 represents a transition metal element or an element belonging to the Group 13, an element belonging to the Group 14 or an element belonging to the Group 15 in the long form of the periodic table; Rf represents a fluorinated alkyl group or a fluorinated aryl group each having from 1 to 10 carbon atoms; Y51 represents $-OC-(C(R51)_2)_{d5}-CO-$, $-(R52)_2C-(C(R51)_2)_{d5}-CO-$, $-(R52)_2C-(C(R51)_2)_{d5}-C(R52)_2-$, $-(R52)_2C-(C(R51)_2)_{d5}-SO_2-$, $-O_2S-(C(R51)_2)_{e5}-SO_2-$ or $-OC-(C(R51)_2)_{e5}-SO_2-$; R51 represents a hydrogen group, an alkyl group, a halogen group or a halogenated alkyl group; R52 represents a hydrogen group, an alkyl group, a halogen group or a halogenated alkyl group, provided that at least one of every R52 is halogen group or a halogenated alkyl group; each of a5, f5 and n5 represents 1 or 2; each of b5, c5 and e5 represents an integer of from 1 to 4; d5 represents an integer of from 0 to 4; and each of g5 and m5 represents an integer of from 1 to 3.

The element belonging to the Group 1 in the long form of the periodic table as referred to herein is hydrogen, lithium, sodium, potassium, rubidium, cesium or francium. The element belonging to the Group 2 in the long form of the periodic table as referred to herein is beryllium, magnesium, calcium, strontium, barium or radium. The element belonging to the Group 13 in the long form of the periodic table as referred to herein is boron, aluminum, gallium, indium or thallium. The element belonging to the Group 14 in the long form of the periodic table as referred to herein is carbon, silicon, germanium, tin or lead. The element belonging to the Group 15 in the long form of the periodic table as referred to herein is nitrogen, phosphorus, arsenic, antimony or bismuth.

Examples of the compound represented by the chemical formula (17) include compounds represented by (1) to (6) of the following chemical formula (20). Examples of the compound represented by the chemical formula (18) include compounds represented by (1) to (8) of the following chemical formula (21). Examples of the compound represented by the chemical formula (19) include a compound represented by the following chemical formula (22). Of these, the compound represented by (6) of the chemical formula (20) is preferable. This is because high effects are obtainable. Needless to say, the compound is not limited to the compounds represented by the chemical formulae (20) to (22) so far as it is a compound having any one of the structures represented by the chemical formulae (17) to (19).

Chemical Formula (20)

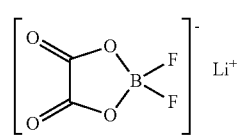

(1)

-continued

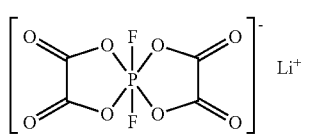 (2)

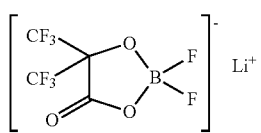 (3)

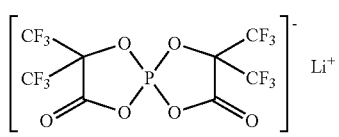 (4)

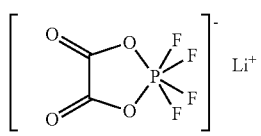 (5)

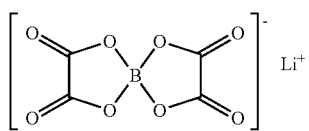 (6)

Chemical Formula (21)

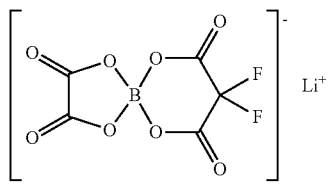 (1)

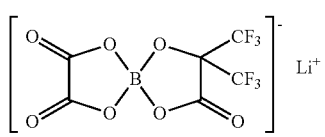 (2)

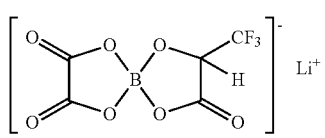 (3)

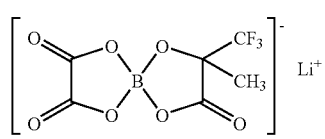 (4)

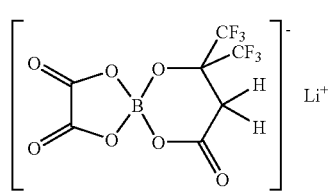 (5)

-continued

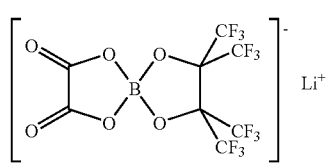 (6)

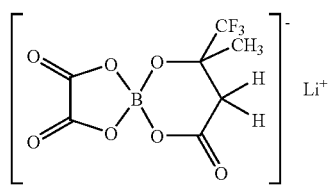 (7)

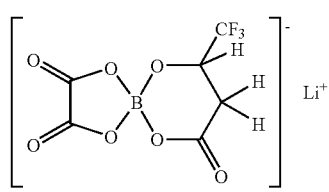 (8)

Chemical Formula (22)

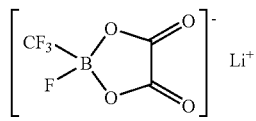 (6)

Also, the electrolyte salt preferably contains at least one member selected from the group consisting of compounds represented by the following chemical formulae (23) to (25). This is because in the case where such a compound is used together with the foregoing lithium hexafluorophosphate or the like, higher effects are obtainable. In the chemical formula (23), m and n may be the same as or different from each other. The same is also applicable to p, q and r in the chemical formula (25).

$$LiN(C_mF_{2m+1}SO_2)(C_nF_{2n+1}SO_2)$$ Chemical Formula (23)

In the chemical formula (23), each of m and n represents an integer of 1 or more.

Chemical Formula (24)

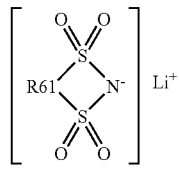

In the chemical formula (24), R61 represents a linear or branched perfluoroalkylene group having 2 or more and not more than 4 carbon atoms.

$$LiC(C_pF_{2p+1}SO_2)(C_qF_{2q+1}SO_2)\\(C_rF_{2r+1}SO_2)$$ Chemical Formula (25)

In the chemical formula (25), each of p, q and r represents an integer of 1 or more.

Examples of the chain compound represented by the foregoing chemical formula (23) include lithium bis(trifluoromethanesulfonyl)imide ($LiN(CF_3SO_2)_2$), lithium bis(pentafluoroethanesulfonyl)imide ($LiN(C_2F_5SO_2)_2$), lithium (trifluoromethanesulfonyl)(pentafluoroethanesulfonyl)imide ($LiN(CF_3SO_2)(C_2F_5SO_2)$), lithium (trifluoromethanesulfonyl)(heptafluoropropanesulfonyl)imide (LiN(CF$_3$SO$_2$) (C$_3$F$_7$SO$_2$)) and lithium (trifluoromethanesulfonyl)(nonafluorobutanesulfonyl)imide (LiN(CF$_3$SO$_2$)(C$_4$F$_9$SO$_2$)). These may be used singly or in admixture of plural kinds thereof. Of these, lithium bis(trifluoromethanesulfonyl)imide is preferable. This is because high effects are obtainable.

Examples of the cyclic compound represented by the foregoing chemical formula (24) include a series of compounds represented by the following formula (26). That is, examples include lithium 1,2-perfluoroethanedisulfonylimide represented by (1) in the following chemical formula (26), lithium 1,3-perfluoropropanedisulfonylimide represented by (2) in the following chemical formula (26), lithium 1,3-perfluorobutanedisulfonylimide represented by (3) in the following chemical formula (26) and lithium 1,4-perfluorobutanedisulfonylimide represented by (4) in the following chemical formula (26). These may be used singly or in admixture of plural kinds thereof. Of these, lithium 1,3-perfluoropropanedisulfonylimide is preferable. This is because high effects are obtainable.

Chemical Formula (26)

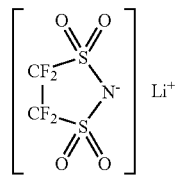

(1)

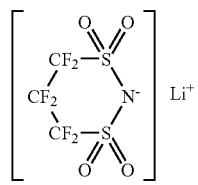

(2)

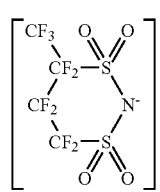

(3)

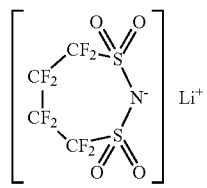

(4)

Examples of the chain compound represented by the foregoing chemical formula (25) include lithium tris(trifluoromethanesulfonyl)methide (LiC(CF$_3$SO$_2$)$_3$). The content of the electrolyte salt is preferably 0.3 moles/kg or more and not more than 3.0 moles/kg relative to the solvent. This is because when the content of the electrolyte salt falls outside this range, there is a possibility that the ionic conductivity is extremely lowered.

Next, the use examples of the foregoing nonaqueous electrolyte are described below. Here, when as a secondary battery, an example of the electrochemical device is made hereof by reference, the nonaqueous electrolyte is used in the following manner.

(First Secondary Battery)

Each of FIGS. 1 and 2 shows a sectional configuration of a first secondary battery, in which FIG. 2 shows enlargedly a part of a wound electrode body 20 in the secondary battery shown in FIG. 1. This battery is, for example, a lithium ion secondary battery in which the capacity of a negative electrode is expressed on the basis of intercalation and deintercalation of lithium as an electrode reactant.

This secondary battery is one in which a wound electrode body 20 having a positive electrode 21 and a negative electrode 22 wound therein via a separator 23 and a pair of insulating plates 12 and 13 are mainly housed in the inside of a battery can 11 in a substantially hollow column shape. The battery structure using this columnar battery can 11 is called a cylindrical type.

For example, the battery can 11 has a hollow structure in which one end thereof is closed, with the other end being opened and is constituted of a metal material such as iron or aluminum or an alloy thereof. In the case where the battery can 11 is constituted of iron, it may be plated with, for example, nickel, etc. The pair of insulating plates 12 and 13 is respectively disposed such that they interpose the wound electrode body 20 vertically therebetween and extend perpendicular to the winding peripheral face thereof.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed. The battery lid 14 is constituted of, for example, a metal material the same as that in the battery can 11. The safety valve mechanism 15 is electrically connected to the battery lid 14 via the positive temperature coefficient device 16. In the case where the pressure in the inside of the battery reaches a fixed value or more due to an internal short circuit or heating from the outside or the like, a disc plate 15A is reversed, whereby electrical connection between the battery lid 14 and the wound electrode body 20 is disconnected. The positive temperature coefficient device 16 controls the current due to an increase of the resistance in response to an increase of the temperature, thereby preventing abnormal heat generation to be caused due to a large current. The gasket 17 is constituted of, for example, an insulating material, and asphalt is coated on the surface thereof.

A center pin 24 may be inserted on the center of the wound electrode body 20. In the wound electrode body 20, a positive electrode lead 25 made of a metal material, for example, aluminum, etc. is connected to the positive electrode 21; and a negative electrode lead 26 made of a metal material, for example, nickel, etc. is connected to the negative electrode 22. The positive electrode lead 25 is electrically connected to the battery lid 14 by means of welding with the safety valve mechanism 15; and the negative electrode lead 26 is electrically connected to the battery can 11 by means of welding.

For example, the positive electrode 21 is one in which a positive electrode active material layer 21B is provided on the both surfaces of a positive electrode collector 21A having a pair of surfaces opposing to each other. However, the positive electrode active material layer 21B may be provided on only one surface of the positive electrode collector 21A.

The positive electrode collector 21A is constituted of a metal material, for example, aluminum, nickel, stainless steel, etc.

The positive electrode active material layer 21B contains, as a positive electrode active material, one or two or more positive electrode materials capable of intercalating and deintercalating lithium and may further contain other materials such as a binder and a conductive agent, if desired.

As the positive electrode material capable of intercalating and deintercalating lithium, for example, a lithium-containing compound is preferable. This is because a high energy density is obtainable. Examples of this lithium-containing compound include a complex oxide containing lithium and a transition metal element and a phosphate compound containing lithium and a transition metal element. Of these, a compound containing at least one of cobalt, nickel, manganese and iron is preferable as a transition metal element. This is because a higher voltage is obtainable. A chemical formula thereof is represented by, for example, $Li_xM1O_2$ or $Li_yM2PO_4$. In the formulae, each of M1 and M2 represents one or more kinds of a transition metal element; and values of x and y vary depending upon the charge and discharge state and are usually satisfied with the relationships of ($0.05 \leq x \leq 1.10$) and ($0.05 \leq y \leq 1.10$).

Examples of the complex oxide containing lithium and a transition metal element include a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ ($z<1$)), a lithium nickel cobalt manganese complex oxide ($Li_xNi_{(1-v-w)}Co_vMn_wO_2$ (($v+w$)$<1$)), a lithium manganese complex oxide having a spinel type structure ($LiMn_2O_4$) and a lithium manganese nickel complex oxide ($LiMn_{2-t}Ni_tO_4$ ($t<2$)). Of these, cobalt-containing complex oxides are preferable. This is because not only a high capacity is obtainable, but excellent cycle characteristics are obtainable. Also, examples of the phosphate compound containing lithium and a transition metal element include a lithium iron phosphate compound ($LiFePO_4$) and a lithium iron manganese phosphate compound ($LiFe_{1-u}Mn_uPO_4$ ($u<1$)).

Moreover, in view of the fact that higher electrode filling properties and cycle characteristic are obtainable, a complex particle obtained by coating the surface of a core particle composed of any one of lithium-containing compounds represented by the following general formulae (1) to (5) by a fine particle composed of any one of other lithium-containing compounds is also useful.

$$Li_fCo_{(1-g)}M1_gO_{(2-h)}F_j \qquad (1)$$

In the general formula (1), M1 represents at least one member selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and values of f, g, h and j are satisfied with the relationships of ($0.8 \leq f \leq 1.2$), ($0 \leq g < 0.5$), ($-0.1 \leq h \leq 0.2$) and ($0 \leq j \leq 0.1$). The composition of lithium varies depending upon the charge and discharge state, and the value of f represents a value in the complete discharge state.

$$Li_kMn_{(1-m-n)}Ni_mM2_nO_{(2-p)}F_q \qquad (2)$$

In the general formula (2), M2 represents at least one member selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W); and values of k, m, n, p and q are satisfied with the relationships of ($0.8 \leq k \leq 1.2$), ($0 < m < 0.5$), ($0 \leq n \leq 0.5$), (($m+n$)$<1$), ($-0.1 \leq p \leq 0.2$) and ($0 \leq q \leq 0.1$). The composition of lithium varies depending upon the charge and discharge state, and the value of k represents a value in the complete discharge state.

$$Li_rNi_{(1-s)}M3_sO_{(2-t)}F_u \qquad (3)$$

In the general formula (3), M3 represents at least one member selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and values of r, s, t and u are satisfied with the relationships of ($0.8 \leq r \leq 1.2$), ($0.005 \leq s \leq 0.5$), ($-0.1 \leq t \leq 0.2$) and ($0 \leq u \leq 0.1$). The composition of lithium varies depending upon the charge and discharge state, and the value of r represents a value in the complete discharge state.

$$Li_vMn_{2-w}M4_wO_xF_y \qquad (4)$$

In the general formula (4), M4 represents at least one member selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and v, w, x and y are satisfied with the relationships of ($0.9 \leq v \leq 1.1$), ($0 \leq w \leq 0.6$), ($3.7 \leq x \leq 4.1$) and ($0 \leq y \leq 0.1$). The composition of lithium varies depending upon the charge and discharge state, and the value of v represents a value in the complete discharge state.

$$Li_zM5PO_4 \qquad (5)$$

In the general formula (5), M5 represents at least one member selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr); and z represents a value satisfied with the relationship of ($0.9 \leq z \leq 1.1$). The composition of lithium varies depending upon the charge and discharge state, and the value of z represents a value in the complete discharge state.

Besides, examples of the positive electrode material capable of intercalating and deintercalating lithium include oxides such as titanium oxide, vanadium oxide and manganese dioxide; disulfides such as titanium disulfide and molybdenum sulfide; chalcogenides such as niobium selenide; sulfur; and conductive polymers such as polyaniline and polythiophene.

As a matter of course, the positive electrode material capable of intercalating and deintercalating lithium may be other material than those described above. Also, the foregoing series of positive electrode materials may be a mixture of two or more kinds thereof in an arbitrary combination.

Examples of the conductive agent include carbon materials such as graphite, carbon black, acetylene black and ketjen black. These materials are used singly or in admixture of plural kinds thereof. The conductive agent may be a metal material or a conductive polymer material or the like so far as it is a material having conductivity.

Examples of the binder include synthetic rubbers such as a styrene butadiene based rubber, a fluorocarbon based rubber and an ethylene propylene diene based rubber; and polymer materials such as polyvinylidene fluoride. These materials may be used singly or in admixture of plural kinds thereof.

For example, the negative electrode 22 is one in which a negative electrode active material layer 22B is provided on the both surfaces of a negative electrode collector 22A having a pair of surfaces opposing to each other. However, the negative electrode active material layer 22B may be provided on only one surface of the negative electrode collector 22A.

The negative electrode collector 22A is constituted of a metal material, for example, copper, nickel, stainless steel, etc. It is preferable that the surface of this negative electrode collector 22A is roughed. This is because adhesion between the negative electrode collector 22A and the negative electrode active material layer 22B is enhanced due to a so-called anchor effect. In that case, the surface of the negative electrode collector 22A may be roughed in at least a region opposing to the negative electrode active material layer 22B. Examples of a method for achieving roughing include a method for forming fine particles by an electrolysis treatment. The electrolysis treatment as referred to herein is a method in which fine particles are formed on the surface of the negative electrode collector 22A in an electrolysis vessel by means of electrolysis, thereby providing recesses and projections. A copper foil which is prepared by the electrolysis, including the copper foil having been roughed by this electrolysis treatment, is generally named as "electrolytic copper foil".

The negative electrode active material layer 22B contains, as a negative electrode active material, one or two or more kinds of a negative electrode material capable of intercalating and deintercalating lithium and may contain other materials such as a binder and a conductive agent, if desired. Details regarding the binder and the conductive agent are, for example, the same as those in the case of explaining the positive electrode 21. Also, it is preferable that the charge capacity of the negative electrode material capable of intercalating and deintercalating lithium is larger than that by the positive electrode active material. This is because a possibility that lithium is deposited as a dendrite on the negative electrode 22 even at the time of full charge is low.

Examples of the negative electrode material capable of intercalating and deintercalating lithium include carbon materials. Examples of such a carbon material include easily graphitized carbon, hardly graphitized carbon with a (002) plane interval of 0.37 nm or more and graphite with a (002) plane interval of not more than 0.34 nm. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtainable, excellent cycle characteristics are obtainable, and the carbon material also functions as a conductive agent. The shape of the carbon material may be any of a fibrous shape, a spherical shape, a granular shape or a flaky shape.

In addition to the above, as the negative electrode material capable of intercalating and deintercalating lithium, a material which is capable of intercalating and deintercalating lithium and which contains, as a constituent element, at least one member selected from the group consisting of metal elements and semi-metal elements is also exemplified. This is because a high energy density is obtainable. Such a negative electrode material may be a simple substance, an alloy or a compound of a metal element or a semi-metal element. Also, one having one kind or two or more kinds of a phase in at least a part thereof may be used. The "alloy" as referred to herein includes, in addition to alloys composed of two or more kinds of a metal element, alloys containing one or more kinds of a metal element and one or more kinds of a semi-metal element. Also, the "alloy" may contain a non-metal element. Examples of its texture include a solid solution, a eutectic (eutectic mixture), an intermetallic compound and one in which two or more kinds thereof coexist.

Examples of the metal element or semi-metal element include a metal element or a semi-metal element capable of forming an alloy together with lithium. Specific examples thereof include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). Examples of the material containing, as a constituent element, at least one member of such metal element and semi-metal element include an alloy or a compound of such a metal element or semi-metal element. Specific examples thereof include compounds represented by chemical formulae: $Ma_sMb_tLi_u$ (wherein values of s, t and u are satisfied with the relationships of $s>0$, $t \geq 0$ and $u \geq 0$, respectively) and $Ma_pMc_qMd_r$ (wherein values of p, q and r are satisfied with the relationships of $p>0$, $q>0$ and $r \geq 0$, respectively). In the foregoing chemical formulae, Ma represents at least one member selected from the group consisting of metal elements and semi-metal elements each capable of forming an alloy together with lithium; Mb represents at least one member selected from the group consisting of metal elements and semi-metal elements other than lithium and Ma; Mc represents at least one non-metal element; and Md represents at least one member selected from the group consisting of metal elements and semi-metal elements other than Ma. These materials may be crystalline or amorphous.

As the negative electrode material which is constituted of a metal element or a semi-metal element capable of forming an alloy together with lithium, materials containing, as a constituent element, at least one member selected from metal elements and semi-metal elements belonging to the Group 14 in the long form of the periodic table are preferable; and materials containing, as a constituent element, at least one member of silicon and tin are especially preferable. This is because in such a material, a capability for intercalating and deintercalating lithium is large, and therefore, a high energy density is obtainable.

Examples of the negative electrode material containing at least one member of silicon and tin include a simple substance, an alloy or a compound of silicon; a simple substance, an alloy or a compound of tin; and a material having one or two or more kinds of a phase in at least a part thereof.

Examples of the alloyed silicon include alloys containing, as a second constituent element other than silicon, at least one member selected from the group consisting of tin, nickel, copper, iron, cobalt, manganese, zinc, indium, silver, titanium, germanium, bismuth, antimony (Sb) and chromium. Examples of the silicon compound include compounds containing oxygen or carbon (C), and these compounds may contain, in addition to silicon, the foregoing second constituent element. Examples of the alloyed silicon or silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v \leq 2$) and LiSiO.

Examples of the alloyed tin include alloys containing, as a second constituent element other than tin, at least one member selected from the group consisting of silicon, nickel, copper, iron, cobalt, manganese, zinc, indium, silver, titanium, germanium, bismuth, antimony and chromium. Examples of the tin compound include compounds containing oxygen or carbon, and these compounds may contain, in addition to tin, the foregoing second constituent element. Examples of the alloyed tin or tin compound include $SnO_w$ ($0<w \leq 2$), $SnSiO_3$, LiSnO and $Mg_2Sn$.

As the negative electrode material containing at least one member of silicon and tin, for example, a material containing tin as a first constituent element and in addition to this, second and third constituent elements is especially preferable. The second constituent element is at least one member selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth and silicon. The third constituent element is at least one member selected from the group consisting of boron, carbon, aluminum and phosphorus (P). This is because in view of the fact that the second and third constituent elements are contained, cycle characteristics are enhanced.

Above of all, the negative electrode material is preferably an SnCoC-containing material containing tin, cobalt and carbon as constituent elements and having a content of carbon of 9.9% by mass or more and not more than 29.7% by mass and a proportion of cobalt to the total sum of tin and cobalt (Co/(Sn+Co)) of 30% by mass or more and not more than 70% by mass. This is because a high energy density is obtainable in the foregoing composition range.

This SnCoC-containing material may further contain other constituent elements, if desired. As other constituent elements, for example, silicon, iron, nickel, chromium, indium, niobium, germanium, titanium, molybdenum, aluminum, phosphorus, gallium and bismuth are preferable. The SnCoC-containing material may contain two or more kinds of these elements. This is because higher effects are obtainable.

The SnCoC-containing material has a phase containing tin, cobalt and carbon, and this phase is preferably a lowly crystalline or amorphous phase. This phase is a reaction phase which is reactive with lithium, and excellent cycle characteristics are obtainable by this phase. In the case of using CuKα-rays as specified X-rays and defining a sweep rate at 1°/min, a half width value of a diffraction peak obtained by X-ray diffraction of this phase is preferably 1.0° or more in terms of a diffraction angle 2θ. This is because not only lithium is more smoothly intercalated and deintercalated, but the reactivity with an electrolyte is reduced.

Whether or not the diffraction peak obtained by the X-ray diffraction is corresponding to the reaction phase which is reactive with lithium can be easily determined by comparing an X-ray diffraction chart before and after an electrochemical reaction with lithium. For example, when a position of the diffraction peak changes before and after the electrochemical reaction with lithium, it is determined that the diffraction peak is corresponding to the reaction phase which is reactive with lithium. In that case, for example, a diffraction peak of a lowly crystalline or amorphous reaction phase is observed in the range of from 20° and 50° in terms of 2θ. This lowly crystalline or amorphous reaction phase contains, for example, the foregoing respective constituent elements, and it may be considered that this phase is lowly crystallized or amorphized chiefly by carbon.

There may be the case where the SnCoC-containing material has, in addition to the lowly crystalline or amorphous phase, a phase containing a simple substance or a part of each of the constituent elements.

In particular, in the SnCoC-containing material, it is preferable that at least a part of carbon as the constituent element is bonded to the metal element or semi-metal element as other constituent element. This is because cohesion or crystallization of tin or the like is suppressed.

Examples of a measurement method for examining the bonding state of elements include X-ray photoelectron spectroscopy (XPS). This XPS is a method in which soft X-rays (using Al-Kα rays or Mg-Kα rays in commercially available units) are irradiated on the surface of a sample, and kinetic energy of photoelectrons which fly out from the sample surface are measured, thereby examining an element composition and a bonding state of elements in a region of several nm from the sample surface.

The bound energy of an inner orbital electron of an element changes in correlation with a charge density on the element from the standpoint of primary approximation. For example, in the case where the charge density of a carbon element is reduced due to an interaction with an element existing in the vicinity of the carbon element, an outer electron such as a 2p electron is reduced, and therefore, a 1s electron of the carbon element receives a strong constraining force from the shell. That is, when the charge density of an element is reduced, the bound energy becomes high. In XPS, when the bound energy increases, a peak is shifted into a high energy region.

In XPS, so far as graphite is concerned, a peak of a 1s orbit of carbon (C1s) appears at 284.5 eV in a unit in which the energy is calibrated such that a peak of a 4f orbit of a gold atom (Au4f) is obtained at 84.0 eV. Also, so far as the surface contamination carbon is concerned, the peak of C1s appears at 284.8 eV. On the contrary, in the case where the charge density of the carbon element becomes high, for example, when bonded to a more positive element than carbon, the peak of C1s appears in a lower region than 284.5 eV. That is, in the case where at least a part of carbons contained in the SnCoC-containing material is bonded to a metal element or a semi-metal element as other constituent element or the like, a peak of a composite wave of C1s obtained regarding the SnCoC-containing material appears in a lower region than 284.5 eV.

In the case of carrying out the XPS measurement, it is preferable that in covering the surface by the surface contamination carbon, the surface is lightly sputtered by an argon ion gun attached to the XPS unit. Also, in the case where the SnCoC-containing material to be measured exists in the negative electrode 22, it would be better that after taking apart the secondary battery, the negative electrode 22 is taken out and then rinsed with a volatile solvent such as dimethyl carbonate. This is made for the purpose of removing a solvent with low volatility and an electrolyte salt existing on the surface of the negative electrode 22. It is desirable that their sampling is carried out in an inert atmosphere.

Also, in the XPS measurement, for example, the peak of C1s is used for correcting the energy axis of a spectrum. In general, since the surface contamination carbon exists on the material surface, the peak of C1s of the surface contamination carbon is fixed at 284.8 eV and employed as an energy reference. In the) XPS measurement, the waveform of the peak of C1s is obtained as a form including the peak of the surface contamination carbon and the peak of carbon in the SnCoC-containing material, and therefore, the peak of the surface contamination carbon and the peak of carbon in the SnCoC-containing material are separated by, for example, analysis using a commercially available software program. In the analysis of the waveform, a position of a main peak existing on the lowest bound energy side is employed as an energy reference (284.8 eV).

This SnCoC-containing material can be formed by, for example, melting a mixture obtained by mixing raw materials of the respective constituent elements in an electric furnace, a high frequency induction furnace, an arc furnace, etc. and then solidifying the melt. Also, various atomizing methods such as gas atomization and water atomization, various rolling methods or methods utilizing a mechanochemical reaction such as a mechanical alloying method and a mechanical milling method may be adopted. Of these, a method utilizing a mechanochemical reaction is preferable. This is because the SnCoC-containing material is converted so as to have a lowly crystalline or amorphous structure. In the method utilizing a mechanochemical reaction, for example, a planetary ball mill unit or a manufacturing unit such as an attritor can be used.

For the raw material, though a simple substance of the respective constituent elements may be mixed, it is preferable to use an alloy with respect to a part of the constituent elements other than carbon. This is because by adding carbon to such an alloy and synthesizing the raw material by a method utilizing a mechanical alloying method, a lowly crystalline or amorphous structure is obtained, and the reaction time is shortened, too. The form of the raw material may be a powder or a block.

In addition to this SnCoC-containing material, an SnCoFeC-containing material having tin, cobalt, iron and carbon as constituent elements is also preferable. A composition of this SnCoFeC-containing material can be arbitrarily set up. For example, in the case where a content of iron is set up low, a composition in which a content of carbon is 9.9% by mass or more and not more than 29.7% by mass, a content of iron is 0.3% by mass or more and not more than 5.9% by mass, and a proportion of cobalt to the total sum of tin and cobalt (Co/(Sn+Co)) is 30% by mass or more and not more than 70% by mass is preferable. Also, for example, in the case where a content of iron is set up high, a composition in which a content of carbon is 11.9% by mass or more and not more than 29.7% by mass, a proportion of the total sum of cobalt and iron to the total sum of tin, cobalt and iron ((Co+Fe)/(Sn+Co+Fe)) is 26.4% by mass or more and not more than 48.5% by mass, and a proportion of cobalt to the total sum of cobalt and iron (Co/(Co+Fe)) is 9.9% by mass or more and not more than 79.5% by mass is preferable. This is because a high energy density is obtainable in the foregoing composition range. The crystallinity, measurement method of the bonding state of elements and formation method of this SnCoFeC-containing material and the like are the same as in the foregoing SnCoC-containing material.

The negative electrode active material layer 22B using, as a negative electrode material capable of intercalating and deintercalating lithium, a simple substance, an alloy or a compound of silicon, a simple substance, an alloy or a compound of tin or a material containing one or two or more kinds of phases thereof in at least a part thereof is formed by, for example, a vapor phase method, a liquid phase method, a spraying method, a coating method, a baking method or a combined method of two or more kinds of these methods. In that case, it is preferable that the negative electrode collector 22A and the negative electrode active material layer 22B are alloyed on at least a part of the interface therebetween. In detail, on the interface between the both, the constituent elements of the negative electrode collector 22A may be diffused into the negative electrode active material layer 22B, the constituent elements of the negative electrode active material layer 22B may be diffused into the negative electrode collector 22A, or these constituent elements may be mutually diffused. This is because not only breakage to be caused due to expansion and shrinkage of the negative electrode active material layer 22B at the time of charge and discharge can be suppressed, and electron conductivity between the negative electrode collector 22A and the negative electrode active material layer 22B is enhanced.

Examples of the vapor phase method include a physical deposition method and a chemical deposition method, specifically a vacuum vapor deposition method, a sputtering method, an ion plating method, a laser abrasion method, a thermal chemical vapor deposition (CVD) method and a plasma chemical vapor deposition method. As the liquid phase method, known techniques such as electrolytic plating and non-electrolytic plating can be adopted. The coating method as referred to herein is, for example, a method in which after mixing a granular negative electrode active material with a binder and the like, the mixture is dispersed in a solvent and coated. The baking method as referred to herein is, for example, a method in which after coating by a coating method, the coated material is heat treated at a higher temperature than a melting point of the binder, etc. As to the baking method, known techniques can be utilized, too, and examples thereof include an atmospheric baking method, a reaction baking method and a hot press baking method.

Also, examples of the negative electrode material capable of intercalating and deintercalating lithium include metal oxides and polymer compounds capable of intercalating and deintercalating lithium. Examples of the metal oxide include iron oxide, ruthenium oxide and molybdenum oxide; and examples of the polymer compound include polyacetylene, polyaniline and polypyrrole.

As a matter of course, the negative electrode material capable of intercalating and deintercalating lithium may be a material other than those described above. Also, the foregoing series of negative electrode materials may be a mixture of two or more kinds thereof in an arbitrary combination.

The negative electrode active material made of the foregoing negative electrode material is composed of plural granules. That is, the negative electrode active material layer 22B has plural negative electrode active material particles, and the negative electrode active material particle is formed by, for example, the foregoing vapor phase method, etc. However, the negative electrode active material particle may be formed by a method other than the vapor phase method.

In the case where the negative electrode active material particle is formed by a deposition method such as a vapor phase method, the negative electrode active material particle may have a single-layered structure formed through a single deposition step, or may have a multilayered structure formed through plural deposition steps. However, in the case where the negative electrode active material particle is formed by a vapor deposition method accompanied with high heat at the time of deposition, it is preferable that the negative electrode active material particle has a multilayered structure. This is because when the deposition step of the negative electrode material is carried out in a divided manner of plural times (the negative electrode material is successively formed thin and deposited), the time when the negative electrode collector 22A is exposed at high temperatures becomes short, and a thermal damage is hardly given as compared with the case of carrying out the deposition step once.

For example, this negative electrode active material particle grows in a thickness direction of the negative electrode active material layer 22B from the surface of the negative electrode collector 22A and is connected to the negative electrode collector 22A in a root thereof. In that case, it is preferable that the negative electrode active material particle is formed by a vapor phase method and alloyed on at least a part of the interface with the negative electrode collector 22A as described previously. In detail, on the interface between the both, the constituent elements of the negative electrode collector 22A may be diffused into the negative electrode active material particle, the constituent elements of the negative electrode active material particle may be diffused into the negative electrode collector 22A, or the constituent elements of the both may be mutually diffused.

In particular, it is preferable that the negative electrode active material layer 22B has an oxide-containing film for coating the surface of the negative electrode active material particle (region coming into contact with the electrolytic solution), if desired. This is because the oxide-containing film functions as a protective film against the electrolytic solution, and even when charge and discharge are repeated, a decomposition reaction of the electrolytic solution is suppressed, and therefore, the cycle characteristics are enhanced. This oxide-containing film may coat a part or the whole of the surface of the negative electrode active material particle.

This oxide-containing film contains an oxide of a metal element or a semi-metal element. Examples of the oxide of a metal element or a semi-metal element include oxides of aluminum, silicon, zinc, germanium, tin or the like. Of these, it is preferable that the oxide-containing film contains an oxide of at least one member selected from the group consisting of silicon, germanium and tin; and it is especially preferable that the oxide-containing film contains an oxide of silicon. This is because not only it is easily coated over the entire surface of the negative electrode active material particle, but an excellent protective function is obtainable. As a matter of course, the oxide-containing film may contain an oxide other than those described above.

This oxide-containing film is, for example, formed using one or two or more kinds of a method including a vapor phase method and a liquid phase method. In that case, examples of the vapor phase method include a vapor deposition method, a sputtering method and a CVD method; and examples of the liquid phase method include a liquid phase deposition method, a sol-gel method, a polysilazane method, an electrodeposition method, a coating method and a dip coating method. Of these, a liquid phase method is preferable, and a liquid phase deposition method is more preferable. This is because the surface of the negative electrode active material particle can be easily coated over a wide range thereof. In the liquid phase deposition method, first of all, in a solution containing not only a fluoride complex of a metal element or a semi-metal element and, as an anion scavenger, a solution species which is easy to coordinate to a fluoride ion, the fluoride ion generated from the fluoride complex is scavenged by the anion scavenger, thereby depositing an oxide of the metal element or semi-metal element so as to coat the surface of the negative electrode active material particle. Thereafter, an oxide-containing film is formed by washing with water and Chemical Formula (19)

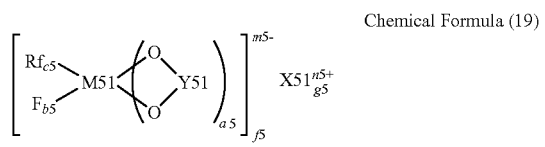

In the chemical formula (19), X51 represents an element belonging to the Group 1 or an element belonging to the Group 2 in the long form of the periodic table; M51 represents a transition metal element or an element belonging to the Group 13, an element belonging to the Group 14 or an element belonging to the Group 15 in the long form of the periodic table; Rf represents a fluorinated alkyl group or a fluorinated aryl group each having from 1 to 10 carbon atoms; Y51 represents $-OC-(C(R51)_2)_{d5}-CO-$, $-(R52)_2C-(C(R51)_2)_{d5}-CO-$, $-(R52)_2C-(C(R51)_2)_{d5}-C(R52)_2-$, $-(R52)_2C-(C(R51)_2)_{d5}-SO_2-$, $-O_2S-(C(R51)_2)_{e5}-SO_2-$ or $-OC-(C(R51)_2)_{e5}-SO_2-$; R51 represents a hydrogen group, an alkyl group, a halogen group or a halogenated alkyl group; R52 represents a hydrogen group, an alkyl group, a halogen group or a halogenated alkyl group, provided that at least one of every R52 is halogen group or a halogenated alkyl group; each of a5, f5 and n5 represents 1 or 2; each of b5, c5 and e5 represents an integer of from 1 to 4; d5 represents an integer of from 0 to 4; and each of g5 and m5 represents an integer of from 1 to 3.

The element belonging to the Group 1 in the long form of the periodic table as referred to herein is hydrogen, lithium, sodium, potassium, rubidium, cesium or francium. The element belonging to the Group 2 in the long form of the periodic table as referred to herein is beryllium, magnesium, calcium, strontium, barium or radium. The element belonging to the Group 13 in the long form of the periodic table as referred to herein is boron, aluminum, gallium, indium or thallium. The element belonging to the Group 14 in the long form of the periodic table as referred to herein is carbon, silicon, germanium, tin or lead. The element belonging to the Group 15 in the long form of the periodic table as referred to herein is nitrogen, phosphorus, arsenic, antimony or bismuth.

Examples of the compound represented by the chemical formula (17) include compounds represented by (1) to (6) of the following chemical formula (20). Examples of the compound represented by the chemical formula (18) include compounds represented by (1) to (8) of the following chemical formula (21). Examples of the compound represented by the chemical formula (19) include a compound represented by the following chemical formula (22). Of these, the compound represented by (6) of the chemical formula (20) is preferable. This is because high effects are obtainable. Needless to say, the compound is not limited to the compounds represented by the chemical formulae (20) to (22) so far as it is a compound having any one of the structures represented by the chemical formulae (17) to (19).

Chemical Formula (20)

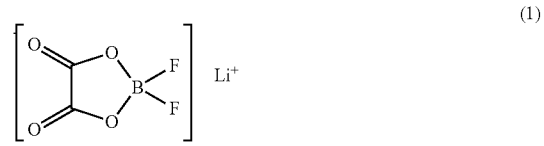

(1)

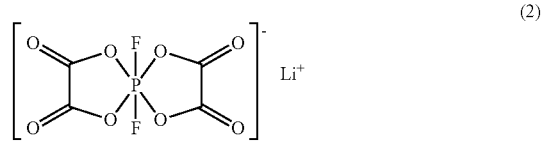

(2)

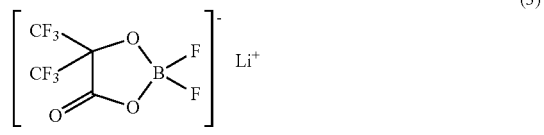

(3)

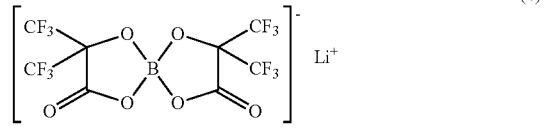

(4)

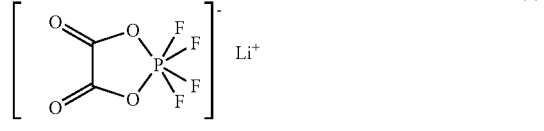

(5)

-continued (6)
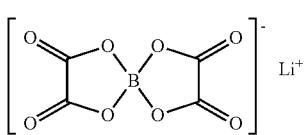

Chemical Formula (21)

(1)
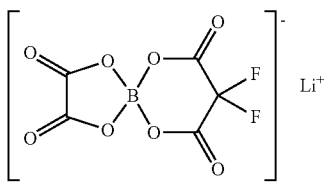

(2)
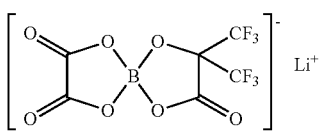

(3)
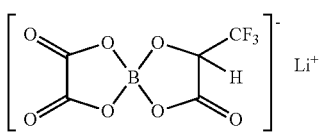

(4)
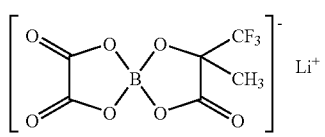

(5)
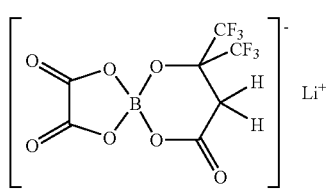

(6)
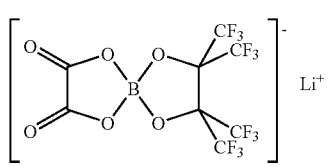

(7)
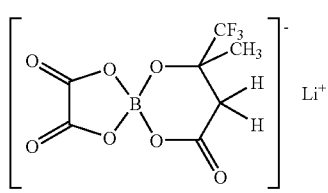

(8)
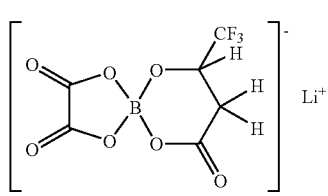

-continued

Chemical Formula (22)

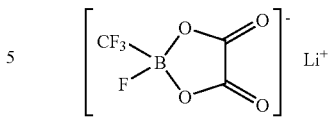

Also, the electrolyte salt preferably contains at least one member selected from the group consisting of compounds represented by the following chemical formulae (23) to (25). This is because in the case where such a compound is used together with the foregoing lithium hexafluorophosphate or the like, higher effects are obtainable. In the chemical formula (23), m and n may be the same as or different from each other. The same is also applicable to p, q and r in the chemical formula (25).

$$LiN(C_mF_{2m+1}SO_2)(C_nF_{2n+1}SO_2)$$ Chemical Formula (23)

In the chemical formula (23), each of m and n represents an integer of 1 or more.

Chemical Formula (24)

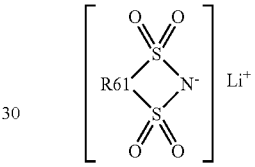

In the chemical formula (24), R61 represents a linear or branched perfluoroalkylene group having 2 or more and not more than 4 carbon atoms.

$$LiC(C_pF_{2p+1}SO_2)(C_qF_{2q+1}SO_2)(C_rF_{2r+1}SO_2)$$ Chemical Formula (25)

In the chemical formula (25), each of p, q and r represents an integer of 1 or more.

Examples of the chain compound represented by the foregoing chemical formula (23) include lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)) and lithium (trifluoromethanesulfonyl)(nonafluorobutanesulfonyl)imide (LiN(CF$_3$SO$_2$)(C$_4$F$_9$SO$_2$)). These may be used singly or in admixture of plural kinds thereof. Of these, lithium bis(trifluoromethanesulfonyl)imide is preferable. This is because high effects are obtainable.

Examples of the cyclic compound represented by the foregoing chemical formula (24) include a series of compounds represented by the following formula (26). That is, examples include lithium 1,2-perfluoroethanedisulfonylimide represented by (1) in the following chemical formula (26), lithium 1,3-perfluoropropanedisulfonylimide represented by (2) in the following chemical formula (26), lithium 1,3-perfluorobutanedisulfonylimide represented by (3) in the following chemical formula (26) and lithium 1,4-perfluorobutanedisulfonylimide represented by (4) in the following chemical formula (26). These may be used singly or in admixture of plural kinds thereof. Of these, lithium 1,3-perfluoropropanedisulfonylimide is preferable. This is because high effects are obtainable.

Chemical Formula (26)

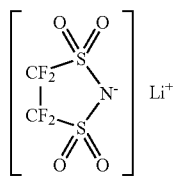 (1)

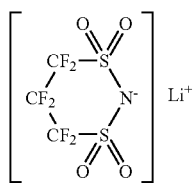 (2)

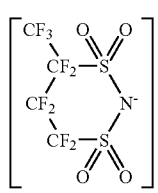 (3)

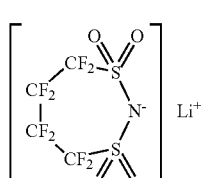 (4)

Examples of the chain compound represented by the foregoing chemical formula (25) include lithium tris(trifluoromethanesulfonyl)methide ($LiC(CF_3SO_2)_3$). The content of the electrolyte salt is preferably 0.3 moles/kg or more and not more than 3.0 moles/kg relative to the solvent. This is because when the content of the electrolyte salt falls outside this range, there is a possibility that the ionic conductivity is extremely lowered.

Next, the use examples of the foregoing nonaqueous electrolyte are described below. Here, when as a secondary battery, an example of the electrochemical device is made hereof by reference, the nonaqueous electrolyte is used in the following manner.

(First Secondary Battery)

Each of FIGS. 1 and 2 shows a sectional configuration of a first secondary battery, in which FIG. 2 shows enlargedly a part of a wound electrode body 20 in the secondary battery shown in FIG. 1. This battery is, for example, a lithium ion secondary battery in which the capacity of a negative electrode is expressed on the basis of intercalation and deintercalation of lithium as an electrode reactant.

This secondary battery is one in which a wound electrode body 20 having a positive electrode 21 and a negative electrode 22 wound therein via a separator 23 and a pair of insulating plates 12 and 13 are mainly housed in the inside of a battery can 11 in a substantially hollow column shape. The battery structure using this columnar battery can 11 is called a cylindrical type.

For example, the battery can 11 has a hollow structure in which one end thereof is closed, with the other end being opened and is constituted of a metal material such as iron or aluminum or an alloy thereof. In the case where the battery can 11 is constituted of iron, it may be plated with, for example, nickel, etc. The pair of insulating plates 12 and 13 is respectively disposed such that they interpose the wound electrode body 20 vertically therebetween and extend perpendicular to the winding peripheral face thereof.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed. The battery lid 14 is constituted of, for example, a metal material the same as that in the battery can 11. The safety valve mechanism 15 is electrically connected to the battery lid 14 via the positive temperature coefficient device 16. In the case where the pressure in the inside of the battery reaches a fixed value or more due to an internal short circuit or heating from the outside or the like, a disc plate 15A is reversed, whereby electrical connection between the battery lid 14 and the wound electrode body 20 is disconnected. The positive temperature coefficient device 16 controls the current due to an increase of the resistance in response to an increase of the temperature, thereby preventing abnormal heat generation to be caused due to a large current. The gasket 17 is constituted of, for example, an insulating material, and asphalt is coated on the surface thereof.

A center pin 24 may be inserted on the center of the wound electrode body 20. In the wound electrode body 20, a positive electrode lead 25 made of a metal material, for example, aluminum, etc. is connected to the positive electrode 21; and a negative electrode lead 26 made of a metal material, for example, nickel, etc. is connected to the negative electrode 22. The positive electrode lead 25 is electrically connected to the battery lid 14 by means of welding with the safety valve mechanism 15; and the negative electrode lead 26 is electrically connected to the battery can 11 by means of welding.

For example, the positive electrode 21 is one in which a positive electrode active material layer 21B is provided on the both surfaces of a positive electrode collector 21A having a pair of surfaces opposing to each other. However, the positive electrode active material layer 21B may be provided on only one surface of the positive electrode collector 21A.

The positive electrode collector 21A is constituted of a metal material, for example, aluminum, nickel, stainless steel, etc.

The positive electrode active material layer 21B contains, as a positive electrode active material, one or two or more positive electrode materials capable of intercalating and deintercalating lithium and may further contain other materials such as a binder and a conductive agent, if desired.

As the positive electrode material capable of intercalating and deintercalating lithium, for example, a lithium-containing compound is preferable. This is because a high energy density is obtainable. Examples of this lithium-containing compound include a complex oxide containing lithium and a transition metal element and a phosphate compound containing lithium and a transition metal element. Of these, a compound containing at least one of cobalt, nickel, manganese and iron is preferable as a transition metal element. This is because a higher voltage is obtainable. A chemical formula thereof is represented by, for example, $Li_xM1O_2$ or $Li_yM2PO_4$. In the formulae, each of M1 and M2 represents one or more kinds of a transition metal element; and values of x and y vary depending upon the charge and discharge state and are usually satisfied with the relationships of ($0.05 \leq x \leq 1.10$) and ($0.05 \leq y \leq 1.10$).

Examples of the complex oxide containing lithium and a transition metal element include a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_xNi_{(1-v-w)}Co_vMn_wO_2$ ((v+w)<1)), a lithium manganese complex oxide having a spinel type structure ($LiMn_2O_4$) and a lithium manganese nickel complex oxide ($LiMn_{2-t}Ni_tO_4$ (t<2)). Of these, cobalt-containing complex oxides are preferable. This is because not only a high capacity is obtainable, but excellent cycle characteristics are obtainable. Also, examples of the phosphate compound containing lithium and a transition metal element include a lithium iron phosphate compound ($LiFePO_4$) and a lithium iron manganese phosphate compound ($LiFe_{1-u}Mn_uPO_4$ (u<1)).

Moreover, in view of the fact that higher electrode filling properties and cycle characteristic are obtainable, a complex particle obtained by coating the surface of a core particle composed of any one of lithium-containing compounds represented by the following general formulae (1) to (5) by a fine particle composed of any one of other lithium-containing compounds is also useful.

$$Li_fCo_{(1-g)}M1_gO_{(2-h)}F_j \quad (1)$$

In the general formula (1), M1 represents at least one member selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and values of f, g, h and j are satisfied with the relationships of ($0.8 \leq f \leq 1.2$), ($0 \leq g < 0.5$), ($-0.1 \leq h \leq 0.2$) and ($0 \leq j \leq 0.1$). The composition of lithium varies depending upon the charge and discharge state, and the value of f represents a value in the complete discharge state.

$$Li_kMn_{(1-m-n)}Ni_mM2_nO_{(2-p)}F_q \quad (2)$$

In the general formula (2), M2 represents at least one member selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W); and values of k, m, n, p and q are satisfied with the relationships of ($0.8 \leq k \leq 1.2$), ($0 < m < 0.5$), ($0 \leq n \leq 0.5$), ((m+n)<1), ($-0.1 \leq p \leq 0.2$) and ($0 \leq q \leq 0.1$). The composition of lithium varies depending upon the charge and discharge state, and the value of k represents a value in the complete discharge state.

$$Li_rNi_{(1-s)}M3_sO_{(2-t)}F_u \quad (3)$$

In the general formula (3), M3 represents at least one member selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and values of r, s, t and u are satisfied with the relationships of ($0.8 \leq r \leq 1.2$), ($0.005 \leq s \leq 0.5$), ($-0.1 \leq t \leq 0.2$) and ($0 \leq u \leq 0.1$). The composition of lithium varies depending upon the charge and discharge state, and the value of r represents a value in the complete discharge state.

$$Li_vMn_{2-w}M4_wO_xF_y \quad (4)$$

In the general formula (4), M4 represents at least one member selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and v, w, x and y are satisfied with the relationships of ($0.9 \leq v \leq 1.1$), ($0 \leq w \leq 0.6$), ($3.7 \leq x \leq 4.1$) and ($0 \leq y \leq 0.1$). The composition of lithium varies depending upon the charge and discharge state, and the value of v represents a value in the complete discharge state.

$$Li_zM5PO_4 \quad (5)$$

In the general formula (5), M5 represents at least one member selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr); and z represents a value satisfied with the relationship of ($0.9 \leq z \leq 1.1$). The composition of lithium varies depending upon the charge and discharge state, and the value of z represents a value in the complete discharge state.

Besides, examples of the positive electrode material capable of intercalating and deintercalating lithium include oxides such as titanium oxide, vanadium oxide and manganese dioxide; disulfides such as titanium disulfide and molybdenum sulfide; chalcogenides such as niobium selenide; sulfur; and conductive polymers such as polyaniline and polythiophene.

As a matter of course, the positive electrode material capable of intercalating and deintercalating lithium may be other material than those described above. Also, the foregoing series of positive electrode materials may be a mixture of two or more kinds thereof in an arbitrary combination.

Examples of the conductive agent include carbon materials such as graphite, carbon black, acetylene black and ketjen black. These materials are used singly or in admixture of plural kinds thereof. The conductive agent may be a metal material or a conductive polymer material or the like so far as it is a material having conductivity.

Examples of the binder include synthetic rubbers such as a styrene butadiene based rubber, a fluorocarbon based rubber and an ethylene propylene diene based rubber; and polymer materials such as polyvinylidene fluoride. These materials may be used singly or in admixture of plural kinds thereof.

For example, the negative electrode 22 is one in which a negative electrode active material layer 22B is provided on the both surfaces of a negative electrode collector 22A having a pair of surfaces opposing to each other. However, the negative electrode active material layer 22B may be provided on only one surface of the negative electrode collector 22A.

The negative electrode collector 22A is constituted of a metal material, for example, copper, nickel, stainless steel, etc. It is preferable that the surface of this negative electrode collector 22A is roughed. This is because adhesion between the negative electrode collector 22A and the negative electrode active material layer 22B is enhanced due to a so-called anchor effect. In that case, the surface of the negative electrode collector 22A may be roughed in at least a region opposing to the negative electrode active material layer 22B. Examples of a method for achieving roughing include a method for forming fine particles by an electrolysis treatment. The electrolysis treatment as referred to herein is a method in which fine particles are formed on the surface of the negative electrode collector 22A in an electrolysis vessel by means of electrolysis, thereby providing recesses and projections. A copper foil which is prepared by the electrolysis, including the copper foil having been roughed by this electrolysis treatment, is generally named as "electrolytic copper foil".

The negative electrode active material layer 22B contains, as a negative electrode active material, one or two or more kinds of a negative electrode material capable of intercalating and deintercalating lithium and may contain other materials such as a binder and a conductive agent, if desired. Details regarding the binder and the conductive agent are, for example, the same as those in the case of explaining the positive electrode 21. Also, it is preferable that the charge capacity of the negative electrode material capable of intercalating and deintercalating lithium is larger than that by the positive electrode active material. This is because a possibility that lithium is deposited as a dendrite on the negative electrode 22 even at the time of full charge is low.

Examples of the negative electrode material capable of intercalating and deintercalating lithium include carbon materials. Examples of such a carbon material include easily graphitized carbon, hardly graphitized carbon with a (002) plane interval of 0.37 nm or more and graphite with a (002) plane interval of not more than 0.34 nm. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtainable, excellent cycle characteristics are obtainable, and the carbon material also functions as a conductive agent. The shape of the carbon material may be any of a fibrous shape, a spherical shape, a granular shape or a flaky shape.

In addition to the above, as the negative electrode material capable of intercalating and deintercalating lithium, a material which is capable of intercalating and deintercalating lithium and which contains, as a constituent element, at least one member selected from the group consisting of metal elements and semi-metal elements is also exemplified. This is because a high energy density is obtainable. Such a negative electrode material may be a simple substance, an alloy or a compound of a metal element or a semi-metal element. Also, one having one kind or two or more kinds of a phase in at least a part thereof may be used. The "alloy" as referred to herein includes, in addition to alloys composed of two or more kinds of a metal element, alloys containing one or more kinds of a metal element and one or more kinds of a semi-metal element. Also, the "alloy" may contain a non-metal element. Examples of its texture include a solid solution, a eutectic (eutectic mixture), an intermetallic compound and one in which two or more kinds thereof coexist.

Examples of the metal element or semi-metal element include a metal element or a semi-metal element capable of forming an alloy together with lithium. Specific examples thereof include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). Examples of the material containing, as a constituent element, at least one member of such metal element and semi-metal element include an alloy or a compound of such a metal element or semi-metal element. Specific examples thereof include compounds represented by chemical formulae: $Ma_sMb_tLi_u$ (wherein values of s, t and u are satisfied with the relationships of $s>0$, $t \geq 0$ and $u \geq 0$, respectively) and $Ma_pMc_qMd_r$ (wherein values of p, q and r are satisfied with the relationships of $p>0$, $q>0$ and $r \geq 0$, respectively). In the foregoing chemical formulae, Ma represents at least one member selected from the group consisting of metal elements and semi-metal elements each capable of forming an alloy together with lithium; Mb represents at least one member selected from the group consisting of metal elements and semi-metal elements other than lithium and Ma; Mc represents at least one non-metal element; and Md represents at least one member selected from the group consisting of metal elements and semi-metal elements other than Ma. These materials may be crystalline or amorphous.

As the negative electrode material which is constituted of a metal element or a semi-metal element capable of forming an alloy together with lithium, materials containing, as a constituent element, at least one member selected from metal elements and semi-metal elements belonging to the Group 14 in the long form of the periodic table are preferable; and materials containing, as a constituent element, at least one member of silicon and tin are especially preferable. This is because in such a material, a capability for intercalating and deintercalating lithium is large, and therefore, a high energy density is obtainable.

Examples of the negative electrode material containing at least one member of silicon and tin include a simple substance, an alloy or a compound of silicon; a simple substance, an alloy or a compound of tin; and a material having one or two or more kinds of a phase in at least a part thereof.

Examples of the alloyed silicon include alloys containing, as a second constituent element other than silicon, at least one member selected from the group consisting of tin, nickel, copper, iron, cobalt, manganese, zinc, indium, silver, titanium, germanium, bismuth, antimony (Sb) and chromium. Examples of the silicon compound include compounds containing oxygen or carbon (C), and these compounds may contain, in addition to silicon, the foregoing second constituent element. Examples of the alloyed silicon or silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\ 2$) and $LiSiO$.

Examples of the alloyed tin include alloys containing, as a second constituent element other than tin, at least one member selected from the group consisting of silicon, nickel, copper, iron, cobalt, manganese, zinc, indium, silver, titanium, germanium, bismuth, antimony and chromium. Examples of the tin compound include compounds containing oxygen or carbon, and these compounds may contain, in addition to tin, the foregoing second constituent element. Examples of the alloyed tin or tin compound include $SnO_w$ ($0<w \leq 2$), $SnSiO_3$, $LiSnO$ and $Mg_2Sn$.

As the negative electrode material containing at least one member of silicon and tin, for example, a material containing tin as a first constituent element and in addition to this, second and third constituent elements is especially preferable. The second constituent element is at least one member selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth and silicon. The third constituent element is at least one member selected from the group consisting of boron, carbon, aluminum and phosphorus (P). This is because in view of the fact that the second and third constituent elements are contained, cycle characteristics are enhanced.

Above of all, the negative electrode material is preferably an SnCoC-containing material containing tin, cobalt and carbon as constituent elements and having a content of carbon of 9.9% by mass or more and not more than 29.7% by mass and a proportion of cobalt to the total sum of tin and cobalt (Co/(Sn+Co)) of 30% by mass or more and not more than 70% by mass. This is because a high energy density is obtainable in the foregoing composition range.

This SnCoC-containing material may further contain other constituent elements, if desired. As other constituent elements, for example, silicon, iron, nickel, chromium, indium, niobium, germanium, titanium, molybdenum, aluminum, phosphorus, gallium and bismuth are preferable. The SnCoC-containing material may contain two or more kinds of these elements. This is because higher effects are obtainable.

The SnCoC-containing material has a phase containing tin, cobalt and carbon, and this phase is preferably a lowly crystalline or amorphous phase. This phase is a reaction phase which is reactive with lithium, and excellent cycle characteristics are obtainable by this phase. In the case of using CuKα-rays as specified X-rays and defining a sweep rate at 1°/min, a half width value of a diffraction peak obtained by X-ray diffraction of this phase is preferably 1.0° or more in terms of a diffraction angle 2θ. This is because not only lithium is more smoothly intercalated and deintercalated, but the reactivity with an electrolyte is reduced.

Whether or not the diffraction peak obtained by the X-ray diffraction is corresponding to the reaction phase which is reactive with lithium can be easily determined by comparing an X-ray diffraction chart before and after an electrochemical reaction with lithium. For example, when a position of the diffraction peak changes before and after the electrochemical reaction with lithium, it is determined that the diffraction peak is corresponding to the reaction phase which is reactive with lithium. In that case, for example, a diffraction peak of a lowly crystalline or amorphous reaction phase is observed in the range of from 20° and 50° in terms of 2θ. This lowly crystalline or amorphous reaction phase contains, for example, the foregoing respective constituent elements, and it may be considered that this phase is lowly crystallized or amorphized chiefly by carbon.

There may be the case where the SnCoC-containing material has, in addition to the lowly crystalline or amorphous phase, a phase containing a simple substance or a part of each of the constituent elements.

In particular, in the SnCoC-containing material, it is preferable that at least a part of carbon as the constituent element is bonded to the metal element or semi-metal element as other constituent element. This is because cohesion or crystallization of tin or the like is suppressed.

Examples of a measurement method for examining the bonding state of elements include X-ray photoelectron spectroscopy (XPS). This XPS is a method in which soft X-rays (using Al-Kα rays or Mg-Kα rays in commercially available units) are irradiated on the surface of a sample, and kinetic energy of photoelectrons which fly out from the sample surface are measured, thereby examining an element composition and a bonding state of elements in a region of several nm from the sample surface.

The bound energy of an inner orbital electron of an element changes in correlation with a charge density on the element from the standpoint of primary approximation. For example, in the case where the charge density of a carbon element is reduced due to an interaction with an element existing in the vicinity of the carbon element, an outer electron such as a 2p electron is reduced, and therefore, a 1s electron of the carbon element receives a strong constraining force from the shell. That is, when the charge density of an element is reduced, the bound energy becomes high. In XPS, when the bound energy increases, a peak is shifted into a high energy region.

In XPS, so far as graphite is concerned, a peak of a 1s orbit of carbon (C1s) appears at 284.5 eV in a unit in which the energy is calibrated such that a peak of a 4f orbit of a gold atom (Au4f) is obtained at 84.0 eV. Also, so far as the surface contamination carbon is concerned, the peak of C1s appears at 284.8 eV. On the contrary, in the case where the charge density of the carbon element becomes high, for example, when bonded to a more positive element than carbon, the peak of C1s appears in a lower region than 284.5 eV. That is, in the case where at least a part of carbons contained in the SnCoC-containing material is bonded to a metal element or a semi-metal element as other constituent element or the like, a peak of a composite wave of C1s obtained regarding the SnCoC-containing material appears in a lower region than 284.5 eV.

In the case of carrying out the XPS measurement, it is preferable that in covering the surface by the surface contamination carbon, the surface is lightly sputtered by an argon ion gun attached to the XPS unit. Also, in the case where the SnCoC-containing material to be measured exists in the negative electrode 22, it would be better that after taking apart the secondary battery, the negative electrode 22 is taken out and then rinsed with a volatile solvent such as dimethyl carbonate. This is made for the purpose of removing a solvent with low volatility and an electrolyte salt existing on the surface of the negative electrode 22. It is desirable that their sampling is carried out in an inert atmosphere.

Also, in the XPS measurement, for example, the peak of C1s is used for correcting the energy axis of a spectrum. In general, since the surface contamination carbon exists on the material surface, the peak of C1s of the surface contamination carbon is fixed at 284.8 eV and employed as an energy reference. In the XPS measurement, the waveform of the peak of C1s is obtained as a form including the peak of the surface contamination carbon and the peak of carbon in the SnCoC-containing material, and therefore, the peak of the surface contamination carbon and the peak of carbon in the SnCoC-containing material are separated by, for example, analysis using a commercially available software program. In the analysis of the waveform, a position of a main peak existing on the lowest bound energy side is employed as an energy reference (284.8 eV).

This SnCoC-containing material can be formed by, for example, melting a mixture obtained by mixing raw materials of the respective constituent elements in an electric furnace, a high frequency induction furnace, an arc furnace, etc. and then solidifying the melt. Also, various atomizing methods such as gas atomization and water atomization, various rolling methods or methods utilizing a mechanochemical reaction such as a mechanical alloying method and a mechanical milling method may be adopted. Of these, a method utilizing a mechanochemical reaction is preferable. This is because the SnCoC-containing material is converted so as to have a lowly crystalline or amorphous structure. In the method utilizing a mechanochemical reaction, for example, a planetary ball mill unit or a manufacturing unit such as an attritor can be used.

For the raw material, though a simple substance of the respective constituent elements may be mixed, it is preferable to use an alloy with respect to a part of the constituent elements other than carbon. This is because by adding carbon to such an alloy and synthesizing the raw material by a method utilizing a mechanical alloying method, a lowly crystalline or amorphous structure is obtained, and the reaction time is shortened, too. The form of the raw material may be a powder or a block.

In addition to this SnCoC-containing material, an SnCoFeC-containing material having tin, cobalt, iron and carbon as constituent elements is also preferable. A composition of this SnCoFeC-containing material can be arbitrarily set up. For example, in the case where a content of iron is set up low, a composition in which a content of carbon is 9.9% by mass or more and not more than 29.7% by mass, a content of iron is 0.3% by mass or more and not more than 5.9% by mass, and a proportion of cobalt to the total sum of tin and cobalt (Co/(Sn+Co)) is 30% by mass or more and not more than 70% by mass is preferable. Also, for example, in the case where a content of iron is set up high, a composition in which a content of carbon is 11.9% by mass or more and not more than 29.7% by mass, a proportion of the total sum of cobalt and iron to the total sum of tin, cobalt and iron ((Co+Fe)/(Sn+Co+Fe)) is 26.4% by mass or more and not more than 48.5% by mass, and a proportion of cobalt to the total sum of cobalt and iron (Co/(Co+Fe)) is 9.9% by mass or more and not more than 79.5% by mass is preferable. This is because a high energy density is obtainable in the foregoing composition range. The crystallinity, measurement method of the bonding state of elements and formation method of this SnCoFeC-containing material and the like are the same as in the foregoing SnCoC-containing material.

The negative electrode active material layer 22B using, as a negative electrode material capable of intercalating and deintercalating lithium, a simple substance, an alloy or a compound of silicon, a simple substance, an alloy or a compound of tin or a material containing one or two or more kinds of phases thereof in at least a part thereof is formed by, for example, a vapor phase method, a liquid phase method, a spraying method, a coating method, a baking method or a combined method of two or more kinds of these methods. In that case, it is preferable that the negative electrode collector 22A and the negative electrode active material layer 22B are alloyed on at least a part of the interface therebetween. In detail, on the interface between the both, the constituent elements of the negative electrode collector 22A may be diffused into the negative electrode active material layer 22B, the constituent elements of the negative electrode active material layer 22B may be diffused into the negative electrode collector 22A, or these constituent elements may be mutually diffused. This is because not only breakage to be caused due to expansion and shrinkage of the negative electrode active material layer 22B at the time of charge and discharge can be suppressed, and electron conductivity between the negative electrode collector 22A and the negative electrode active material layer 22B is enhanced.

Examples of the vapor phase method include a physical deposition method and a chemical deposition method, specifically a vacuum vapor deposition method, a sputtering method, an ion plating method, a laser abrasion method, a thermal chemical vapor deposition (CVD) method and a plasma chemical vapor deposition method. As the liquid phase method, known techniques such as electrolytic plating and non-electrolytic plating can be adopted. The coating method as referred to herein is, for example, a method in which after mixing a granular negative electrode active material with a binder and the like, the mixture is dispersed in a solvent and coated. The baking method as referred to herein is, for example, a method in which after coating by a coating method, the coated material is heat treated at a higher temperature than a melting point of the binder, etc. As to the baking method, known techniques can be utilized, too, and examples thereof include an atmospheric baking method, a reaction baking method and a hot press baking method.

Also, examples of the negative electrode material capable of intercalating and deintercalating lithium include metal oxides and polymer compounds capable of intercalating and deintercalating lithium. Examples of the metal oxide include iron oxide, ruthenium oxide and molybdenum oxide; and examples of the polymer compound include polyacetylene, polyaniline and polypyrrole.

As a matter of course, the negative electrode material capable of intercalating and deintercalating lithium may be a material other than those described above. Also, the foregoing series of negative electrode materials may be a mixture of two or more kinds thereof in an arbitrary combination.

The negative electrode active material made of the foregoing negative electrode material is composed of plural granules. That is, the negative electrode active material layer 22B has plural negative electrode active material particles, and the negative electrode active material particle is formed by, for example, the foregoing vapor phase method, etc. However, the negative electrode active material particle may be formed by a method other than the vapor phase method.

In the case where the negative electrode active material particle is formed by a deposition method such as a vapor phase method, the negative electrode active material particle may have a single-layered structure formed through a single deposition step, or may have a multilayered structure formed through plural deposition steps. However, in the case where the negative electrode active material particle is formed by a vapor deposition method accompanied with high heat at the time of deposition, it is preferable that the negative electrode active material particle has a multilayered structure. This is because when the deposition step of the negative electrode material is carried out in a divided manner of plural times (the negative electrode material is successively formed thin and deposited), the time when the negative electrode collector 22A is exposed at high temperatures becomes short, and a thermal damage is hardly given as compared with the case of carrying out the deposition step once.

For example, this negative electrode active material particle grows in a thickness direction of the negative electrode active material layer 22B from the surface of the negative electrode collector 22A and is connected to the negative electrode collector 22A in a root thereof. In that case, it is preferable that the negative electrode active material particle is formed by a vapor phase method and alloyed on at least a part of the interface with the negative electrode collector 22A as described previously. In detail, on the interface between the both, the constituent elements of the negative electrode collector 22A may be diffused into the negative electrode active material particle, the constituent elements of the negative electrode active material particle may be diffused into the negative electrode collector 22A, or the constituent elements of the both may be mutually diffused.

In particular, it is preferable that the negative electrode active material layer 22B has an oxide-containing film for coating the surface of the negative electrode active material particle (region coming into contact with the electrolytic solution), if desired. This is because the oxide-containing film functions as a protective film against the electrolytic solution, and even when charge and discharge are repeated, a decomposition reaction of the electrolytic solution is suppressed, and therefore, the cycle characteristics are enhanced. This oxide-containing film may coat a part or the whole of the surface of the negative electrode active material particle.

This oxide-containing film contains an oxide of a metal element or a semi-metal element. Examples of the oxide of a metal element or a semi-metal element include oxides of aluminum, silicon, zinc, germanium, tin or the like. Of these, it is preferable that the oxide-containing film contains an oxide of at least one member selected from the group consisting of silicon, germanium and tin; and it is especially preferable that the oxide-containing film contains an oxide of silicon. This is because not only it is easily coated over the entire surface of the negative electrode active material particle, but an excellent protective function is obtainable. As a matter of course, the oxide-containing film may contain an oxide other than those described above.

This oxide-containing film is, for example, formed using one or two or more kinds of a method including a vapor phase method and a liquid phase method. In that case, examples of the vapor phase method include a vapor deposition method, a sputtering method and a CVD method; and examples of the liquid phase method include a liquid phase deposition method, a sol-gel method, a polysilazane method, an electrodeposition method, a coating method and a dip coating method. Of these, a liquid phase method is preferable, and a liquid phase deposition method is more preferable. This is because the surface of the negative electrode active material particle can be easily coated over a wide range thereof. In the liquid phase deposition method, first of all, in a solution containing not only a fluoride complex of a metal element or a semi-metal element and, as an anion scavenger, a solution species which is easy to coordinate to a fluoride ion, the fluoride ion generated from the fluoride complex is scavenged by the anion scavenger, thereby depositing an oxide of the metal element or semi-metal element so as to coat the surface of the negative electrode active material particle. Thereafter, an oxide-containing film is formed by washing with water and drying.

Also, it is preferable that the negative electrode active material layer 22B has a metal material which is not alloyed with an electrode reactant in a gap between particles of the negative electrode active material particle or in a gap within the particle, if desired. This is because not only the plural negative electrode active material particles are bound to each other via the metal material, but in view of the fact that the metal material exists in the foregoing gap, expansion and shrinkage of the negative electrode active material layer 22B are suppressed, whereby the cycle characteristics are enhanced.

For example, this metal material contains, as a constituent element, a metal element which is not alloyed with lithium. Examples of such a metal element include at least one member selected from the group consisting of iron, cobalt, nickel, zinc and copper. Of these, cobalt is preferable. This is because not only the metal material is easy to come into the foregoing gap, but an excellent binding action is obtainable. As a matter of course, the metal material may contain a metal element other than those described above. However, the "metal material" as referred to herein is a broad concept including not only simple substances but alloys and metal compounds. This metal material is formed by, for example, a vapor phase method or a liquid phase method. Of these, a liquid phase method such as an electrolytic plating method and a non-electrolytic plating method is preferable, and an electrolytic plating method is more preferable. This is because not only the metal material is easy to come into the foregoing gap, but the formation time may be shortened.

The negative electrode active material layer 22B may contain either one or both of the foregoing oxide-containing film and metal material. However, in order to more enhance the cycle characteristics, it is preferable that the negative electrode active material layer 22B contains the both of them.

A detail configuration of the negative electrode 22 is hereunder described with reference to FIGS. 3, 4, 5A, 5B, 6A and 6B.

Figure 3:
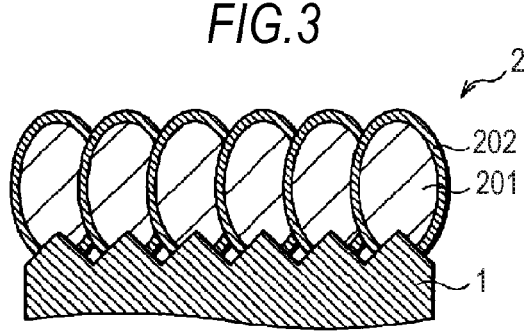
FIG. 3 is a sectional view showing enlargedly a configuration of a negative electrode shown in FIG. 2.
Figure 4:
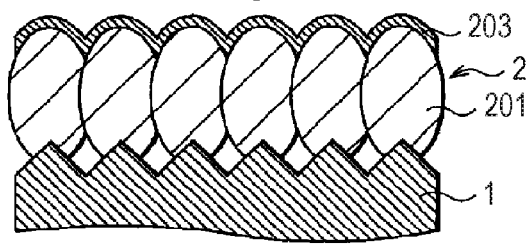
FIG. 4 is a sectional view showing a configuration of a negative electrode of the Referential Examples.

First of all, the case where a negative electrode active material layer 2 (22B) has an oxide-containing film together with plural negative electrode active material particles is described. FIG. 3 schematically shows a sectional structure of the negative electrode 22; and FIG. 4 schematically shows a sectional structure of a negative electrode of the Referential Examples. FIGS. 3 and 4 show the case where the negative electrode active material particle has a single-layered structure.

In the negative electrode 22 of the case where the negative electrode active material layer 2 has an oxide-containing film together with plural negative electrode material particles, as shown in FIG. 3, for example, when a negative electrode material is deposited on a negative electrode collector 1 (22A) by a vapor phase method such as a vapor deposition method, plural negative electrode active material particles 201 are formed on the negative electrode collector 1. In that case, when the surface of the negative electrode collector 1 is roughed, and plural projections (for example, fine particles formed by means of an electrolysis treatment) are present, the negative electrode active material particles 201 grow in every projection in a thickness direction; and therefore, the plural negative electrode active material particles 201 are arranged on the negative electrode collector 1 and also connected to the surface of the negative electrode collector 1 in a root thereof. Thereafter, for example, when an oxide-containing film 202 is formed on the surface of the negative electrode active material particle 201 by a liquid phase method such as a liquid phase deposition method, the oxide-containing film 202 coats the surface of the negative electrode active material particle 201 over substantially the entirety thereof, and in particular, it coats a wide range of from the top to the root of the negative electrode active material particle 201. The coating state over a wide range by this oxide-containing film 202 is a characteristic feature obtained in the case where the oxide-containing film 202 is formed by the liquid phase method. That is, when the oxide-containing film 202 is formed by the liquid phase method, its coating action extends to not only the top of the negative electrode active material particle 201 but the root thereof, and therefore, the root is coated by the oxide-containing film 202.

On the contrary, in a negative electrode of the Referential Examples, as shown in FIG. 4, for example, when the plural negative electrode active material particles 201 are formed by a vapor phase method, and thereafter, an oxide-containing film 203 is similarly formed by a vapor phase method, the oxide-containing film 203 coats only the top of the negative electrode active material particle 201. The coating state in a narrow range by this oxide-containing film 203 is a characteristic feature obtained in the case where the oxide-containing film 203 is formed by the vapor phase method. That is, when the oxide-containing film 203 is formed by the vapor phase method, though its coating action extends to the top of the negative electrode active material particle 201, it does not extend to the root thereof, and therefore, the root is not coated by the oxide-containing film 203.

In FIG. 3, the case where the negative electrode active material layer 2 is formed by the vapor phase method has been described. However, even in the case where the negative electrode active material layer 2 is formed by a sintering method or the like, the oxide-containing film is similarly formed so as to coat the surfaces of the plural negative electrode material particles over substantially the entirety thereof.

Figure 5A:
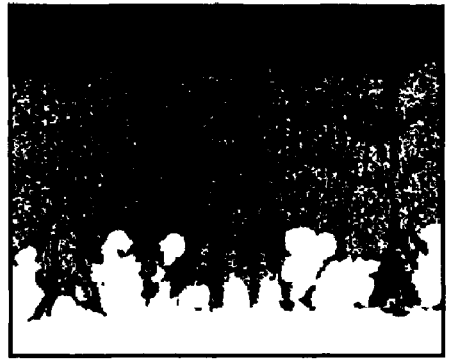
FIGS. 5A and 5B are an SEM photograph showing a sectional structure of the negative electrode shown in FIG. 2 and a schematic view thereof, respectively.
Figure 5B:
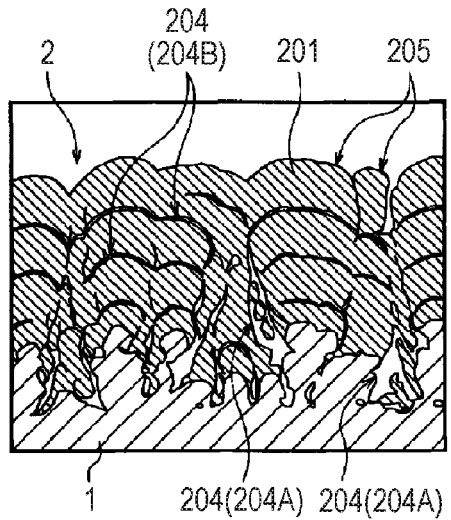

Next, the case where the negative electrode active material layer 2 has a metal material which is not alloyed with an electrode reactant together with plural negative electrode active material particles is described. Each of FIGS. 5A and 5B shows enlargedly a sectional structure of the negative electrode 22, in which FIG. 5A is a photograph (secondary electron image) by a scanning electron microscope (SEM), and FIG. 5B is a schematic view of the SEM image shown in FIG. 5A. Each of FIGS. 5A and 5B shows the case where plural negative electrode active material particles 201 have a multilayered structure within the particle.

In the case where the negative electrode active material particle 201 has a multilayered structure, plural gaps 204 are generated in the negative electrode active material layer 2 due to an arrangement structure, a multilayered structure and a surface structure of the plural negative electrode active material particles 201. This gap 204 includes two types of gaps 204A and 204B to be classified chiefly depending upon the generation cause. The gap 204A is generated between the adjacent negative electrode active material particles 201 to each other; and the gap 204B is generated between the respective layers within the negative electrode active material particle 201.

There may be the case where a void 205 is generated on the exposed surface (outermost surface) of the negative electrode active material particle 201. Following the generation of a fine projection in a whisker form (not illustrated) on the surface of the negative electrode active material particle 201, this void 205 is generated between the projections. There may be the case where this void 205 is generated over the entirety on the exposed surface of the negative electrode active material particle 201 or the case where the void 205 is generated only in a part of the exposed surface of the negative electrode active material particle 201. However, the foregoing projection in a whisker form is generated on the surface of the negative electrode active material particle 201 every time of the formation thereof, and therefore, there may be the case where the void 205 is generated not only on the exposed surface of the negative electrode active material particle 201 but between the respective layers.

Figure 6A:
FIGS. 6A and 6B are an SEM photograph showing other sectional structure of the negative electrode shown in FIG. 2 and a schematic view thereof, respectively.
Figure 6B:
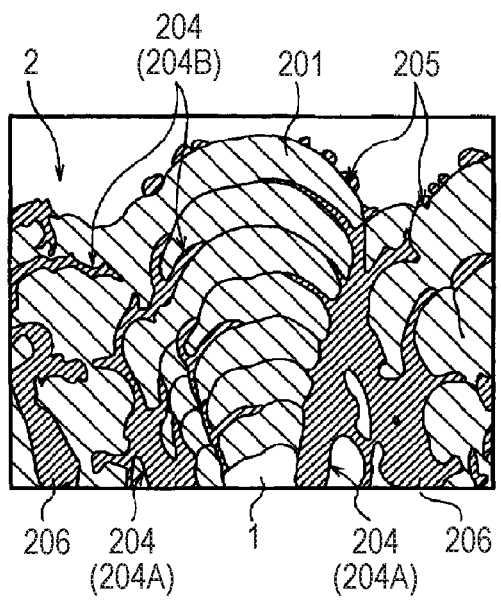

Each of FIGS. 6A and 6B shows other sectional structure of the negative electrode 22 and is corresponding to FIGS. 5A and 5B, respectively. The negative electrode active material layer 2 has a metal material 206 which is not alloyed with an electrode reactant in the gaps 204A and 204B. In that case, though either one of the gaps 204A or 204B may have the metal material 206, it is preferable that both of the gaps 204A and 204B have the metal material 206. This is because higher effects are obtainable.

This metal material 206 comes into the gap 204A between the adjacent negative electrode active material particles 201 to each other. In detail, in the case where the negative electrode active material particle 201 is formed by a vapor phase method or the like, as described previously, the negative electrode active material particle 201 grows in every projection existing on the surface of the negative electrode collector 1, and therefore, the gap 204A is generated between the adjacent negative electrode active material particles 201 to each other. This gap 204A becomes a cause to lower binding properties of the negative electrode active material layer 2, and therefore, in order to enhance the binding properties, the metal material 206 is filled in the gap 204A. In that case, though the metal material 206 may be filled even in a part of the gap 204A, it is preferable that the filling amount of the metal material 206 is as large as possible. This is because the binding properties of the negative electrode active material layer 2 are more enhanced. The filling amount of the metal material 206 is preferably 20% or more, more preferably 40% or more, and further properly 80% or more.

Also, the metal material 206 comes into the gap 204B within the negative electrode active material particle 201. In detail, in the case where the negative electrode active material particle 201 has a multilayered structure, the gap 204B is generated between the respective layers. Similar to the foregoing gap 204A, this gap 204B becomes a cause to lower binding properties of the negative electrode active material layer 2, and therefore, in order to enhance the binding properties, the metal material 206 is filled in the foregoing gap 204B. In that case, though the metal material 206 may be filled even in a part of the gap 204B, it is preferable that the filling amount of the metal material 206 is as large as possible. This is because the binding properties of the negative electrode active material layer 2 are more enhanced.

In the negative electrode active material layer 2, in order to prevent adverse influences of a fine projection (not illustrated) in a whisker form, which is generated on the exposed surface of the negative electrode active material particle 201 in the uppermost layer, against the performance of a secondary battery, the metal material 206 may be present in the void 205. In detail, in the case where the negative electrode active material particle 201 is formed by a vapor phase method or the like, since a fine projection in a whisker form is generated on the surface thereof, the void 205 is generated between the projections. This void 205 introduces an increase of the surface area of the negative electrode active material particle 201 and increases the amount of an irreversible film formed on the surface thereof, and therefore, there is a possibility that a lowering of the degree of progress of an electrode reaction (charge and discharge reaction) is caused. Accordingly, in order to suppress a lowering of the degree of progress of an electrode reaction, the metal material 206 is embedded in the foregoing void 205. In that case, though even a part of the void 205 may be embedded, it is preferable that the embedding amount is as large as possible. This is because a lowering of the degree of progress of an electrode reaction is more suppressed. In FIGS. 6A and 6B, what the metal material 206 is interspersed on the surface of the negative electrode active material particle 201 in the uppermost layer demonstrates that the foregoing fine projection exists in the interspersed area. As a matter of course, it is not always the case that the metal material 206 must be interspersed on the surface of the negative electrode active material particle 201, but the metal material 206 may coat the entire surface thereof.

In particular, the metal material 206 which has come into the gap 204B also functions to embed the void 205 in the respective layers. In detail, in the case where the negative electrode material is deposited plural times, the foregoing fine projection is generated on the surface of the negative electrode active material particle 201 every time of the deposition. As noted from this fact, the metal material 206 is filled in the gap 204B in the respective layers and also embedded in the void 205 in the respective layers.

In FIGS. 5A and 5B and FIGS. 6A and 6B, the case where the negative electrode active material particle 201 has a multilayered structure, and the both of the gaps 204A and 204B exist in the negative electrode active material layer 2 has been described, and therefore, the negative electrode active material layer 2 has the metal material 206 in the gaps 204A and 204B. On the contrary, in the case where the negative electrode active material particle 201 has a single-layered structure, and only the gap 204A exists in the negative electrode active material layer 2, the negative electrode active material layer 2 has the metal material 206 only in the gap 204A. As a matter of course, since the void 205 is generated in the both cases, the metal material 206 is present in the void 205 in all of the cases.

The separator 23 partitions the positive electrode 21 and the negative electrode 22 from each other and allows a lithium ion to pass therethrough while preventing a short circuit of the current to be caused due to the contact of the both electrodes. This separator 23 is, for example, a porous film having an average pore size of about 5 μm or less, and specific examples thereof include a porous film made of a synthetic resin such as polytetrafluoroethylene, polypropylene and polyethylene; a porous film made of a ceramic; and a laminate of two or more kinds of these porous films. Above all, a polyolefin-made porous membrane is preferable because it is excellent in an effect for preventing a short circuit from occurring and is able to contrive to enhance the safety of the secondary battery due to a shutdown effect. In particular, polyethylene is preferable because it is able to obtain a shutdown effect within a temperature range of 100° C. or higher and not higher than 160° C. and is excellent in electrochemical stability. Also, polypropylene is preferable. Besides, a resin may be used upon being copolymerized or blended with polyethylene or polypropylene so far as it is provided with chemical stability.

Examples of other materials than those described above include polypropylene, polyvinylidene fluoride, polytetrafluoroethylene, aramid, polyimide and polyacrylonitrile. These materials may be used singly, or two or more kinds thereof can be used upon being mixed or polymerized. A polyolefin-made porous membrane is preferable because it is excellent in an effect for preventing a short circuit from occurring and is able to contrive to enhance the safety of the battery due to a shutdown effect.

Also, though there is no particular limitation, typically, it is preferable to form a polyethylene layer as an interlayer and to provide a layer made of other material than those described above and having the same composition on one or both surfaces thereof.

The foregoing electrolytic solution is impregnated as a liquid nonaqueous electrolyte in the separator 23. This is because cycle characteristics are enhanced.

This secondary battery is, for example, manufactured according to the following procedures.

The positive electrode 21 is first prepared. First of all, a positive electrode active material, a binder and a conductive agent are mixed to form a positive electrode mixture, which is then dispersed in an organic solvent to form a positive electrode mixture slurry in a paste form. Subsequently, the positive electrode mixture slurry is uniformly coated on the both surfaces of the positive electrode collector 21A by a doctor blade or a bar coater or the like and then dried. Finally, the film is compression molded by a roll press or the like while heating, if desired, thereby forming the positive electrode active material layer 21B. In that case, the compression molding may be repeated plural times.

Subsequently, the negative electrode 22 is prepared. First of all, the negative electrode collector 22A made of an electrolytic copper foil or the like is prepared, and a negative electrode material is then deposited on the both surfaces of the negative electrode collector 22A by a vapor phase method such as a vapor deposition method, thereby forming plural negative electrode active material particles. Finally, if desired, an oxide-containing film is formed by a liquid phase method such as a liquid phase deposition method, or a metal material is formed by a liquid phase method such as an electrolytic plating method, thereby forming the negative electrode active material layer 22B.

Subsequently, the positive electrode lead 25 is installed in the positive electrode collector 21A by means of welding, etc., and the negative electrode lead 26 is also installed in the negative electrode collector 22A by means of welding, etc. Thereafter, the positive electrode 21 and the negative electrode 22 are laminated via the separator 23 and then wound in a longitudinal direction to prepare the wound electrode body 20.

Assembling of a secondary battery is carried out in the following manner. The center pin 24 is first inserted on the center of the wound electrode body 20. Subsequently, the wound electrode body 20 is housed in the inside of the battery can 11 while being interposed between a pair of the insulating plates 12 and 13; and a tip end of the positive electrode lead 25 is welded with the safety valve mechanism 15, whereas a tip end of the negative electrode lead 26 is welded with the battery can 11. Subsequently, an electrolytic solution is injected into the inside of the battery can 11 and impregnated in the separator 23. Finally, the battery lid 14, the safety valve mechanism 15 and the positive temperature coefficient device 16 are fixed to the open end of the battery can 11 upon being caulked via the gasket 17. There is thus completed the secondary battery shown in FIGS. 1 and 2.

In this secondary battery, when charged, for example, a lithium ion is deintercalated from the positive electrode 21 and intercalated in the negative electrode 22 via the electrolytic solution impregnated in the separator 23. On the other hand, when discharged, for example, a lithium ion is deintercalated from the negative electrode 22 and intercalated in the positive electrode 21 via the electrolytic solution impregnated in the separator 23.

According to this secondary battery of a cylindrical type, in the case the capacity of the negative electrode 22 is expressed on the basis of intercalation and deintercalation of lithium, since this secondary battery is provided with the foregoing nonaqueous electrolyte, even when charge and discharge are repeated, the decomposition reaction of the electrolytic solution is suppressed. Accordingly, the cycle characteristics can be enhanced.

In particular, in the case where the negative electrode 22 contains a material having silicon or tin which is advantageous for realizing a high capacity (a material capable of intercalating and deintercalating lithium and having at least one member selected from the group consisting of metal elements and semi-metal elements), the cycle characteristics are enhanced, and therefore, high effects can be obtained as compared with the case containing other negative material such as carbon materials.

Other effects regarding this secondary battery are the same as those in the foregoing case regarding the nonaqueous electrolyte.

(Second Secondary Battery)

Next, a second secondary battery is described below. Constituent elements which are common to those in the first secondary battery are given the same symbols, and explanations thereof are omitted. The second secondary battery is a lithium metal secondary battery in which the capacity of the negative electrode 22 is expressed on the basis of deposition and dissolution of lithium. This secondary battery has the same configuration as in the first secondary battery exclusive of a point that the negative electrode active material layer 22B is constituted of a lithium metal, and is manufactured in the same procedures.

This secondary battery uses a lithium metal as the negative electrode active material, and according to this, a high energy density can be obtained. The negative electrode active material layer 22B may be previously provided at the time of assembling. However, it may be absent at the time of assembling but may be constituted of a lithium metal deposited at the time of charge. Also, the negative electrode collector 22A may be omitted by utilizing the negative electrode active material layer 22B as a collector, too.

In this secondary battery, when charged, for example, a lithium ion is deintercalated from the positive electrode 21 and deposited as a lithium metal on the surface of the negative electrode collector 22A via the electrolytic solution. On the other hand, when discharged, for example, a lithium metal is eluted as a lithium ion from the negative electrode active material layer 22B and intercalated in the positive electrode 21 via the electrolytic solution.

According to this secondary battery of a cylindrical type, in the case the capacity of the negative electrode 22 is expressed on the basis of deposition and dissolution of lithium, since this secondary battery is provided with the foregoing electrolytic solution, the cycle characteristics can be enhanced. Other effects regarding this secondary battery are the same as those in the foregoing case regarding the nonaqueous electrolyte.

(Third Secondary Battery)

Figure 7:
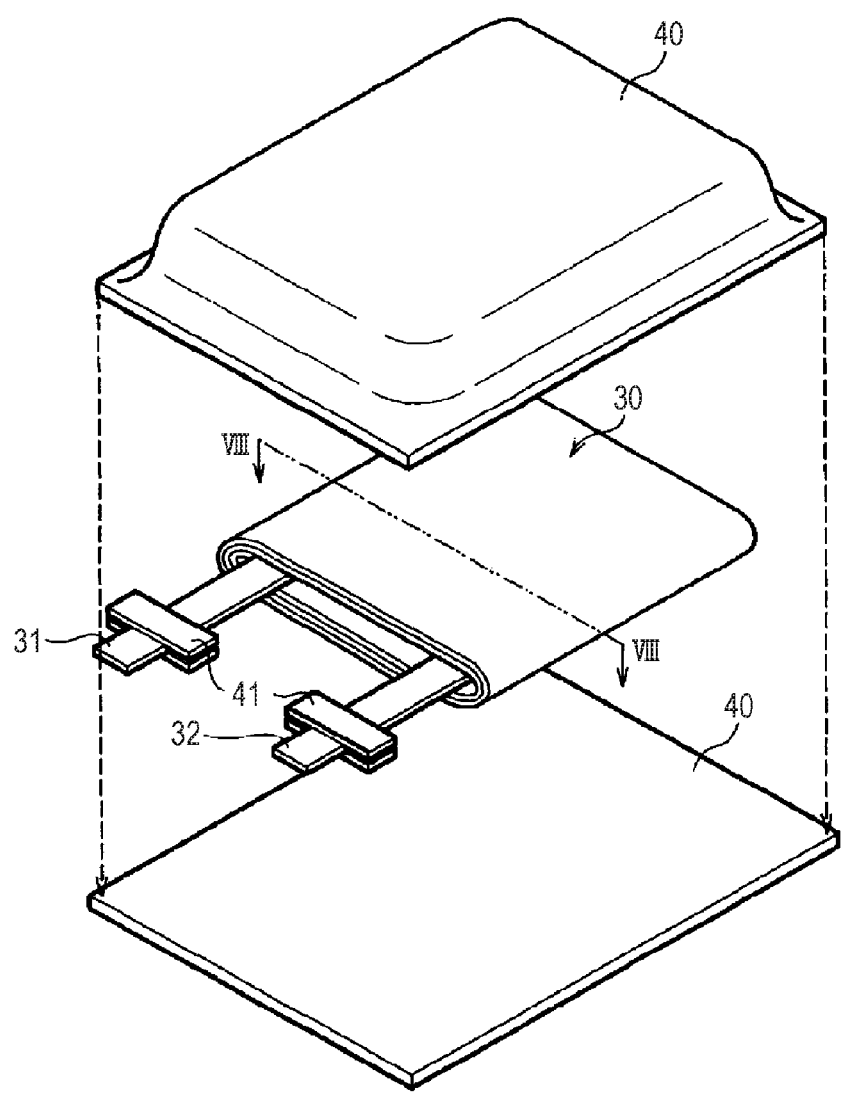
FIG. 7 is an exploded perspective view showing a configuration of a third secondary battery using an electrolytic solution according to an embodiment of the present application.

FIG. 7 shows an exploded perspective configuration of a third secondary battery. This secondary battery is chiefly one in which a wound electrode body 30 having a positive electrode lead 31 and a negative electrode lead 32 installed therein is housed in the inside of an exterior member 40 in a film form. The battery structure using this exterior member 40 in a film form is called a laminated film type.

The positive electrode lead 31 and the negative electrode lead 32 are each led out in, for example, the same direction from the inside toward the outside of the exterior member 40. The positive electrode lead 31 is made of a metal material, for example, aluminum, etc. Also, the negative electrode lead 32 is made of a metal material, for example, copper, nickel, stainless steel, etc. Such a metal material which constitutes each of the positive electrode lead 31 and the negative electrode lead 32 is, for example, formed in a thin plate state or network state.

The exterior member 40 is constituted of, for example, a rectangular aluminum laminated film obtained by sticking a nylon film, an aluminum foil and a polyethylene film in this order. For example, this exterior member 40 has a structure in which the respective outer edges of the two rectangular aluminum laminated films are allowed to adhere to each other by means of fusion or with an adhesive such that the polyethylene film is disposed opposing to the wound electrode body 30. A contact film 41 is inserted between the exterior member 40 and each of the positive electrode lead 31 and the negative electrode lead 32 for the purpose of preventing invasion of the outside air. This contact film 41 is constituted of a material having adhesion to the positive electrode lead 31 and the negative electrode lead 32. Examples of such a material include polyolefin resins such as polyethylene, polypropylene, modified polyethylene and modified polypropylene.

The exterior member 40 may be constituted of a laminated film having other structure, or a polymer film such as polypropylene or a metal film in place of the foregoing aluminum laminated film having a three-layered structure.

Figure 8:
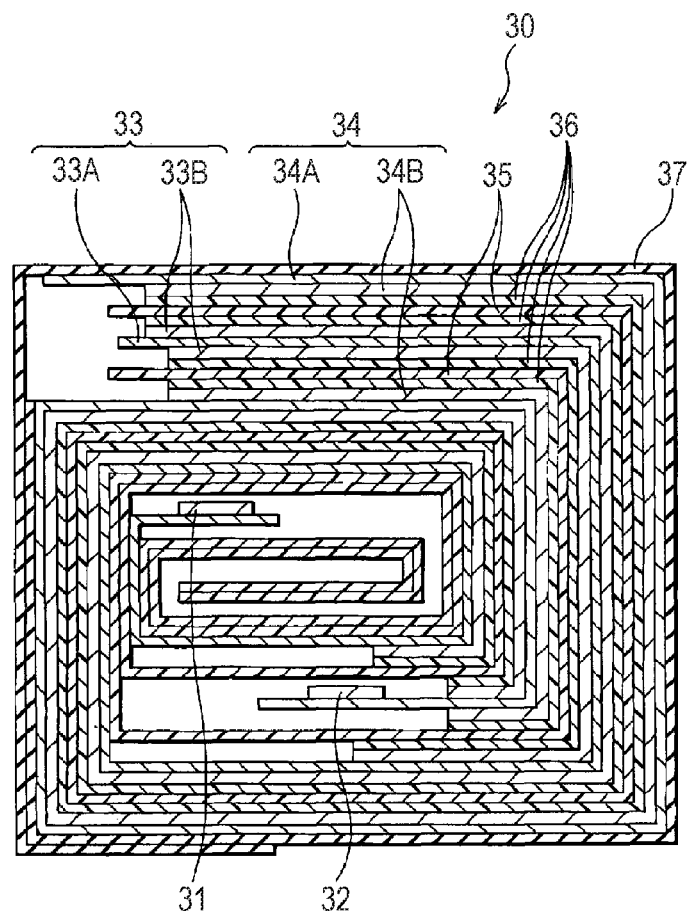
FIG. 8 is a sectional view showing a configuration along a VIII-VIII line of a wound electrode body in the third secondary battery shown in FIG. 7.
Figure 9:
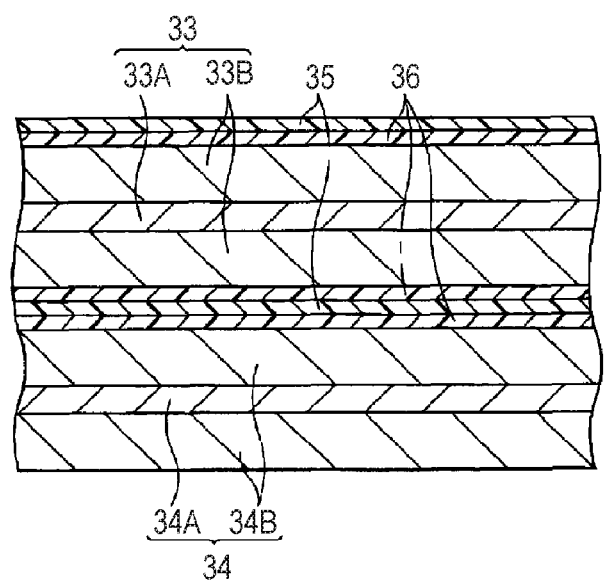
FIG. 9 is a partially enlarged view of FIG. 8.

FIG. 8 shows a sectional configuration along a VIII-VIII line of the wound electrode body 30 shown in FIG. 7. FIG. 9 is a sectional view showing enlargedly a part of the FIG. 8. This wound electrode body 30 is one prepared by laminating a positive electrode 33 and a negative electrode 34 via a separator 35 and an electrolyte 36 and winding the laminate, and an outermost peripheral part thereof is protected by a protective tape 37.

The positive electrode 33 is one in which a positive electrode active material layer 33B is provided on the both surfaces of a positive electrode collector 33A. The negative electrode 34 is one in which a negative electrode active material layer 34B is provided on the both surfaces of a negative electrode collector 34A, and the negative electrode active material layer 34B is disposed opposing to the positive electrode active material layer 33B. The configuration of each of the positive electrode collector 33A, the positive electrode active material layer 33B, the negative electrode collector 34A, the negative electrode active material layer 34B and the separator 35 is the same as the configuration of each of the positive electrode collector 21A, the positive electrode active material layer 21B, the negative electrode collector 22A, the negative electrode active material layer 22B and the separator 23 in the foregoing first or second secondary battery.

The electrolyte 36 is an electrolyte in a so-called gel form, which contains the foregoing electrolytic solution and a polymer compound for holding this electrolytic solution therein. The electrolyte in a gel form is preferable because not only high ionic conductivity (for example, 1 mS/cm or more at room temperature) is obtained, but the liquid leakage is prevented.

Examples of the polymer compound include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubbers, nitrile-butadiene rubbers, polystyrene and polycarbonates. These compounds may be used singly or in admixture of plural kinds thereof. Of these, polyacrylonitrile, polyvinylidene fluoride, polyhexafluoropropylene and polyethylene oxide are preferably used from the standpoint of electrochemical stability. Though the addition amount of the polymer compound in the electrolytic solution varies depending upon the affinity therebetween, it is preferably 5% by mass or more and not more than 50% by mass.

A composition of the electrolytic solution is the same as the composition of the electrolytic solution in the foregoing first secondary battery. However, in that case, the solvent as referred to herein has a broad concept including not only a liquid solvent but a solvent with ionic conductivity such that it is able to dissociate the electrolyte salt. Accordingly, in the case of using a polymer compound with ionic conductivity, the instant polymer compound is also included in the solvent.

In place of the electrolyte 36 in a gel form, in which an electrolytic solution is held in a polymer compound, the electrolytic solution may be used as it is. In that case, the electrolytic solution is impregnated in the separator 35.

This secondary battery is, for example, manufactured by the following three kinds of manufacturing methods.

In a first manufacturing method, first of all, for example, not only the positive electrode active material layer 33B is formed on the both surfaces of the positive electrode collector 33A to form the positive electrode 33, but the negative electrode active material layer 34B is formed on the both surfaces of the negative electrode collector 34A to form the negative electrode 34 according to the same procedures as in the manufacturing method of the first secondary battery.

Subsequently, a precursor solution containing an electrolytic solution, a polymer compound and a solvent is prepared and coated on each of the positive electrode 33 and the negative electrode 34, and the solvent is then vaporized to form the electrolyte 36 in a gel form. Subsequently, the positive electrode lead 31 is installed in the positive electrode collector 33A, and the negative electrode lead 32 is also installed in the negative electrode collector 34A. Subsequently, the positive electrode 33 and the negative electrode 34 each provided with the electrolyte 36 are laminated via the separator 35, the laminate is then wound in a longitudinal direction thereof, and the protective tape 37 is allowed to adhere to the outermost peripheral part to form the wound electrode body 30. Finally, for example, the wound electrode body 30 is interposed between the two exterior members 40 in a film form, and the outer edges of the exterior members 40 are allowed to adhere to each other by means of heat fusion, etc., thereby sealing the wound electrode body 30. On that occasion, the contact film 41 is inserted between each of the positive electrode lead 31 and the negative electrode lead 32 and the exterior member 40. According to this, the secondary battery shown in FIGS. 7 and 8 is completed.

In a second manufacturing method, first of all, the positive electrode lead 31 is installed in the positive electrode 33, and the negative electrode lead 32 is also installed in the negative electrode 34; the positive electrode 33 and the negative electrode 34 are then laminated via the separator 35 and wound; and the protective tape 37 is allowed to adhere to the outermost peripheral part, thereby forming a wound body serving as a precursor of the wound electrode body 30. Subsequently, the wound body is interposed between the two exterior members 40 in a film form, and the outer edges exclusive of one side are allowed to adhere to each other by means of heat fusion, etc. and then the wound body is housed in the inside of the exterior member 40 in a bag form. Subsequently, a composition for electrolyte containing an electrolytic solution, a monomer as a raw material of the polymer compound, a polymerization initiator and optionally other materials such as a polymerization inhibitor is prepared and injected into the inside of the exterior member 40 in a bag form. Thereafter, an opening of the exterior member 40 is hermetically sealed by means of heat fusion, etc. Finally, the monomer is heat polymerized to form a polymer compound, thereby forming the electrolyte 36 in a gel form. There is thus completed the secondary battery.

In a third manufacturing method, first of all, a wound body is formed in the same manner as in the foregoing second manufacturing method, except for using the separator 35 having a polymer compound coated on the both surfaces thereof, and then housed in the inside of the exterior member 40 in a bag form. Examples of the polymer compound which is coated on this separator 35 include polymers composed of, as a component, vinylidene fluoride, namely a homopolymer, a copolymer or a multi-component copolymer. Specific examples thereof include polyvinylidene fluoride; a two-component based copolymer composed of, as components, vinylidene fluoride and hexafluoropropylene; and a three-component based copolymer composed of, as components, vinylidene fluoride, hexafluoropropylene and chlorotrifluoroethylene. The polymer compound may contain one or two or more kinds of other polymer compounds together with the foregoing polymer composed of, as a component, vinylidene fluoride. Subsequently, an electrolytic solution is prepared and injected into the inside of the exterior member 40, and an opening of the exterior member 40 is then hermetically sealed by means of heat fusion, etc. Finally, the separator 35 is brought into intimate contact with the positive electrode 33 and the negative electrode 34 via the polymer compound upon heating while adding a weight to the exterior member 40. According to this, the electrolytic solution is impregnated in the polymer compound, and the polymer compound is gelled to form the electrolyte 36. There is thus completed the secondary battery.

In this third manufacturing method, expansion of the secondary battery is suppressed as compared with the first manufacturing method. Also, in the third manufacturing method, the monomer as a raw material of the polymer compound, the solvent and the like do not substantially remain in the electrolyte 36 as compared with the second manufacturing method, and the forming step of a polymer compound is controlled well. Accordingly, sufficient adhesion between each of the positive electrode 33 and the negative electrode 34 and each of the separator 35 and the electrolyte 36 is obtained.

According to this secondary battery of a laminated film type, since it is provided with the foregoing electrolytic solution, the cycle characteristics can be enhanced. Other effects than those described above regarding this secondary battery are the same as those in the first or second secondary battery.

(Fourth Secondary Battery)

Figure 10:
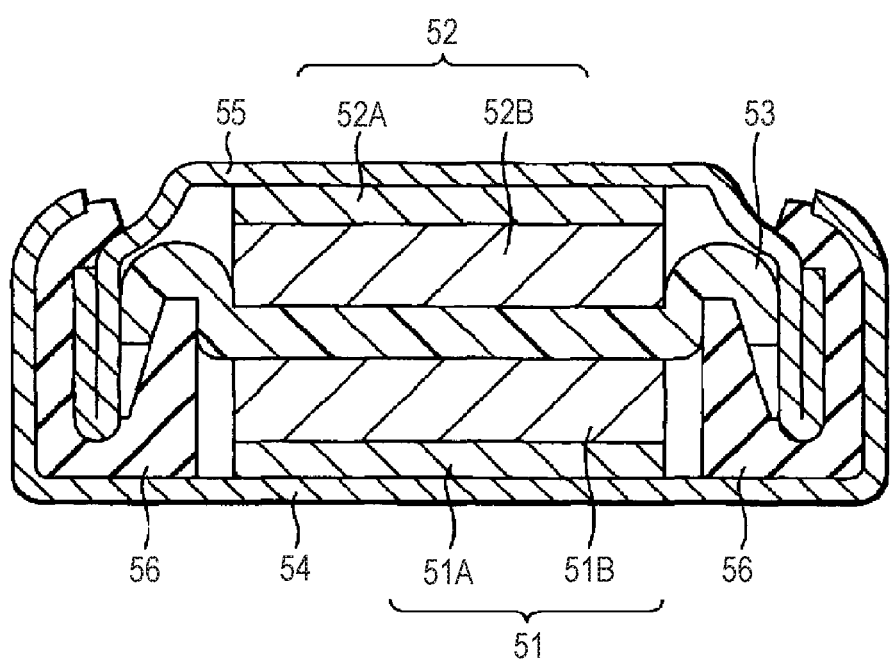
FIG. 10 is a sectional view showing a configuration of a fourth secondary battery using an electrolytic solution according to an embodiment of the present application.

FIG. 10 shows a sectional configuration of a fourth secondary battery. This fourth secondary battery is one obtained by sticking a positive electrode 51 to an exterior can 54, housing a negative electrode 52 in an exterior cup 55, laminating them via a separator 53 having an electrolytic solution impregnated therein and then caulking the laminate via a gasket 56. A battery structure using the exterior can 54 and the exterior cup 55 is called a so-called coin type.

The positive electrode 51 is one in which a positive electrode active material layer 51B is provided on one surface of a positive electrode collector 51A. The negative electrode 52 is one in which a negative electrode active material layer 52B is provided on one surface of a negative electrode collector 52A. The configuration of each of the positive electrode collector 51A, the positive electrode active material layer 51B, the negative electrode collector 52A, the negative electrode active material layer 52B and the separator 53 is the same as the configuration of each of the positive electrode collector 21A, the positive electrode active material layer 21B, the negative electrode collector 22A, the negative electrode active material layer 22B and the separator 23 in the foregoing first or second secondary battery. The composition of the electrolytic solution impregnated in the separator 53 is also the same as the composition of the electrolytic solution in the first or second secondary battery.

The action and effects of this secondary battery of a coin type are the same as in the foregoing first or second secondary battery.

EXAMPLES

Specific working examples of the present application are described below in detail, but it should not be construed that the present invention is limited thereto.

Sulfonic anhydrides and aromatic compounds used in the following Examples and the like are as follows.

In the sulfonic anhydrides, Compound A is Compound (1) of the foregoing sulfonic anhydride (1); Compound B is Compound (2) of the foregoing sulfonic anhydride (1); Compound C is Compound (1) of the foregoing sulfonic anhydride (3); Compound D is Compound (1) of the foregoing sulfonic anhydride (4); Compound E is Compound (1) of the foregoing sulfonic anhydride (2); and Compound F is succinic anhydride.

In the aromatic compound, CHB is cyclohexylbenzene; tBB is tert-butylbenzene; tPB is tert-pentylbenzene; and DFA is 2,4-difluoroanisole. Structural formulae thereof are as follows.

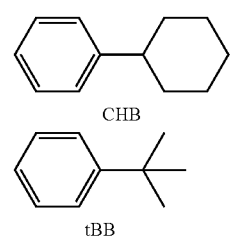

Chemical Formula (27)

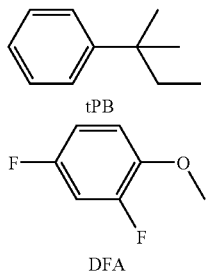

Examples 1-1 to 1-20 and Comparative Examples 1-1 to 1-13

First of all, the positive electrode 21 was prepared. That is, lithium carbonate ($Li_2CO_3$) and cobalt carbonate ($CoCO_3$) were mixed in a molar ratio of 0.5/1 and then baked in air at 900° C. for 5 hours to obtain a lithium cobalt complex oxide ($LiCoO_2$). Subsequently, 91 parts by mass of the lithium cobalt complex oxide as a positive electrode active material, 6 parts by mass of graphite as a conductive agent and 3 parts by mass of polyvinylidene fluoride as a binder were mixed to form a positive electrode mixture, which was then dispersed in N-methyl-2-pyrrolidone to prepare a positive electrode mixture slurry in a paste form. Finally, the positive electrode mixture slurry was coated on the both surfaces of the positive electrode collector 21A made of a strip-shaped aluminum foil (thickness: 12 μm), dried and then subjected to compression molding by a roll press, thereby forming the positive electrode active material layer 21B. Thereafter, the positive electrode lead 25 made of aluminum was installed in one end of the positive electrode collector 21A by means of welding.

Also, in preparing the negative electrode 22, 97 parts by mass of an artificial graphite powder as a negative electrode active material and 3 parts by mass of polyvinylidene fluoride as a binder were mixed to form a negative electrode mixture, which was then dispersed in N-methyl-2-pyrrolidone. The negative electrode mixture was coated on the both surfaces of the negative electrode collector 22A made of a strip-shaped copper foil (thickness: 15 μm), dried and then subjected to compression molding, thereby forming the negative electrode active material layer 22B. Thereafter, the negative electrode lead 26 made of nickel was installed in one end of the negative electrode collector 22A. Subsequently, the positive electrode 21, the separator 23 made of a microporous polypropylene film (thickness: 25 μm) and the negative electrode 22 were laminated in this order and then spirally wound many times, and a winding end portion was fixed by an adhesive tape to form the wound electrode body 20. Subsequently, the battery can 11 made of nickel-plated iron was prepared; the wound electrode body 20 was interposed between a pair of the insulating plates 12 and 13; not only the negative electrode lead 26 was welded with the battery can 11, but the positive electrode lead 25 was welded with the safety valve mechanism 15; and the resulting wound electrode body 20 was housed in the inside of the battery can 11. Subsequently, an electrolytic solution was injected into the inside of the battery can 11 in a pressure reduction system.

For the electrolytic solution, one prepared by preparing a mixed solution of ethylene carbonate (EC) and dimethyl carbonate (DMC) (3/7) and dissolving 1.2 moles/kg of $LiPF_6$ therein was used in Comparative Example 1-1; or ones prepared by dissolving 1% by mass of the sulfonic anhydride and/or 1% by mass of the aromatic compound as shown in Table 1 in the electrolytic solution of Comparative Example 1-1 were used. Also, each of the solutions was thoroughly dried by Molecular Sieves, thereby obtaining an electrolytic solution having a prescribed content of water (20 ppm). The content of water was measured by a Karl-Fischer aquacounter (manufactured by Hiranuma Sangyo Co., Ltd.).

In examining high-temperature storage characteristics, each of the batteries was first subjected to charge and discharge with 2 cycles in an atmosphere at 23° C., thereby measuring a discharge capacity before the storage. Subsequently, the battery was again charged and stored in this state in a thermostat at 80° C. for 10 days; and thereafter, it was discharged in an atmosphere at 23° C., thereby measuring a discharge capacity after the storage. Finally, [(discharge capacity retention rate after high-temperature storage)=(discharge capacity after the storage)/(discharge capacity before the storage)×100] was calculated. With respect to the charge and discharge condition, the battery was subjected to constant-current constant-voltage charge with a current of 0.2 C until the voltage reached an upper limit of 4.2 V and then subjected to constant-current discharge with a current of 0.2 C until the voltage reached a final voltage of 2.7 V. The term "0.2 C" as referred to herein means a current value at which a theoretical capacity is completely discharged within 5 hours.

Referential Examples 1-1 to 1-3

Batteries were prepared in the same manner as in Examples 1-6 to 1-8, except for changing the content of water to 1,000 ppm and then evaluated in the same manner.

The results are shown in Table 1.

TABLE 1

|  | Sulfonic anhydride (1% by mass) | Aromatic compound (1% by mass) | Content of water (ppm) | Discharge capacity retention rate after high-temperature storage (%) |
|---|---|---|---|---|
| Example 1-1 | Compound A | CHB | 20 | 92 |
| Example 1-2 | Compound A | tBB | 20 | 93 |
| Example 1-3 | Compound A | tPB | 20 | 93 |
| Example 1-4 | Compound A | DFA | 20 | 93 |
| Example 1-5 | Compound B | CHB | 20 | 94 |
| Example 1-6 | Compound B | tBB | 20 | 95 |
| Example 1-7 | Compound B | tPB | 20 | 95 |
| Example 1-8 | Compound B | DFA | 20 | 94 |
| Example 1-9 | Compound C | CHB | 20 | 93 |
| Example 1-10 | Compound C | tBB | 20 | 94 |
| Example 1-11 | Compound C | tPB | 20 | 94 |
| Example 1-12 | Compound C | DFA | 20 | 93 |
| Example 1-13 | Compound D | CHB | 20 | 91 |
| Example 1-14 | Compound D | tBB | 20 | 92 |

TABLE 1-continued

|  | Sulfonic anhydride (1% by mass) | Aromatic compound (1% by mass) | Content of water (ppm) | Discharge capacity retention rate after high-temperature storage (%) |
|---|---|---|---|---|
| Example 1-15 | Compound D | tPB | 20 | 92 |
| Example 1-16 | Compound D | DFA | 20 | 92 |
| Example 1-17 | Compound E | CHB | 20 | 85 |
| Example 1-18 | Compound E | tBB | 20 | 86 |
| Example 1-19 | Compound E | tPB | 20 | 86 |
| Example 1-20 | Compound E | DFA | 20 | 86 |
| Comparative Example 1-1 | No | No | 20 | 80 |
| Comparative Example 1-2 | Compound A | No | 20 | 81 |
| Comparative Example 1-3 | Compound B | No | 20 | 82 |
| Comparative Example 1-4 | Compound C | No | 20 | 81 |
| Comparative Example 1-5 | Compound D | No | 20 | 81 |
| Comparative Example 1-6 | Compound E | No | 20 | 80 |
| Comparative Example 1-7 | No | CHB | 20 | 79 |
| Comparative Example 1-8 | No | tBB | 20 | 80 |
| Comparative Example 1-9 | No | tPB | 20 | 80 |
| Comparative Example 1-10 | No | DFA | 20 | 81 |
| Comparative Example 1-11 | Compound F | CHB | 20 | 81 |
| Comparative Example 1-12 | Compound F | tPB | 20 | 82 |
| Comparative Example 1-13 | Compound F | DFA | 20 | 81 |
| Referential Example 1-1 | Compound B | CHB | 1000 | 82 |
| Referential Example 1-2 | Compound B | tPB | 1000 | 83 |
| Referential Example 1-3 | Compound B | DFA | 1000 | 83 |

Examples 2-1 to 2-32

Respective batteries were prepared in the same manner, except for using tPB as the aromatic compound and changing the sulfonic anhydride and the content of water as shown in Table 2 and then evaluated in the same manner. The results are shown in Table 2. The foregoing Comparative Examples are also shown. Also, Example 2-7 and Example 2-23 are identical with Example 1-7 and Example 1-11, respectively.

TABLE 2

|  | Sulfonic anhydride | | Aromatic compound | Content of water | Discharge capacity retention rate after high-temperature storage |
|---|---|---|---|---|---|
|  | Kind | (% by mass) | (% by mass) | (ppm) | (%) |
| Example 2-1 | Compound B | 0.01 | tPB | 100 | 85 |
| Example 2-2 | Compound B | 0.1 | tPB | 100 | 89 |
| Example 2-3 | Compound B | 1 | tPB | 100 | 92 |
| Example 2-4 | Compound B | 5 | tPB | 100 | 89 |
| Example 2-5 | Compound B | 0.01 | tPB | 20 | 87 |
| Example 2-6 | Compound B | 0.1 | tPB | 20 | 92 |
| Example 2-7 | Compound B | 1 | tPB | 20 | 95 |
| Example 2-8 | Compound B | 5 | tPB | 20 | 90 |
| Example 2-9 | Compound B | 0.01 | tPB | 10 | 89 |
| Example 2-10 | Compound B | 0.1 | tPB | 10 | 95 |
| Example 2-11 | Compound B | 1 | tPB | 10 | 96 |
| Example 2-12 | Compound B | 5 | tPB | 10 | 92 |
| Example 2-13 | Compound B | 0.01 | tPB | 1 | 90 |
| Example 2-14 | Compound B | 0.1 | tPB | 1 | 95 |
| Example 2-15 | Compound B | 1 | tPB | 1 | 96 |
| Example 2-16 | Compound B | 5 | tPB | 1 | 92 |
| Example 2-17 | Compound C | 0.01 | tPB | 100 | 84 |
| Example 2-18 | Compound C | 0.1 | tPB | 100 | 88 |
| Example 2-19 | Compound C | 1 | tPB | 100 | 91 |
| Example 2-20 | Compound C | 5 | tPB | 100 | 87 |
| Example 2-21 | Compound C | 0.01 | tPB | 20 | 86 |
| Example 2-22 | Compound C | 0.1 | tPB | 20 | 91 |
| Example 2-23 | Compound C | 1 | tPB | 20 | 94 |
| Example 2-24 | Compound C | 5 | tPB | 20 | 88 |
| Example 2-25 | Compound C | 0.01 | tPB | 10 | 88 |
| Example 2-26 | Compound C | 0.1 | tPB | 10 | 93 |
| Example 2-27 | Compound C | 1 | tPB | 10 | 95 |
| Example 2-28 | Compound C | 5 | tPB | 10 | 90 |
| Example 2-29 | Compound C | 0.01 | tPB | 1 | 89 |
| Example 2-30 | Compound C | 0.1 | tPB | 1 | 94 |
| Example 2-31 | Compound C | 1 | tPB | 1 | 95 |
| Example 2-32 | Compound C | 5 | tPB | 1 | 91 |
| Comparative Example 1-1 | No |  | No | 20 | 80 |
| Comparative Example 1-3 | Compound B | 1 | No | 20 | 82 |
| Comparative Example 1-4 | Compound C | 1 | No | 20 | 81 |

TABLE 2-continued

| | Sulfonic anhydride Kind | Aromatic compound (% by mass) | Content of water (ppm) | Discharge capacity retention rate after high-temperature storage (%) |
|---|---|---|---|---|
| | | (% by mass) | | |
| Comparative Example 1-9 | No | tPB | 20 | 80 |
| Comparative Example 1-12 | Compound F 1 | tPB | 20 | 82 |
| Referential Example 1-2 | Compound B 1 | tPB | 1000 | 83 |

It is noted from Table 2 that the content of the sulfonic anhydride and the content of water are preferably from 0.1 to 1% by mass and not more than 20 ppm, respectively.

Examples 3-1 to 3-20, Comparative Examples 3-1 to 3-12 and Referential Examples 3-1 to 3-3

Secondary batteries of Examples 3-1 to 3-20, Comparative Examples 3-1 to 3-12 and Referential Examples 3-1 to 3-3 were prepared according to Table 3 in the same manner as in Example 2-1, except for using a negative electrode which was prepared in the manner described below by using silicon as a negative electrode active material.

The negative electrode 22 was prepared by forming the negative electrode active material layer 22B made of silicon on the both surfaces of the negative electrode collector 22A made of a copper foil (thickness: 15 μm) by an electron beam vapor deposition method. Thereafter, the negative electrode lead 26 made of nickel was installed in one end of the negative electrode collector 22A.

For the electrolytic solution, one prepared by using a mixture of PC, 4-fluoro-1,3-dioxolan-2-one (FEC) and DEC (20/10/70) as a solvent, dissolving 1.2 moles/kg of $LiPF_6$ therein and further dissolving 1% by mass of the sulfonic anhydride and 1% by mass of the aromatic compound therein was used.

The obtained batteries were evaluated in the same manner. The results are shown in Table 3.

TABLE 3

| | Sulfonic anhydride (1% by mass) | Aromatic compound (1% by mass) | Content of water (ppm) | Discharge capacity retention rate after high-temperature storage (%) |
|---|---|---|---|---|
| Example 3-1 | Compound A | CHB | 20 | 86 |
| Example 3-2 | Compound A | tBB | 20 | 87 |
| Example 3-3 | Compound A | tPB | 20 | 87 |
| Example 3-4 | Compound A | DFA | 20 | 87 |
| Example 3-5 | Compound B | CHB | 20 | 88 |
| Example 3-6 | Compound B | tBB | 20 | 89 |
| Example 3-7 | Compound B | tPB | 20 | 89 |
| Example 3-8 | Compound B | DFA | 20 | 89 |
| Example 3-9 | Compound C | CHB | 20 | 88 |
| Example 3-10 | Compound C | tBB | 20 | 88 |
| Example 3-11 | Compound C | tPB | 20 | 88 |
| Example 3-12 | Compound C | DFA | 20 | 88 |
| Example 3-13 | Compound D | CHB | 20 | 85 |
| Example 3-14 | Compound D | tBB | 20 | 86 |
| Example 3-15 | Compound D | tPB | 20 | 86 |
| Example 3-16 | Compound D | DFA | 20 | 86 |
| Example 3-17 | Compound E | CHB | 20 | 83 |
| Example 3-18 | Compound E | tBB | 20 | 84 |
| Example 3-19 | Compound E | tPB | 20 | 84 |
| Example 3-20 | Compound E | DFA | 20 | 84 |
| Comparative Example 3-1 | No | No | 20 | 70 |
| Comparative Example 3-2 | Compound A | No | 20 | 73 |
| Comparative Example 3-3 | Compound B | No | 20 | 73 |
| Comparative Example 3-4 | Compound C | No | 20 | 72 |
| Comparative Example 3-5 | Compound D | No | 20 | 71 |
| Comparative Example 3-6 | Compound E | No | 20 | 70 |
| Comparative Example 3-7 | No | CHB | 20 | 71 |
| Comparative Example 3-8 | No | tPB | 20 | 72 |
| Comparative Example 3-9 | No | DFA | 20 | 73 |
| Comparative Example 3-10 | Compound F | CHB | 20 | 72 |
| Comparative Example 3-11 | Compound F | tPB | 20 | 73 |
| Comparative Example 3-12 | Compound F | DFA | 20 | 72 |
| Referential Example 3-1 | Compound B | CHB | 1000 | 74 |
| Referential Example 3-2 | Compound B | tPB | 1000 | 75 |
| Referential Example 3-3 | Compound B | DFA | 1000 | 74 |

It is noted from Table 3 that the characteristics of the battery having the foregoing negative electrode were enhanced by using the specified sulfonic anhydride and aromatic compound and using the electrolytic solution having a regulated content of water.

Examples 4-1 to 4-32

Respective batteries were prepared in the same manner as that described above, except for using the same negative electrode as in Example 3-1 and using tPB as the aromatic compound and changing the addition amount of each of the sulfonic anhydride Compound B or Compound C and the content of water as shown in Table 4 and then evaluated in the same manner. The results are shown in Table 4. The foregoing Comparative Examples are also shown. Also, Example 4-7 and Example 4-23 are identical with Example 3-7 and Example 3-11, respectively.

TABLE 4

|  | Sulfonic anhydride | | Aromatic compound | Content of water | Discharge capacity retention rate after high-temperature storage |
|---|---|---|---|---|---|
|  | Kind | (% by mass) | (% by mass) | (ppm) | (%) |
| Example 4-1 | Compound B | 0.01 | tPB | 100 | 78 |
| Example 4-2 | Compound B | 0.1 | tPB | 100 | 85 |
| Example 4-3 | Compound B | 1 | tPB | 100 | 87 |
| Example 4-4 | Compound B | 5 | tPB | 100 | 83 |
| Example 4-5 | Compound B | 0.01 | tPB | 20 | 79 |
| Example 4-6 | Compound B | 0.1 | tPB | 20 | 88 |
| Example 4-7 | Compound B | 1 | tPB | 20 | 89 |
| Example 4-8 | Compound B | 5 | tPB | 20 | 84 |
| Example 4-9 | Compound B | 0.01 | tPB | 10 | 80 |
| Example 4-10 | Compound B | 0.1 | tPB | 10 | 90 |
| Example 4-11 | Compound B | 1 | tPB | 10 | 91 |
| Example 4-12 | Compound B | 5 | tPB | 10 | 85 |
| Example 4-13 | Compound B | 0.01 | tPB | 1 | 82 |
| Example 4-14 | Compound B | 0.1 | tPB | 1 | 91 |
| Example 4-15 | Compound B | 1 | tPB | 1 | 92 |
| Example 4-16 | Compound B | 5 | tPB | 1 | 86 |
| Example 4-17 | Compound C | 0.01 | tPB | 100 | 77 |
| Example 4-18 | Compound C | 0.1 | tPB | 100 | 84 |
| Example 4-19 | Compound C | 1 | tPB | 100 | 85 |
| Example 4-20 | Compound C | 5 | tPB | 100 | 80 |
| Example 4-21 | Compound C | 0.01 | tPB | 20 | 78 |
| Example 4-22 | Compound C | 0.1 | tPB | 20 | 86 |
| Example 4-23 | Compound C | 1 | tPB | 20 | 88 |
| Example 4-24 | Compound C | 5 | tPB | 20 | 81 |
| Example 4-25 | Compound C | 0.01 | tPB | 10 | 79 |
| Example 4-26 | Compound C | 0.1 | tPB | 10 | 88 |
| Example 4-27 | Compound C | 1 | tPB | 10 | 89 |
| Example 4-28 | Compound C | 5 | tPB | 10 | 82 |
| Example 4-29 | Compound C | 0.01 | tPB | 1 | 80 |
| Example 4-30 | Compound C | 0.1 | tPB | 1 | 89 |
| Example 4-31 | Compound C | 1 | tPB | 1 | 90 |
| Example 4-32 | Compound C | 5 | tPB | 1 | 82 |
| Comparative Example 3-1 | No |  | No | 20 | 70 |
| Comparative Example 3-3 | Compound B | 1 | No | 20 | 73 |
| Comparative Example 3-4 | Compound C | 1 | No | 20 | 72 |
| Comparative Example 3-8 | No |  | tPB | 20 | 72 |
| Comparative Example 3-11 | Compound F | 1 | tPB | 20 | 73 |
| Referential Example 3-1 | Compound B | 1 | tPB | 1000 | 75 |

It is noted from Table 4 that even in the batteries using silicon as the negative electrode, the content of the sulfonic anhydride and the content of water are preferably from 0.1 to 1% by mass and not more than 20 ppm, respectively.

Examples 5-1 to 5-20, Comparative Examples 5-1 to 5-13 and Referential Examples 5-1 to 5-3

Respective secondary batteries of the titled Examples were prepared according to Table 5 in the same manner as in Example 1-1, except for preparing a negative electrode in the manner described below. In preparing the negative electrode, first of all, a tin cobalt indium titanium alloy powder and a carbon powder were mixed, and the mixture was subjected to a mechanochemical reaction to synthesize an SnCoC-containing material. As a result of the analysis of a composition of this SnCoC-containing material, the content of tin was 48% by mass, the content of cobalt was 23% by mass, the content of carbon was 20% by mass, and a proportion Co/(Sn+Co) of cobalt to the total sum of tin and cobalt was 32% by mass.

Subsequently, 80 parts by mass of the foregoing SnCoC-containing material powder as a negative electrode active material, 12 parts by mass of graphite as a conductive agent and 8 parts by mass of polyvinylidene fluoride as a binder were mixed, and the mixture was dissolved in N-methyl-2-pyrrolidone as a solvent. Finally, the solution was coated on a negative electrode collector made of a copper foil (thickness: 15 μm), dried and then subjected to compression molding to form a negative electrode active material layer.

For the electrolytic solution, one prepared by using a mixed solution of EC and DMC (3/7), dissolving 1.2 moles/kg of $LiPF_6$ therein and further dissolving 1% by mass of a sulfonic anhydride and 1% by mass of an aromatic compound therein was used. Also, the solution was thoroughly dried by Molecular Sieves, thereby obtaining an electrolytic solution having a prescribed content of water (20 ppm).

TABLE 5

| | Sulfonic anhydride (1% by mass) | Aromatic compound (1% by mass) | Content of water (ppm) | Discharge capacity retention rate after high-temperature storage (%) |
|---|---|---|---|---|
| Example 5-1 | Compound A | CHB | 20 | 86 |
| Example 5-2 | Compound A | tBB | 20 | 88 |
| Example 5-3 | Compound A | tPB | 20 | 88 |
| Example 5-4 | Compound A | DFA | 20 | 88 |
| Example 5-5 | Compound B | CHB | 20 | 90 |
| Example 5-6 | Compound B | tBB | 20 | 91 |
| Example 5-7 | Compound B | tPB | 20 | 91 |
| Example 5-8 | Compound B | DFA | 20 | 90 |
| Example 5-9 | Compound C | CHB | 20 | 88 |
| Example 5-10 | Compound C | tBB | 20 | 89 |
| Example 5-11 | Compound C | tPB | 20 | 89 |
| Example 5-12 | Compound C | DFA | 20 | 89 |
| Example 5-13 | Compound D | CHB | 20 | 84 |
| Example 5-14 | Compound D | tBB | 20 | 85 |
| Example 5-15 | Compound D | tPB | 20 | 85 |
| Example 5-16 | Compound D | DFA | 20 | 85 |
| Example 5-17 | Compound E | CHB | 20 | 81 |
| Example 5-18 | Compound E | tBB | 20 | 82 |
| Example 5-19 | Compound E | tPB | 20 | 82 |
| Example 5-20 | Compound E | DFA | 20 | 82 |
| Comparative Example 5-1 | No | No | 20 | 72 |
| Comparative Example 5-2 | Compound A | No | 20 | 75 |
| Comparative Example 5-3 | Compound B | No | 20 | 75 |
| Comparative Example 5-4 | Compound C | No | 20 | 73 |
| Comparative Example 5-5 | Compound D | No | 20 | 72 |
| Comparative Example 5-6 | Compound E | No | 20 | 72 |
| Comparative Example 5-7 | No | CHB | 20 | 71 |
| Comparative Example 5-8 | No | tBB | 20 | 72 |
| Comparative Example 5-9 | No | tPB | 20 | 72 |
| Comparative Example 5-10 | No | DFA | 20 | 73 |
| Comparative Example 5-11 | Compound F | CHB | 20 | 76 |
| Comparative Example 5-12 | Compound F | tPB | 20 | 77 |
| Comparative Example 5-13 | Compound F | DFA | 20 | 76 |
| Referential Example 5-1 | Compound B | CHB | 1000 | 77 |
| Referential Example 5-2 | Compound B | tPB | 1000 | 78 |
| Referential Example 5-3 | Compound B | DFA | 1000 | 78 |

It is noted from Table 5 that the characteristics of the battery having the foregoing SnCoC-containing negative electrode were enhanced by using the specified sulfonic anhydride and aromatic compound and using the electrolytic solution having a regulated content of water.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A nonaqueous electrolyte consisting of:
   a solvent;
   an electrolyte salt;
   at least one sulfonic anhydride in an amount of from 0.01 to 5% by mass relative to the nonaqueous electrolyte, the at least one sulfonic anhydride selected from the group consisting of compounds represented by the chemical formulae (7) and (8)

Chemical Formula (7)

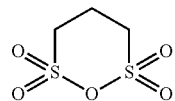

-continued

Chemical Formula (8)

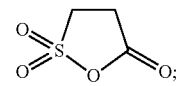

an aromatic compound in an amount of from 0.01 to 2% by mass relative to the nonaqueous electrolyte and selected from the group consisting of tert-butylbenzene, tert-pentylbenzene and 2,4-difluoroanisole; and
   a content of water not more than 100 ppm.

2. The nonaqueous electrolyte of claim 1, wherein the aromatic compound is in an amount of from 0.01 to 1% by mass relative to the nonaqueous electrolyte.

3. A battery comprising:
   a positive electrode;
   a negative electrode;
   a nonaqueous electrolyte; and
   a separator, wherein
   the nonaqueous electrolyte consists of a solvent, an electrolyte salt, at least one sulfonic anhydride in an amount of from 0.01 to 5% by mass relative to the nonaqueous electrolyte, the at least one sulfonic anhydride selected from the group consisting of compounds represented by the following chemical formulae (7) and (8)

Chemical Formula (7)

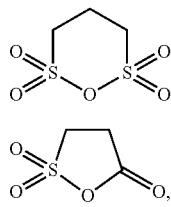

Chemical Formula (8)

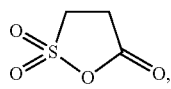

an aromatic compound in an amount of from 0.01 to 2% by mass relative to the nonaqueous electrolyte and selected from the group consisting of tert-butylbenzene, tert-pentylbenzene and 2,4-difluoroanisole, and a content of water not more than 100 ppm.

4. The battery according to claim 3, wherein the sulfonic anhydride is the compound represented by the chemical formula (7).

5. The battery according to claim 3, wherein the sulfonic anhydride is the compound represented by the chemical formula (8).

6. The battery according to claim 3, wherein the electrolyte salt is selected from the group consisting of lithium hexafluorophosphate ($LiPF_6$), lithium tetrafluoroborate ($LiBF_4$), lithium perchlorate ($LiClO_4$), lithium hexafluoroarsenate ($LiAsF_6$), and combinations thereof.

7. The battery according to claim 3, wherein the solvent is selected from the group consisting of ethylene carbonate, propylene carbonate, dimethyl carbonate, diethyl carbonate, ethylmethyl carbonate, and combinations thereof.

8. The battery according to claim 3, wherein the negative electrode comprises an oxide-containing film coating a surface of the negative electrode active material layer.

9. The battery according to claim 3, wherein the aromatic compound is selected from the group consisting of tert-butylbenzene and tert-pentylbenzene.

10. The battery according to claim 3, wherein the content of water in the nonaqueous electrolyte is not more than 20 ppm.

11. The battery according to claim 3, wherein the negative electrode comprises a negative electrode active material layer including artificial graphite.

12. The battery according to claim 3, wherein the aromatic compound is in an amount of from 0.01 to 1% by mass relative to the nonaqueous electrolyte.

* * * * *